(12) United States Patent
Yoshida et al.

(10) Patent No.: US 8,922,837 B2
(45) Date of Patent: Dec. 30, 2014

(54) PRINT CONTROL DEVICE, IMAGE FORMING SYSTEM, AND COMPUTER-READABLE STORAGE MEDIUM

(71) Applicants: Makoto Yoshida, Kanagawa (JP); Hiroaki Suzuki, Chiba (JP); Hiroo Kitagawa, Kanagawa (JP)

(72) Inventors: Makoto Yoshida, Kanagawa (JP); Hiroaki Suzuki, Chiba (JP); Hiroo Kitagawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/839,276

(22) Filed: Mar. 15, 2013

(65) Prior Publication Data

US 2013/0250365 A1 Sep. 26, 2013

(30) Foreign Application Priority Data

Mar. 22, 2012 (JP) .................. 2012-065471

(51) Int. Cl.
- *H04N 1/40* (2006.01)
- *H04N 1/407* (2006.01)
- *G06K 15/02* (2006.01)
- *H04N 1/54* (2006.01)
- *H04N 1/60* (2006.01)

(52) U.S. Cl.
CPC .............. *G06K 15/1872* (2013.01); *H04N 1/54* (2013.01); *H04N 1/6027* (2013.01)
USPC ........................................ 358/3.24; 358/3.27

(58) Field of Classification Search
USPC ......... 358/3.24, 1.9, 1.12, 3.27, 1.15; 399/82, 399/67, 8, 15, 69, 81, 328
See application file for complete search history.

(56) References Cited

U.S. PATENT DOCUMENTS

| | | | |
|---|---|---|---|
| 8,508,796 B2 * | 8/2013 | Harada | ........................ 358/1.9 |
| 2009/0034998 A1 | 2/2009 | Omata | |
| 2010/0134811 A1 | 6/2010 | Fukasawa et al. | |
| 2010/0238509 A1 | 9/2010 | Ogawa | |
| 2012/0063802 A1 | 3/2012 | Suzuki et al. | |

FOREIGN PATENT DOCUMENTS

| | | |
|---|---|---|
| EP | 2381671 A2 | 10/2011 |
| EP | 2431814 A2 | 3/2012 |
| JP | 2009-058941 | 3/2009 |
| JP | 2010-102239 | 5/2010 |
| JP | 2010-217725 | 9/2010 |

OTHER PUBLICATIONS

European Search Report issued Oct. 21, 2014 for European Patent Application No. 13160070.2-1902.

* cited by examiner

*Primary Examiner* — Charlotte M Baker
(74) *Attorney, Agent, or Firm* — Oblon, Spivak, McClelland, Maier & Neustadt, L.L.P.

(57) ABSTRACT

A print control device includes a generating unit configured to generate image data, based on gloss control plane data for specifying a type of a surface effect to be given to a recording medium and specifying a region to which the surface effect is to be given in the recording medium; and an output unit configured to output the image data. The generating unit includes a tone correcting unit configured to perform a tone correction on a region in which the surface effect is designated in the gloss control plane data, the tone correction varying with each type of surface effect.

13 Claims, 41 Drawing Sheets

| NAME OF GLOSS CONTROL | GLOSS | DEVIATION |
|---|---|---|
| MIRROR GLOSS [PG] | Gs≥80 | ΔGs≤10 |
| SOLID GLOSS [G] | Gs=Gs (SOLID GLOSS) | ΔGs≤10 |
| HALFTONE MATTE [M] | Gs=Gs (1C 30% HALFTONE DOTS) | ΔGs≤10 |
| MATTE [PM] | Gs≤10 | ΔGs≤10 |

IMAGE DATA OF COLOR PLANE

| NAME OF GLOSS CONTROL | GLOSS | DEVIATION |
|---|---|---|
| MIRROR GLOSS [PG] | Gs≥80 | ΔGs≤10 |
| SOLID GLOSS [G] | Gs=Gs (SOLID GLOSS) | ΔGs≤10 |
| HALFTONE MATTE [M] | Gs=Gs (1C 30% HALFTONE DOTS) | ΔGs≤10 |
| MATTE [PM] | Gs≤10 | ΔGs≤10 |

GLOSS CONTROL PLANE IMAGE DATA

▨ : REGION IN WHICH PG IS DESIGNATED (DENSITY VALUE: 98%)

▧ : REGION IN WHICH G IS DESIGNATED (DENSITY VALUE: 90%)

▤ : REGION IN WHICH M IS DESIGNATED (DENSITY VALUE: 16%)

CLEAR PLANE IMAGE DATA

| SURFACE EFFECT TYPE DESIGNATED BY USER | DENSITY VALUE OF GLOSS CONTROL PLANE [%] |
|---|---|
| PG | 98% |
| G | 90% |
| M | 16% |
| PM | 6% |

| DRAWING OBJECT | COORDINATES | DENSITY VALUE |
|---|---|---|
| A, B, C<br>(RECTANGLE) | (x1, y1)-(x2, y2) | 98% |
|  | (x3, y3)-(x4, y4) | 90% |
| ... | ... | ... |

FIG.15

| DENSITY [%] | DENSITY REPRESENTATIVE VALUE | DENSITY NUMERAL VALUE RANGE | | EFFECT | GLOSSER ON/OFF (ON/OFF INFORMATION) | CLEAR TONER PLANE 1 (PRINTER UNIT) | CLEAR TONER PLANE 2 (LOW-TEMPERATURE FIXING UNIT) |
|---|---|---|---|---|---|---|---|
| 98% | 250 | 248 | 255 | PREMIUM GLOSS TYPE A | ON | INVERSE MASK A | NO DATA |
| 96% | 245 | 243 | 247 | PREMIUM GLOSS TYPE B | ON | INVERSE MASK B | NO DATA |
| 94% | 240 | 238 | 242 | PREMIUM GLOSS TYPE C | ON | INVERSE MASK C | NO DATA |
| 92% | 235 | 233 | 237 | RESERVED | | | |
| 90% | 230 | 228 | 232 | GLOSS TYPE 1 | OFF | INVERSE MASK 1 | NO DATA |
| 88% | 224 | 222 | 227 | GLOSS TYPE 2 | OFF | INVERSE MASK 2 | NO DATA |
| 86% | 219 | 217 | 221 | GLOSS TYPE 3 | OFF | INVERSE MASK 3 | NO DATA |
| 84% | 214 | 212 | 216 | GLOSS TYPE 4 | OFF | INVERSE MASK 4 | NO DATA |
| 82% | 209 | 207 | 211 | RESERVED | | | |
| 46% | 117 | 115 | 119 | RESERVED | | | |
| 44% | 112 | 110 | 114 | WATERMARK CHARACTER 3 (XXX) | OFF | NO DATA | TILE CHARACTER STRING 3 |
| 42% | 107 | 105 | 109 | WATERMARK CHARACTER 2 (DUPLICATION PROHIBITED) | | NO DATA | TILE CHARACTER STRING 2 |
| 40% | 102 | 100 | 104 | WATERMARK CHARACTER 1 (SAMPLE) | | NO DATA | TILE CHARACTER STRING 1 |
| 38% | 97 | 95 | 99 | RESERVED | | | |
| 36% | 92 | 90 | 94 | RESERVED | | | |
| 34% | 87 | 85 | 89 | SURFACE PATTERN 3 (XXX) | | NO DATA | TILE PATTERN 3 |
| 32% | 82 | 80 | 84 | SURFACE PATTERN 2 (LATTICE) | | NO DATA | TILE PATTERN 2 |
| 30% | 76 | 74 | 79 | SURFACE PATTERN 1 (WAVES) | | NO DATA | TILE PATTERN 1 |
| 28% | 71 | 69 | 73 | RESERVED | | | |
| 26% | 66 | 64 | 68 | RESERVED | | | |
| 24% | 61 | 59 | 63 | TEXTURE PATTERN TYPE 3 (ROUGH) | | NO DATA | TILE MESH PATTERN 3 |
| 22% | 56 | 54 | 58 | TEXTURE PATTERN TYPE 2 (MEDIUM) | | NO DATA | TILE MESH PATTERN 2 |
| 20% | 51 | 49 | 53 | TEXTURE PATTERN TYPE 1 (FINE) | | NO DATA | TILE MESH PATTERN 1 |
| 18% | 46 | 44 | 48 | RESERVED | | | |
| 16% | 41 | 39 | 43 | MATTE TYPE 4 | OFF | HALFTONE 4 | NO DATA |
| 14% | 36 | 34 | 38 | MATTE TYPE 3 | OFF | HALFTONE 3 | NO DATA |
| 12% | 31 | 29 | 33 | MATTE TYPE 2 | OFF | HALFTONE 2 | NO DATA |
| 10% | 25 | 23 | 28 | MATTE TYPE 1 | OFF | HALFTONE 1 | NO DATA |
| 8% | 20 | 18 | 22 | RESERVED | | | |
| 6% | 15 | 13 | 17 | PREMIUM MATTE TYPE C | ON & OFF | NO DATA | SOLID |
| 4% | 10 | 8 | 12 | PREMIUM MATTE TYPE B | ON & OFF | NO DATA | SOLID |
| 2% | 5 | 1 | 7 | PREMIUM MATTE TYPE A | ON & OFF | NO DATA | SOLID |
| 0% | 0 | 0 | 0 | NONE | OFF | NO DATA | NO DATA |

FIG.26

| SURFACE EFFECT | TARGET INFORMATION | |
|---|---|---|
| PG (A≤TARGET GLOSS LEVEL≤B) | GLOSS LEVEL (TARGET) — graph with axes 0–100, values B, A, PG, 94, 100 | GLOSS CONTROL PLANE DENSITY RATE [INPUT VALUE] [%] |
| G (C≤TARGET GLOSS LEVEL≤D) | GLOSS LEVEL (TARGET) — graph with B, D, C, 84, 90, 100 | GLOSS CONTROL PLANE DENSITY RATE [INPUT VALUE] [%] |
| M (E≤TARGET GLOSS LEVEL≤F) | GLOSS LEVEL (TARGET) — graph with F, M, E, 10, 16, 100 | GLOSS CONTROL PLANE DENSITY RATE [INPUT VALUE] [%] |

FIG.31

| SURFACE EFFECT | PAPER | TARGET INFORMATION | | |
|---|---|---|---|---|
| PG (A≤TARGET GLOSS LEVEL≤B) | PLANE PAPER A | GLOSS LEVEL (TARGET) | 100 B PG↕ A 0  94 ↔100 PG | GLOSS CONTROL PLANE DENSITY RATE [INPUT VALUE] [%] |
| | PLANE PAPER B | GLOSS LEVEL (TARGET) | 100 B PG↕ A 0  94 ↔100 PG | GLOSS CONTROL PLANE DENSITY RATE [INPUT VALUE] [%] |
| | GLOSS COATED PAPER A | GLOSS LEVEL (TARGET) | 100 B PG↕ A 0  94 ↔100 PG | GLOSS CONTROL PLANE DENSITY RATE [INPUT VALUE] [%] |

PRINT CONTROL DEVICE, IMAGE FORMING SYSTEM, AND COMPUTER-READABLE STORAGE MEDIUM

CROSS-REFERENCE TO RELATED APPLICATION

The present application claims priority to and incorporates by reference the entire contents of Japanese Patent Application No. 2012-065471 filed in Japan on Mar. 22, 2012.

BACKGROUND OF THE INVENTION

1. Field of the Invention

The present invention relates to a print control device, an image forming system, and a computer-readable storage medium.

2. Description of the Related Art

There is a known technique by which patch images representing images to be used in calibration are formed on a recording medium, and image forming conditions are changed (corrected) based on the characteristics of the patch images. For example, Japanese Patent Application Laid-open No. 2010-102239 discloses a technique by which the gloss levels of transparent toner patch images (tone images) formed on a recording medium are measured, and gamma curves (a gamma correction table) to be used in gamma corrections are created by using the measured gloss levels of the patch images.

In a case where several gloss levels are to be achieved with a clear toner (a colorless toner) in one page of a recording medium, the relationship between the density value of an image and the gloss level to be achieved as a result of printing varies with each type of visual or tactual effect (surface effect). By the technique disclosed in Japanese Patent Application Laid-open No. 2010-102239, however, only one type of gamma curve is created. If the same gamma correction is performed on regions in which surface effects are designated, regardless of the types of the surface effects, gloss levels suitable for the respective types of surface effects cannot be achieved.

Therefore, there is a need to provide a print control device, and an image forming system and program that can achieve appropriate gloss levels in accordance with types of surface effects.

SUMMARY OF THE INVENTION

It is an object of the present invention to at least partially solve the problems in the conventional technology.

According to an embodiment, there is provided a print control device that includes a generating unit configured to generate image data, based on gloss control plane data for specifying a type of a surface effect to be given to a recording medium and specifying a region to which the surface effect is to be given in the recording medium; and an output unit configured to output the image data. The generating unit includes a tone correcting unit configured to perform a tone correction on a region in which the surface effect is designated in the gloss control plane data, the tone correction varying with each type of surface effect.

According to another embodiment, there is provided an image forming system that includes a print control device configured to generate image data; and a printing device configured to perform printing based on the image data. The print control device includes a generating unit configured to generate the image data, based on gloss control plane data for specifying a type of a surface effect to be given to a recording medium and specifying a region to which the surface effect is to be given in the recording medium; and an output unit configured to output the image data. The generating unit includes a tone correcting unit configured to perform a tone correction on a region in which the surface effect is designated in the gloss control plane data, the tone correction varying with each type of surface effect.

According to still another embodiment, there is provided a non-transitory computer-readable storage medium with an executable program stored thereon. The program instructs a computer to perform generating image data, based on gloss control plane data specifying a type of a surface effect to be given to a recording medium and specifying a region to which the surface effect is to be given in the recording medium; and outputting the image data. The generating includes performing a tone correction on a region in which the surface effect is designated in the gloss control plane data, the tone correction varying with each type of surface effect.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 15 is a diagram illustrating an example data structure of a surface effect select table;

FIG. 26 is a diagram illustrating an example of target information stored in the target storage unit;

FIG. 31 is a diagram illustrating an example of the target information that is determined beforehand in accordance with combinations of types of surface effects and types of paper sheets;

DETAILED DESCRIPTION OF THE PREFERRED EMBODIMENTS

The following is a detailed description of embodiments of print control devices, image forming systems, and programs according to the present invention, with reference to the accompanying drawings.

First Embodiment

Figure 1:
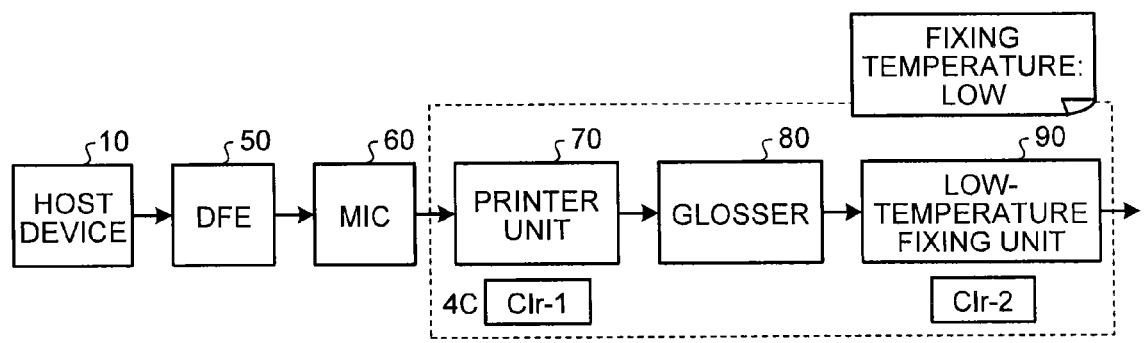
FIG. 1 is a diagram illustrating an example structure of an image forming system according to a first embodiment.

Referring to FIG. 1, the structure of an image forming system according to this embodiment is first described. In this embodiment, the image forming system is formed by connecting a printer control device (DFE: Digital Front End) 50 (hereinafter referred to as the "DFE 50"), an interface controller (MIC: Mechanism I/F controller) 60 (hereinafter referred to as the "MIC 60"), a printer unit 70, a glosser 80 as a postprocessor, and a low-temperature fixing unit 90. The DFE 50 communicates with the printer unit 70 via the MIC 60, and controls image formation at the printer unit 70. A host device 10 such as a PC (Personal Computer) is connected to the DFE 50, and receives image data from the host device 10. Using the image data, the DFE 50 generates image data for the printer unit 70 to form toner images in accordance with respective toners of CMYK and clear toner, and transmits the generated image data to the printer unit 70 via the MIC 60. At least the respective toners of CMYK and the clear toner are provided in the printer unit 70, and an image forming unit including a photosensitive element, a charger, a developing unit, and a photosensitive element cleaner, an exposing unit, and a fixing unit are provided for each of the toners.

Here, the clear toner is a transparent (colorless) toner containing no color materials. Being transparent (colorless) means that the transmittance is 70% or higher.

In accordance with the image data transmitted from the DFE 50 via the MIC 60, the printer unit 70 emits light beams from the exposing unit to form toner images on the photosensitive element. The toner images are transferred onto a transfer paper sheet as a recording medium, and are fixed by heating and pressing at temperatures (ordinary temperatures) within a predetermined range by the fixing unit. In this manner, an image is formed on the transfer paper sheet. The structure of such a printer unit 70 is a known structure, and therefore, detailed explanation thereof is not provided herein.

Switching on and off of the glosser 80 is controlled by on/off information designated by the DFE 50. In a case where the glosser 80 is turned on, the image formed on the transfer paper sheet by the printer unit 70 is pressed at a high temperature and a high pressure, and is then cooled. The transfer paper sheet having the image formed thereon is removed from the main unit. Through this operation, the total amount of toner applied to each pixel having a predetermined amount or more of toner applied thereto is uniformly compressed in the entire image formed on the transfer paper sheet. An image forming unit including a photosensitive element, a charger, a developing unit, and a photosensitive element cleaner, an exposing unit, and a fixing unit for fixing the clear toner are provided in the low-temperature fixing unit 90, and the later described clear toner plane image data that is generated by the DFE 50 and is to be used at the low-temperature fixing unit 90 is input to the low-temperature fixing unit 90. In a case where the clear toner plane image data (the clear toner plane data) to be used by the low-temperature fixing unit 90 is generated by the DFE 50, the low-temperature fixing unit 90 forms a toner image with the clear toner by using the clear toner plane data, and superimposes the toner image onto the transfer paper sheet pressed by the glosser 80. In this manner, the toner image is fixed onto the transfer paper sheet at a lower temperature and a lower pressure than the regular temperature and pressure by the fixing unit.

Here, image data (document data) that is input from the host device 10 is described. In the host device 10, image data is generated by an image processing application (such as an image processing unit 120, a plane data generating unit 122, a print data generating unit 123, which will be described later) that is installed in advance, and the image data is transmitted to the DFE 50. With such an image processing application, image data of a specific color plane can be processed, as opposed to image data in which the value of the density (hereinafter referred to as the density value) of each color in the respective color planes such as RGB planes or CMYK planes is specified for each pixel. A specific color plane is image data for applying a special toner or ink in white, gold, silver, or the like, other than basic colors such as CMYK or RGB, and is data for a printer having such special toners or inks provided therein. There are cases where a specific color plane is used to add R to the basic colors of CMYK or Y to the basic colors of RGB, so as to increase color reproducibility. Normally, the clear toner is used as one of those specific colors.

In this embodiment, the clear toner as a specific color is used for achieving a surface effect to give a visual or tactual effect to transfer paper sheets, and for forming a transparent image such as a watermark or texture other than the above mentioned surface effect on transfer paper sheets.

Therefore, in response to an image data input, the image processing application of the host device 10 generates gloss control plane image data and/or clear plane image data as color plane image data and specific color plane image data in accordance with a designation by a user.

Figure 2:
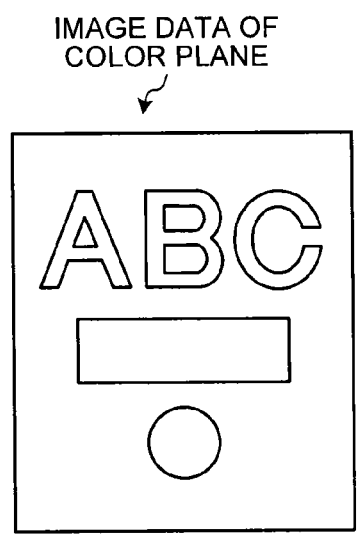
FIG. 2 is a diagram illustrating an example of color plane image data.

Here, color plane image data is image data in which the density values of the colors such as RGB and CMYK are specified for each pixel. In the color plane image data, one pixel is expressed by 8 bits in accordance with a color designation by the user. FIG. 2 is a diagram for explaining an example of color plane image data. In FIG. 2, density values corresponding to the colors that are designated for each of drawing objects such as "A", "B", and "C" by the user using the image processing application are provided.

To perform control to apply the clear toner to a transfer paper sheet in accordance with the surface effect as a visual or tactual effect to be given to the transfer paper sheet, the gloss control plane image data specifies the region to which the surface effect is to be given and the type of the surface effect.

Like the color planes of RGB or CMYK or the like, the gloss control plane is expressed by an 8-bit density value of "0" to "255" for each pixel, and a type of surface effect is associated with the density value (the density value may be expressed by 16 bits or 32 bits, or 0 to 100%). Since identical values are set in ranges in which the same surface effect is to be given, regardless of the density of the actually applied clear toner, the region can be easily identified from the image data where necessary, even if there is no data specifying the region.

That is, the gloss control plane indicates the type of surface effect and the region to which the surface effect is to be given (the data indicating the region may be separately provided). In this example, the density value of the gloss control plane can be regarded as the gloss control value for specifying the type of the surface effect as a visual or tactual effect to be given to a recording medium, and the region to which the surface effect is to be given in the recording medium.

Here, the host device 10 sets a density value as a gloss control value for each drawing object, to specify a type of the surface effect for each drawing object designated by a user using the image processing application, and generates gloss control plane image data in a vector form (gloss control plane data).

Each of the pixels forming the gloss control plane image data corresponds to a pixel in color plane image data. In each piece of image data, each density value indicated by a pixel is a pixel value. Also, the color plane image data and the gloss control plane are both formed on a page-by-page basis.

Figures 3, 4:
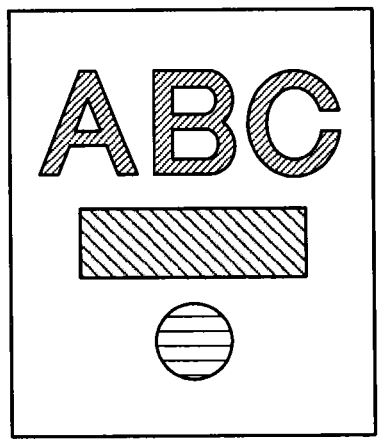
FIG. 3 is a diagram illustrating example types of surface effects related to the existence of gloss.
FIG. 4 is a diagram illustrating an image of the gloss control plane image data.

Major types of surface effects include effects related to the existence of gloss, surface protections, information embedded watermarks and textures. The surface effects related to the existence of gloss are roughly classified into four types as illustrated in FIG. 3. In descending order of degree of glossiness (gloss level), there are mirror gloss (PG: Premium Gloss), solid gloss (G: Gloss), halftone matte (M: Matte), and matte (PM: Premium Matte). Hereinafter, mirror gloss will be also referred to as "PG", solid gloss will be also referred to as "G", halftone matte will be also referred to as "M", and matte will be also referred to as "PM".

Mirror gloss and solid gloss involve high degrees of glossiness, and halftone matte and matte are for reducing glossiness. Particularly, matte is for realizing a lower gloss level than the gloss level of a conventional transfer paper sheet. In the drawing, the gloss level Gs of mirror gloss is 80 or higher, solid gloss involves a gloss level achieved by a primary color or a secondary color, halftone matte involves a gloss level of a primary color and 30% halftone dots, and matte involves a gloss level of 10 or lower. The gloss level deviation is expressed by $\Delta Gs$, which is 10 or lower. Among the respective types of surface effects, a high density value is associated with a surface effect to provide a high degree of glossiness, and a low density value is associated with a surface effect to reduce glossiness. The surface effects such as watermarks and textures are associated with density values in between. As watermarks, characters or patterns are used, for example. Textures are for indicating characters or patterns, and can provide tactual effects as well as visual effects. For example, a stained glass pattern can be realized with clear toner. Surface protection can be realized by mirror gloss or solid gloss. Which region a surface effect is to be given in the image represented by image data to be processed, and what kind of surface effect is to be given to the region are designated by a user via the image processing application. In the host device 10 that executes the image processing application, the density value corresponding to the type of surface effect designated by the user is set to the drawing object forming the region designated by the user. In this manner, the gloss control plane image data is generated. The correspondence relationships between the density values and the surface effects will be described later.

FIG. 4 is a diagram for explaining an example of the gloss control plane image data. In the example of the gloss control plane illustrated in FIG. 4, a surface effect "PG (mirror gloss)" is given to a drawing object "ABC", a surface effect "G (solid gloss)" is given to a drawing object "(a rectangular shape)", and a surface effect "M (halftone matte)" is given to a drawing object "(a round shape)". The density values set for the respective surface effects are the density values determined in accordance with the types of surface effects illustrated in the later described density value select table (see FIG. 9).

Figure 5:
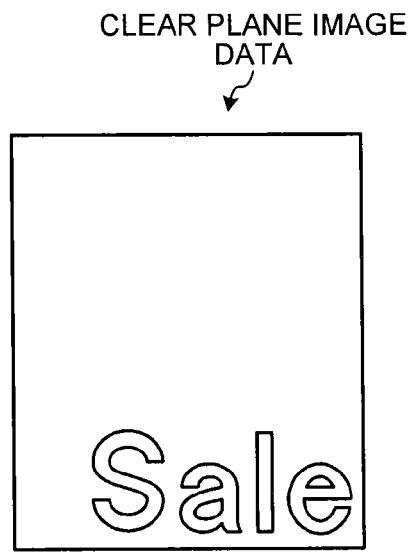
FIG. 5 is a diagram illustrating an example of the clear plane image data.

The clear plane image data is image data specifying transparent images such as watermarks and textures other than the above described surface effects. FIG. 5 is a diagram for explaining an example of the clear plane image data. In the example illustrated in FIG. 5, a watermark "Sale" is designated by a user.

As described above, the image data of the gloss control plane and the clear plane, which are the image data of specific color planes, are generated in different planes from those of the color plane image data by the image processing application of the host device 10. Each image data format of the color plane image data, the gloss control plane image data, and the clear plane image data is the PDF (Portable Document Format), but the PDF image data of the respective planes are integrated to generate document data. The data format of the image data of each plane is not limited to the PDF, and any other format may be used.

Figure 6:
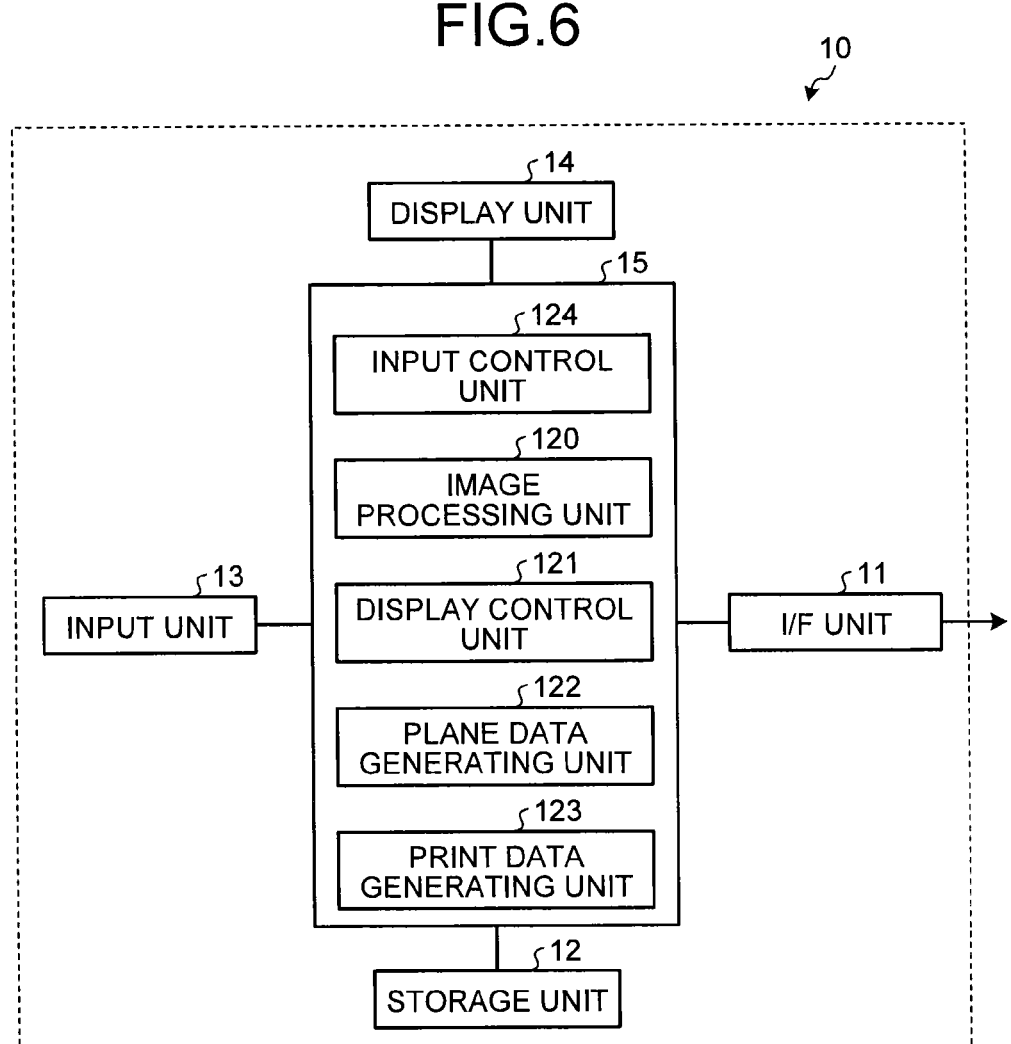
FIG. 6 is a block diagram schematically illustrating an example structure of the host device.

Next, the host device 10 that generates image data of the respective planes is described in detail. FIG. 6 is a block diagram schematically illustrating an example structure of the host device 10. As illustrated in FIG. 6, the host device 10 includes an I/F unit 11, a storage unit 12, an input unit 13, a display unit 14, and a control unit 15. The I/F unit 11 is an interface device for performing communications with the DFE 50. The storage unit 12 is a storage medium such as a hard disk drive (HDD) or memory that stores various kinds of data. The input unit 13 is an input device for a user to conduct various kinds of operation inputs, and may be formed with a keyboard and a mouse, for example. The display unit 14 is a display device for displaying various kinds of screens, and may be formed with a liquid crystal panel, for example.

The control unit 15 controls the entire host device 10, and is a computer that includes a CPU, ROM, RAM, and the like. As illustrated in FIG. 6, the control unit 15 includes an input control unit 124, the image processing unit 120, a display control unit 121, the plane data generating unit 122, and the print data generating unit 123. Among those components, the input control unit 124 and the display control unit 121 are realized by the CPU of the control unit 15 reading an operating system program stored in the ROM or the like, loading the program into the RAM, and executing the program. The image processing unit 120, the plane data generating unit 122, and the print data generating unit 123 can be realized by the CPU of the control unit 15 reading the program of the above described image processing application stored in the ROM or the like, loading the program into the RAM, and executing the program. Here, the plane data generating unit 122 is provided as a function of an installed plug-in in the image processing application, for example. At least one of those components may be realized by an individual circuit (hardware).

The input control unit 124 receives various kinds of inputs through the input unit 13, and controls the inputs. For example, a user operates the input unit 13, to input image designation information for designating an image to which a surface effect is to be given among various kinds of images (such as photographs, characters, figures, and images combining photographs, characters, and figures) stored in the storage unit 12, or for designating color plane image data (hereinafter also referred to as the "target image"). The method of inputting the image designation information is not limited to that, and any other method may be used.

The display control unit 121 controls display of various kinds of information on the display unit 14. In this embodiment, when the input control unit 124 receives the image designation information, the display control unit 121 reads the image designated by the image designation information from the storage unit 12, and controls the display unit 14 to display the read image in a screen.

While looking at the target image displayed on the display unit 14, the user operates the input unit 13, to input designation information for designating a region to which a surface effect is to be given, and the type of the surface effect. The method of inputting the designation information is not limited to that, and any other method may be used.

Figure 7:
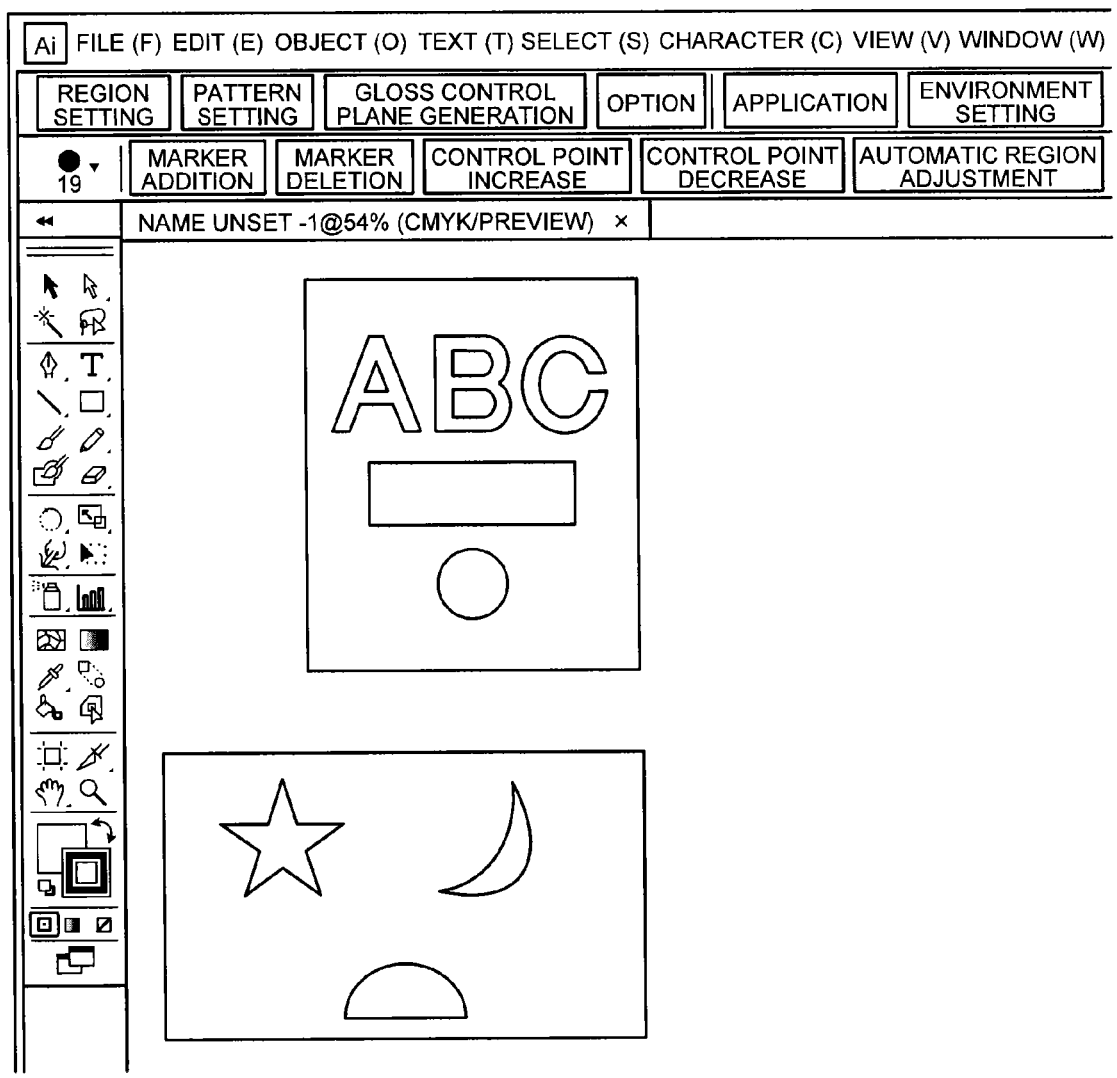
FIG. 7 is a diagram illustrating an example screen displayed by the image processing application.

More specifically, the display control unit 121 causes the display unit 14 to display an example screen illustrated in FIG. 7. FIG. 7 is an example screen that is displayed in a case where a plug-in is incorporated into Illustrator, which is available from Adobe Systems Incorporated. In the screen illustrated in FIG. 7, an image indicated by target image data (color plane image data) to be processed is displayed. When a user presses a maker adding button via the input unit 13 to conduct an operation input to designate a surface effect receiving region, a region to which a surface effect is to be given is designated. The user performs such an operation input on all the regions to which a surface effect is to be given. The display control unit 121 of the host device 10 then causes the display unit 14 to display an example screen illustrated in FIG. 8 for each designated region, for example. In the screen illustrated in FIG. 8, an image of each region designated as a surface effect receiving region is displayed, and an operation input to designate the type of the surface effect to be given to the image is conducted via the input unit 13. In this manner, the type of the surface effect to be given to the region is designated. As the types of surface effects, mirror gloss or solid gloss of FIG. 3 is illustrated as "inverse mask" in FIG. 8, and the effects other than mirror gloss and solid gloss of FIG. 3 are illustrated as a stained glass pattern, a line pattern, a mesh pattern, a mosaic style, halftone matte, and halftone in FIG. 8. This screen indicates that each of the surface effects can be designated.

Referring back to FIG. 6, the image processing unit 120 performs various kinds of image processing on a target image, in accordance with an instruction from a user via the input unit 13.

The plane data generating unit 122 generates color plane image data, gloss control plane image data, and clear plane image data. That is, in a case where the input control unit 124 receives a color designation from a user with respect to a drawing object of a target image, the plane data generating unit 122 generates color plane image data in accordance with the color designation.

In a case where the input control unit 124 receives a designation of a transparent image such as a watermark or a texture other than surface effects and the region to which the transparent image is to be given, the plane data generating unit 122 generates clear plane data for specifying the transparent image and the region to which the transparent image is to be given on a transfer paper sheet, in accordance with the designation from the user.

In a case where the input control unit 124 receives designation information (the region to which a surface effect is to be given, and the type of the surface effect), the plane data generating unit 122 generates gloss control plane image data that can specify the region to which the surface effect is to be given on a transfer paper sheet, and the type of the surface effect. Here, the plane data generating unit 122 generates gloss control plane image data designating regions to which surface effects indicated by gloss control values are to be given, on the basis of drawing objects of image data of target images.

Figures 9, 10:
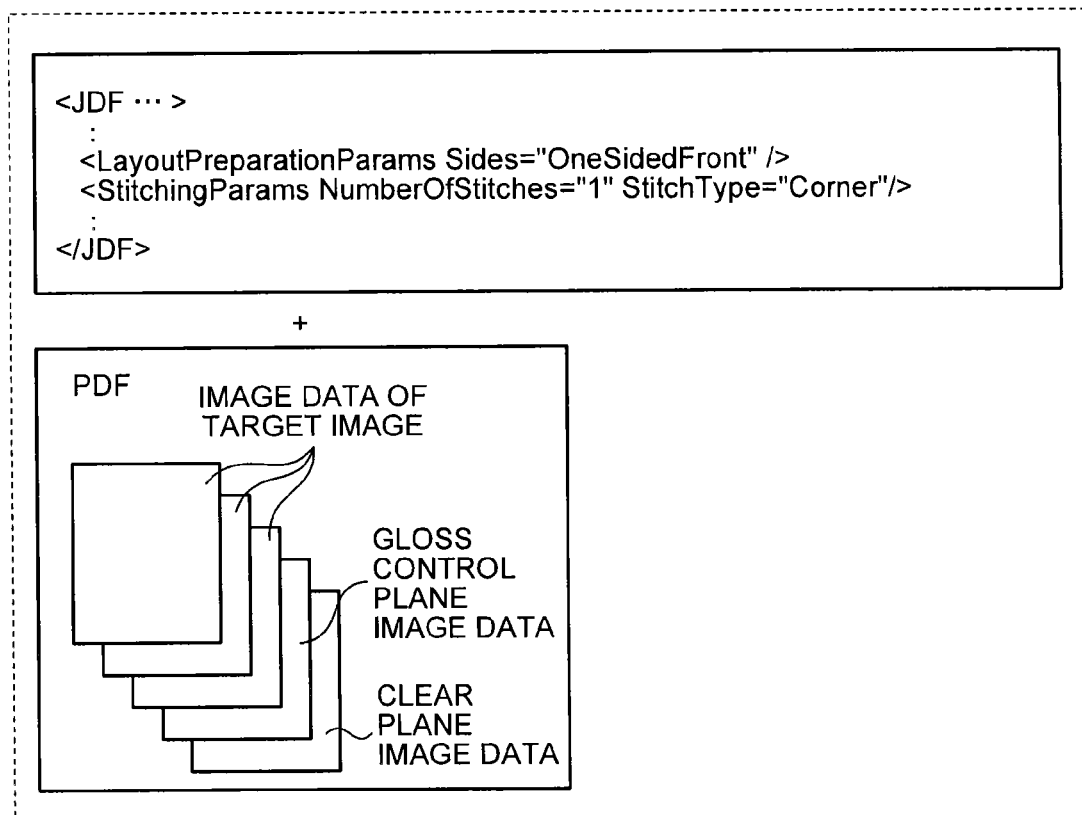
FIG. 9 is a diagram illustrating an example of a density value select table.
FIG. 10 is a schematic view conceptually illustrating an example structure of print data.

At this point, a density value select table that stores the types of surface effects designated by the user and the gloss control plane density values corresponding to the types of surface effects is stored into the storage unit 12. FIG. 9 is a diagram illustrating an example of the density value select table. In the example illustrated in FIG. 9, the gloss control plane density value corresponding to a region designated for "PG" (mirror gloss) by the user is "98%", the gloss control plane density value corresponding to a region designated for "G" (solid gloss) is "90%", the gloss control plane density value corresponding to a region designated for "M" (halftone matte) is "16%", and the gloss control plane density value corresponding to a region designated for "PM"(matte) is "6%".

This density value select table is the data of part of a surface effect select table (described later) stored in the DFE 50. The control unit 15 obtains the surface effect select table at a predetermined time, and generates the density value select table from the obtained surface effect select table. The density value effect table is then stored into the storage unit 12. Alternatively, the surface effect select table may be stored in a storage server (the cloud) in a network such as the Internet. The control unit 15 may obtain the surface effect select table from the server, and generate the density value select table from the obtained surface effect select table. It should be noted that the surface effect select table stored in the DFE 50 needs to be the same data as the surface effect select table stored in the storage unit 12.

Referring back to FIG. 6, the plane data generating unit 122 sets the density values (the gloss control values) of drawing objects for which predetermined surface effects are designated by the user at values in accordance with the types of the surface effects, based on the density value select table illustrated in FIG. 9. For example, the user issues instructions to give "PG" to the region displayed as "ABC", "G" to the rectangular region, and "M" to the round region in the target image as color plane image data illustrated in FIG. 2. In this case, the plane data generating unit 122 sets the density value of the drawing object ("ABC") for which "PG" is designated by the user at "98%", the density value of the drawing object ("the rectangle") for which "G" is designated by the user at "90%", and the density value of the drawing object ("the round") for which "M" is designated by the user at "16%", to generate gloss control plane image data. The gloss control plane image data generated by the plane data generating unit 122 is data in a vector form expressed as the coordinates of dots, the parameters of the equations of lines and planes connecting those dots, and a set of drawing objects indicating fills, special effects, and the like. FIG. 4 is a diagram illustrating an image of the gloss control plane image data. The plane data generating unit 122 generates document data by combining the gloss control plane image data, the image data of the target image (the color plane image data), and the clear plane image data, and transfers the document data to the print data generating unit 123.

Based on the document data, the print data generating unit 123 generates print data. The print data contains the image data of the target image (the color plane image data), the gloss control plane image data, the clear plane image data, and a job command designating a printer setting, an aggregate setting, a double-side setting, or the like. FIG. 10 is a schematic view conceptually illustrating an example structure of the print data. In the example illustrated in FIG. 10, a JDF (Job Definition Format) is used as a job command, but the present invention is not limited to that. The JDF illustrated in FIG. 10 is a command designating "one-side printing with stapling" as an aggregate setting. The print data may be converted into a page description language (PDL) such as PostScript, or may remain in the PDF format if the DFE 50 is compatible with the PDF format.

Figure 11:
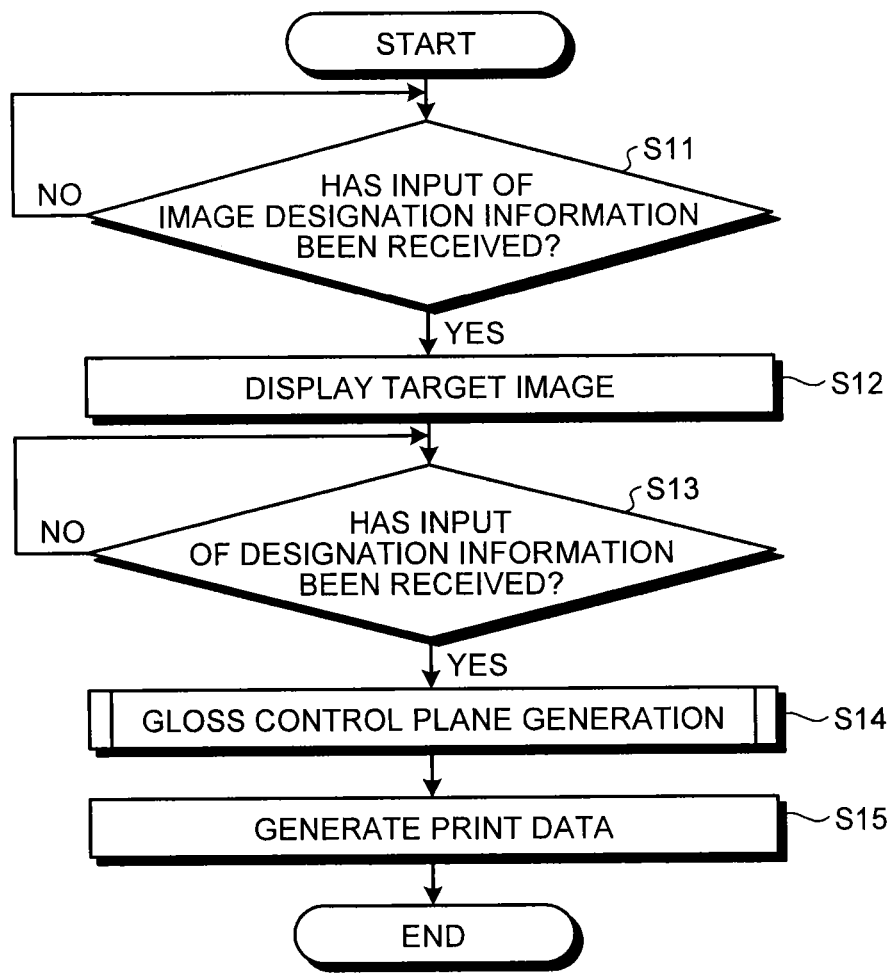
FIG. 11 is a flowchart illustrating the procedures in a print data generating operation by the host device of the first embodiment.

Next, a print data generating operation by the host device 10 having the above described structure is described. FIG. 11 is a flowchart illustrating the procedures in a print data generating operation by the host device 10 of the first embodiment. In the example operation described below, there is no designation of a transparent image, and therefore, no clear plane image data is generated.

First, when the input control unit 124 receives an input of image designation information (YES in step S11), the display control unit 121 controls the display unit 14 to display the image designated by the received image designation information (step S12). When the input control unit 124 receives an input of surface effect designation information (YES in step S13), the plane data generating unit 122 generates gloss control plane image data, based on the received designation information (step S14).

Figure 12:
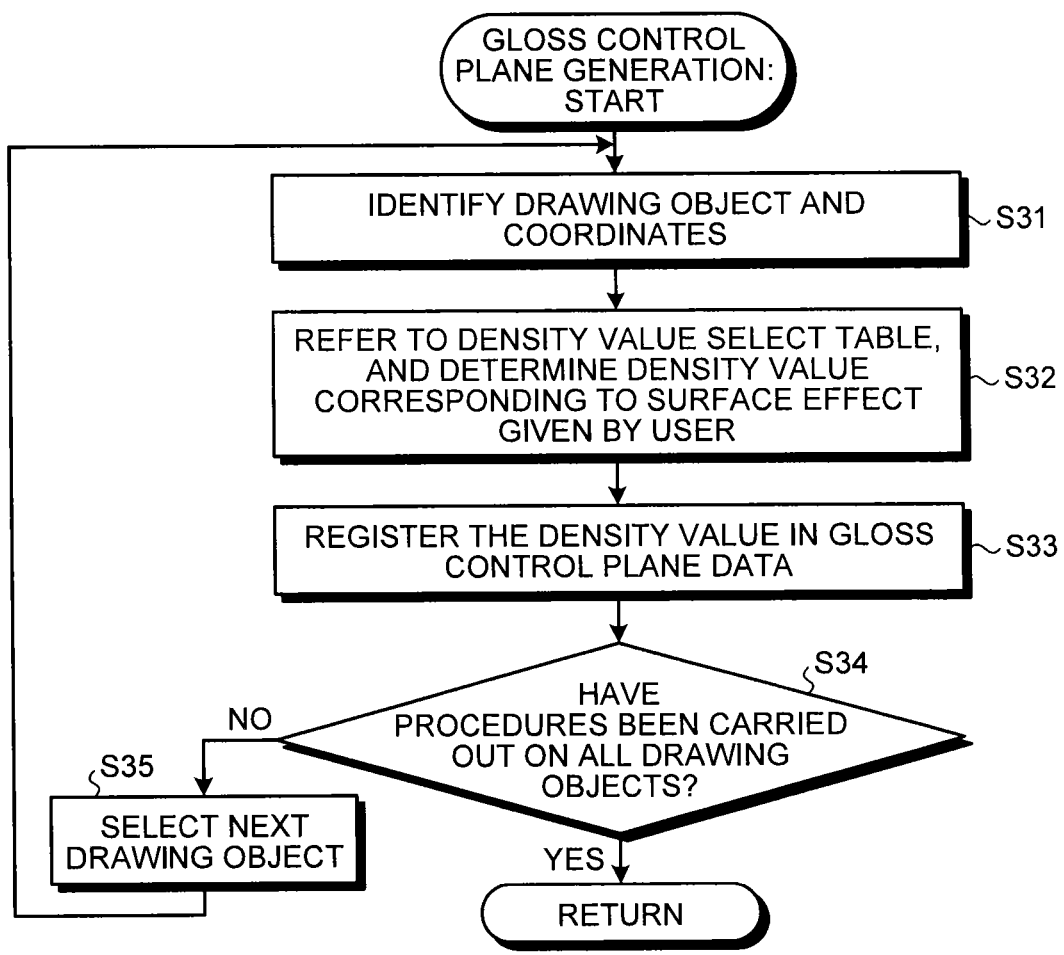
FIG. 12 is a flowchart illustrating the procedures in a gloss control plane generating operation.

The gloss control plane generating operation in step S14 is now described in detail. FIG. 12 is a flowchart illustrating the procedures in the gloss control plane generating operation. First, based on the designation information, the plane data generating unit 122 identifies the drawing object to which a surface effect is given in the target image, and the coordinates thereof (step S31). The drawing object and the coordinates thereof are identified by using a drawing command provided by the operating system or the like when the image processing unit 120 draws the drawing object in the target image, the coordinate values set by the drawing command, and the like.

The plane data generating unit 122 then refers to the density value select table stored in the storage unit 12, and determines the density value as the gloss control value corresponding to the type of the surface effect given by the user through the designation information (step S32).

The plane data generating unit 122 associates the gloss control plane image data (empty data at first) with the drawing object and the density value determined in accordance with the type of the surface effect, and registers the data (step S33).

The plane data generating unit 122 then determines whether the procedures of step S31 through S33 have been carried out on all the drawing objects existing in the target image (step S34). In a case where the procedures have not been carried out on all the drawing objects (No in step S34), the plane data generating unit 122 selects the next drawing object yet to be processed in the target image (step S35), and the procedures of steps S31 through S33 are repeated.

Figure 8:
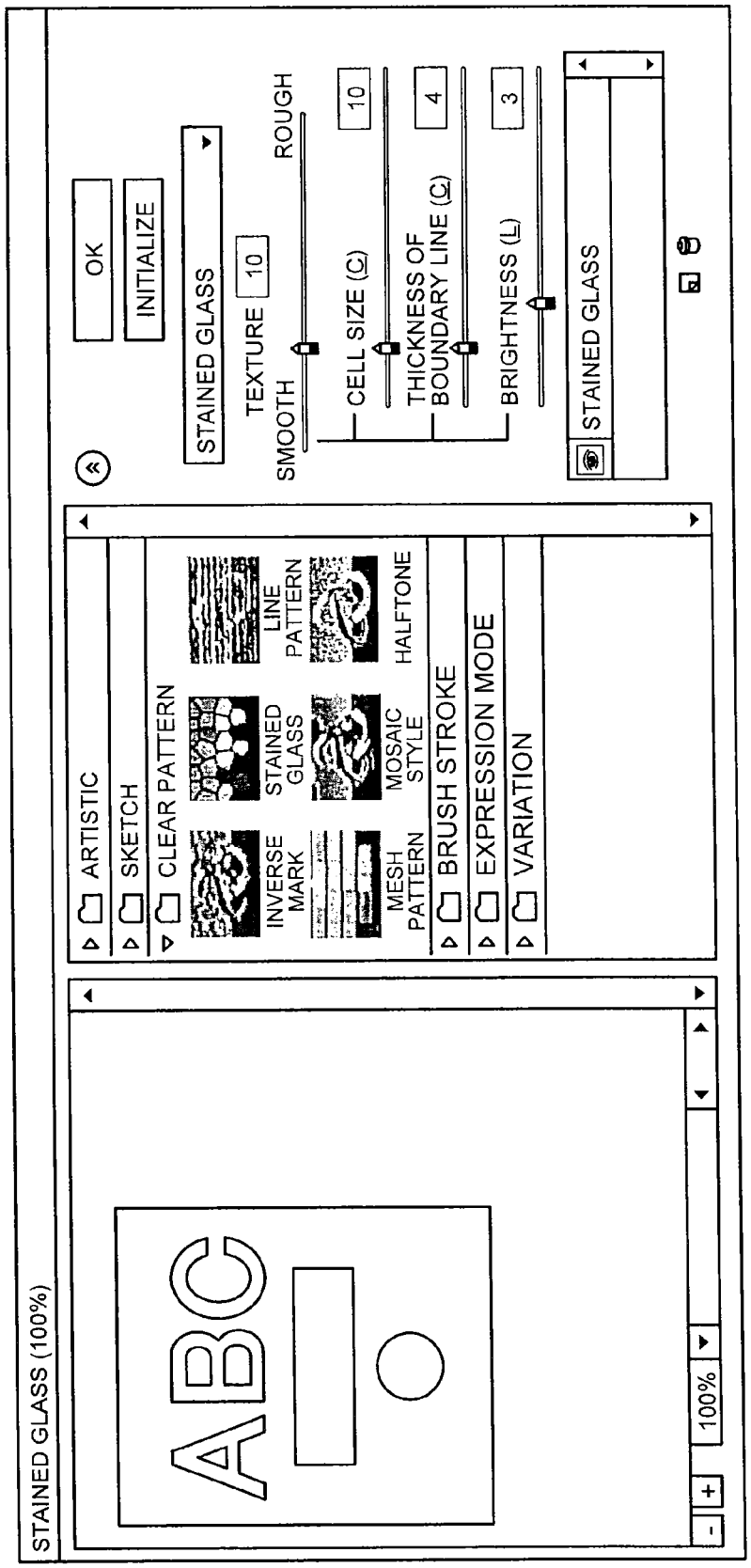
FIG. 8 is a diagram illustrating another example screen displayed by the image processing application.
Figures 13, 14:
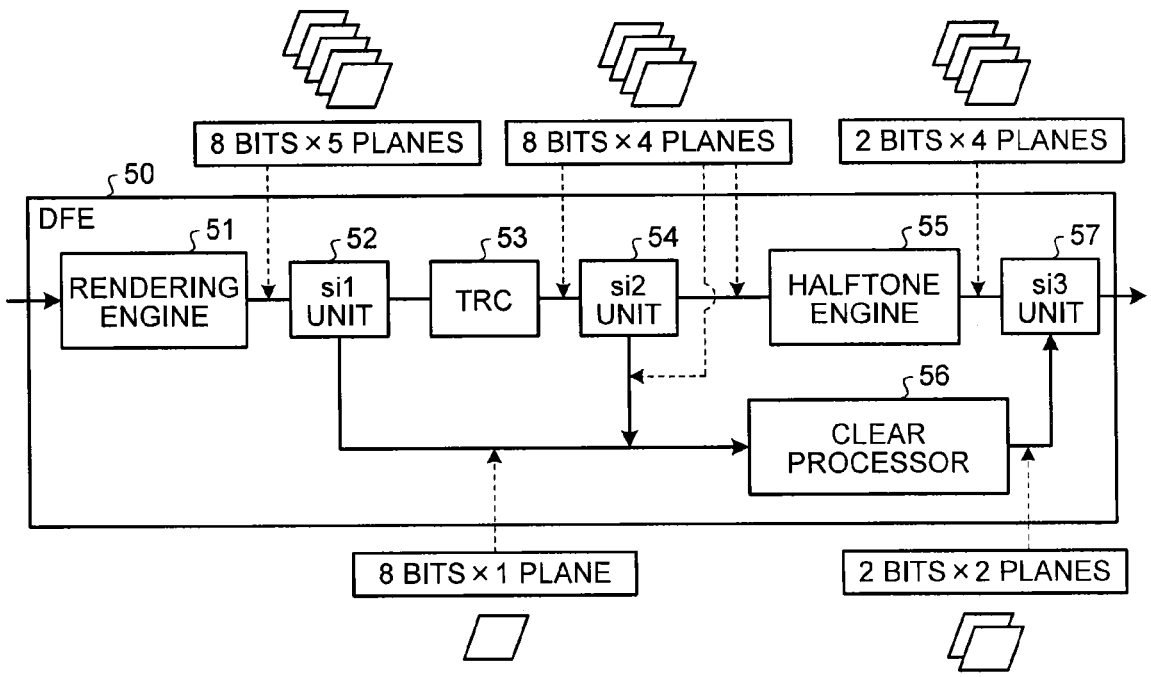
FIG. 13 is a diagram illustrating the correspondence relationships among drawing objects, coordinates, and density values in the gloss control plane image data illustrated in FIG. 4.
FIG. 14 is a diagram illustrating an example functional structure of the DFE.

In a case where it is determined in step S34 that the procedures of steps S31 through S33 have been carried out on all the drawing objects in the target image (Yes in step S34), the plane data generating unit 122 ends the generation of the gloss control plane. In this manner, the gloss control plane image data illustrated in FIG. 8 is generated. FIG. 13 is a diagram illustrating the correspondence relationships among drawing objects, coordinates, and density values in the gloss control plane image data illustrated in FIG. 8.

Referring back to FIG. 11, after generating the gloss control plane image data, the plane data generating unit 122 generates document data by combining the gloss control plane image data and the image data of the target image, and transfers the document data to the print data generating unit 123. Based on the document data, the print data generating unit 123 generates print data (step S15). The print data is generated in the above manner.

Next, the functional structure of the DFE 50 is described. As illustrated in FIG. 14, the DFE 50 includes a rendering engine 51, a si1 unit 52, a TRC (Tone Reproduction Curve) 53, a si2 unit 54, a halftone engine 55, a clear processor 56, a si3 unit 57, and a surface effect select table (not illustrated). The rendering engine 51, the si1 unit 52, the TRC (Tone Reproduction Curve) 53, the si2 unit 54, the halftone engine 55, the clear processor 56, and the si3 unit 57 are realized by the control unit of the DFE 50 executing various kinds of programs stored in the main storage unit or an auxiliary storage unit. The si1 unit 52, the si2 unit 54, and the si3 unit 57 each have a function to separate image data and a function to integrate image data. The surface effect select table is stored in an auxiliary storage unit, for example.

Image data transmitted from the host device 10 (the print data illustrated in FIG. 10, for example) is input to the rendering engine 51. The rendering engine 51 linguistically renders the input image data, and converts the image data expressed in the vector form into a raster form. The rendering engine 51 also converts the color space expressed in RGB into a CMYK color space, to output 8-bit image data of each of the CMYK color planes and an 8-bit gloss control plane. The si1 unit 52 outputs the respective 8-bit image data of CMYK to the TRC 53, and outputs the 8-bit gloss control plane to the clear processor 56. Here, the DFE 50 converts the gloss control plane image data in the vector form output from the host device 10. As a result, the DFE 50 sets a type of surface effect for the drawing object designated by the user using the image processing application as the density value on the pixel basis, and outputs gloss control plane image data.

The respective 8-bit image data of CMYK are input to the TRC 53 via the si1 unit 52. The TRC 53 performs a gamma correction on the input image data with a 1D_LUT gamma curve generated through calibration. The image processing includes restricting the total amount of toner, other than the gamma correction. Restricting the total amount is to limit the respective 8-bit image data of CMYK after the gamma correction, since there is a limit to the amount of toner that can be provided on one pixel on a recording medium by the printer unit 70. If printing is performed with a larger amount than the limit of the total amount, image quality is degraded due to defective transfers or defective fixing. In this embodiment, only the relevant gamma correction is described.

The si2 unit 54 outputs the respective 8-bit image data of CMYK subjected to the gamma correction at the TRC 53, as the data for generating an inverse mask (described later), to the clear processor 56. The respective 8-bit image data of CMYK subjected to the gamma correction are input to the halftone engine 55 via the si2 unit 54. The halftone engine 55 performs halftone processing to convert input image data into an image data format that includes two bits of each of CMYK, for example, so as to output the input image data to the printer unit 70. The image data formed with two bits of each of CMYK subjected to the halftone processing is output. The two bits each is merely an example, and the present invention is not limited to that.

The 8-bit gloss control plane converted by the rendering engine 51 is input to the clear processor 56 via the si1 unit 52, and the respective 8-bit image data of CMYK subjected to the gamma correction performed by the TRC 53 are input to the clear processor 56 via the si2 unit 54. Using the input gloss control plane, the clear processor 56 refers to the later described surface effect select table, and determines the surface effects (pixel values) corresponding to the density values (pixel values) represented by the respective pixels forming the gloss control plane. In accordance with the determination results, the clear processor 56 determines whether to switch on or off the glosser 80, and generates an inverse mask or a solid mask, where necessary, by using the respective input 8-bit image data of CMYK. By doing so, the clear processor 56 generates 2-bit clear toner plane image data for applying the clear toner, where appropriate. In accordance with the results of the surface effect determination, the clear processor 56 generates the clear toner plane image data to be used at the printer unit 70, and the clear toner plane image data to be used at the low-temperature fixing unit 90, where appropriate, and outputs those image data. The clear processor 56 also outputs the on/off information indicating switching on or off of the glosser 80.

Here, an inverse mask is used for making the total amount of the CMYK toners and the clear toner uniform on the respective pixels forming the target region to which a surface effect is to be given. Specifically, in the image data of the CMYK planes, all the density values represented by the pixels forming the target region are added up, and the image data obtained by subtracting the sum from a predetermined value serves as the inverse mask. The above described inverse mask 1 is expressed by the following equation (1), for example.

$$Clr=100-(C+M+Y+K) \text{ However, where } Clr<0, Clr=0 \quad (1)$$

In the equation (1), Clr, C, M, Y, and K represent the density rates converted from the density values at the respective pixels with respect to the clear toner and the respective toners of C, M, Y, and K. That is, according to the equation (1), the total application amount obtained by adding the application amount of the clear toner to the total application amount of the respective toners of C, M, Y, and K is made 100% for all the pixels forming the target region to which the surface effect is to be given. In a case where the total application amount of the respective toners of C, M, Y, and K is 100% or more, the clear toner is not applied, and the density rate thereof is made 0%. This is because each portion in which the total amount of the respective toners of C, M, Y, and K exceeds 100% is smoothed by a fixing operation. As described above, as the total application amount on all the pixels forming the target region to which a surface effect is to be given is made 100% or more, surface unevenness formed by variations in the total application amount of toners in the target region is eliminated, and as a result, gloss is achieved by virtue of regular reflection of light. However, there are inverse masks that can be obtained by equations other than the equation (1), and several types of inverse masks may exist.

For example, an inverse mask may be used for uniformly applying the clear toner to the respective pixels. The inverse mask in this case is also called a solid mask, which is expressed by the following equation (2):

$$Clr=100 \quad (2)$$

Among the target pixels to which a surface effect is to be given, there may be pixels associated with density rates other than 100%, and there may be several solid mask patterns.

Also, an inverse mask may be determined by multiplying the exposed surface ratios of the respective colors. The inverse mask in this case is expressed by the following equation (3), for example:

$$Clr=100\times\{(100-C)/100\}\times\{(100-M)/100\}\times \\ \{(100-Y)/100\}\times\{(100-K)/100\} \quad (3)$$

In the above equation (3), (100−C)/100 represents the exposed surface ratio of C, (100−M)/100 represents the exposed surface ratio of M, (100−Y)/100 represents the exposed surface ratio of Y, and (100−K)/100 represents the exposed surface ratio of K.

Also, an inverse mask may be determined by a method based on an assumption that smoothness depends on the halftone dots having the maximum area ratio, for example. The inverse mask in this case is expressed by the following equation (4), for example:

$$Clr = 100 - \max(C, M, Y, K) \quad (4)$$

In the above equation 4, max(C, M, Y, K) indicates that the density value of the color having the largest density value among CMYK serves as the representative value.

In short, any inverse mask expressed by one of the above equations (1) through (4) can be used.

The surface effect select table is a table that shows the correspondence relationships between the density values as the gloss control values indicating surface effects and the types of the surface effects, and also shows the correspondence relationships among the control information about the postprocessor in accordance with the structure of the image forming system, the clear toner plane image data to be used at the printer unit 70, and the clear toner plane image data to be used at the postprocessor. The image forming system may have various kinds of structures, but, in this embodiment, the glosser 80 and the low-temperature fixing unit 90 are connected as the postprocessor to the printer unit 70. Therefore, the control information about the postprocessor in accordance with the structure of the image forming system is the on/off information indicating switching on or off of the glosser 80. The clear toner plane image data to be used at the postprocessor may be the clear toner plane image data to be used at the low-temperature fixing unit 90. FIG. 15 is a diagram illustrating an example data structure of the surface effect select table. The surface effect select table may be designed to show the correspondence relationships among the control information about the postprocessor, the image data of a clear toner plane 1 to be used at the printer unit 70, the image data of a clear toner plane 2 to be used at the postprocessor, the density values, and the types of surface effects, for respective image forming system structures. However, FIG. 15 illustrates an example data structure in accordance with the structure of the image forming system according to this embodiment. In the correspondence relationships between the types of surface effects and the density values illustrated in this drawing, one type of surface effect is associated with one density value range. Also, the respective types of surface effects are associated, by the 2%, with the density proportions (the density rates) calculated from the values representing the ranges of density values (representative values). Specifically, surface effects to provide gloss (mirror surface effects and solid effects) are associated with the density value ranges ("212" to "255") having density rates of 84% and higher, and surface effects to reduce gloss (halftone matte and matte) are associated with the density value ranges ("1" to "43") having density rates of 16% and lower. Meanwhile, surface effects such as textures and surface pattern watermarks are associated with the density value ranges having density rates of 20% to 80%.

More specifically, mirror gloss (PM: Premium Gloss) is associated as a surface effect with the pixel values of "238" to "255". Among those values, different types of mirror gloss are associated with the following three pixel value ranges: the pixel values of "238" to "242", the pixel values of "243" to "247", and the pixel values of "248" to "255". Solid gloss "G: Gloss" is associated with the pixel values of "212" to "232". Among those pixel values, different types of solid gloss are associated with the following four pixel value ranges: the pixel values of "212" to "216", the pixel values of "217" to "221", the pixel values of "222" to "227", and the pixel values of "228" to "232". Meanwhile, halftone matte (M: Matte) is associated with the pixel values "23" to "43". Among those pixel values, different types of halftone matte are associated with the following four pixel value ranges: the pixel values of "23" to "28", the pixel values of "29" to "33", the pixel values of "34" to "38", and the pixel values of "39" to "43". Matte (PM: Premium Matte) is associated with the pixel values of "1" to "17". Among those pixel values, different types of matte are associated with the following three pixel value ranges: the pixel values of "1" to "7", the pixel values of "8" to "12", and the pixel values of "13" to "17". As for the different types of the same surface effect, different equations are used to obtain the clear toner plane image data to be used at the printer unit 70 and the low-temperature fixing unit 90, and the operations to be performed by the printer main unit and the postprocessor are the same. It should be noted that giving no surface effects is associated with the density value of "0".

In FIG. 15, the pixel values and the types of surface effects are associated with the contents of the on/off information indicating switching on or off of the glosser 80, and the contents of the image data of the clear toner plane 1 (Clr-1 illustrated in FIG. 1) to be used at the printer unit 70, and the contents of the image data of the clear toner plane 2 to be used at the low-temperature fixing unit 90. For example, in a case where the surface effect is mirror gloss, the table shows that the glosser 80 is to be switched on, the image data of the clear toner plane 1 to be used at the printer unit 70 indicates an inverse mask, and the image data of the clear toner plane 2 (Clr-2 illustrated in FIG. 1) to be used at the low-temperature fixing unit 90 does not exist. The inverse mask is determined according to the above described equation (1), for example. In the example illustrated in FIG. 15, the region in which a mirror surface effect is designated as a surface effect is equivalent to the entire region specified by image data. An example case where the region in which a mirror surface effect is designated as a surface effect is equivalent to part of the region specified by image data will be described later.

In a case where the density value is in the range of "228" to "232", and the surface effect is solid gloss, the table indicates that the glosser 80 is to be switched off, the image data of the clear toner plane 1 to be used at the printer unit 70 indicates the inverse mask 1, and the image data of the clear toner plane 2 to be used at the low-temperature fixing unit 90 does not exist. It should be noted that the inverse mask 1 is expressed by one of the above equations (1) through (4). Since the glosser 80 is in an off state, there are variations in the total application amount of toners, and the surface unevenness becomes greater than that with mirror gloss. As a result, solid gloss with a lower gloss level than mirror gloss is achieved. In a case where the surface effect is halftone matte, the table indicates that the glosser 80 is to be switched off, the image data of the clear toner plane 1 to be used at the printer unit 70 indicates halftone (dots), and the image data of the clear toner plane 2 to be used at the low-temperature fixing unit 90 does not exist. In a case where the surface effect is matte, the table indicates that the glosser 80 may be either switched on or switched off, the image data of the clear toner plane 1 to be used at the printer unit 70 does not exist, and the image data of the clear toner plane 2 to be used at the low-temperature fixing unit 90 indicates a solid mask. The solid mask is determined according to the above described equation (2), for example.

The clear processor 56 refers to the above described surface effect select table, to determine the surface effects associated with the respective pixel values indicated by the gloss control plane, determine whether to switch on or off the glosser 80, and determine which clear toner plane image data is to be used at the printer unit 70 and the low-temperature fixing unit 90. The clear processor 56 determines whether to switch on or off the glosser 80 page by page. As described above, the clear processor 56 generates and outputs clear toner plane image data in accordance with the results of the determination where appropriate, and outputs the on/off information about the glosser 80.

The si3 unit 57 integrates the respective 2-bit image data of CMKY subjected to the halftone processing and the 2-bit clear toner plane image data generated by the clear processor 56, and outputs the integrated image data to the MIC 60. There are cases where the clear processor 56 does not generate at least one of the clear toner plane image data to be used at the printer unit 70 and the clear toner plane image data to be used at the low-temperature fixing unit 90. Therefore, the clear toner plane image data generated by the clear processor 56 is integrated by the si3 unit 57. In a case where the clear processor 56 generates neither of the clear toner plane image data, the si3 unit 57 outputs image data obtained by integrating the respective two-bit image data of CMYK. As a result, four to six two-bit pieces of image data are transmitted from the DFE 50 to the MIC 60. The si3 unit 57 also outputs the on/off information about the glosser 80 output from the clear processor 56, to the MIC 60.

Figure 16:
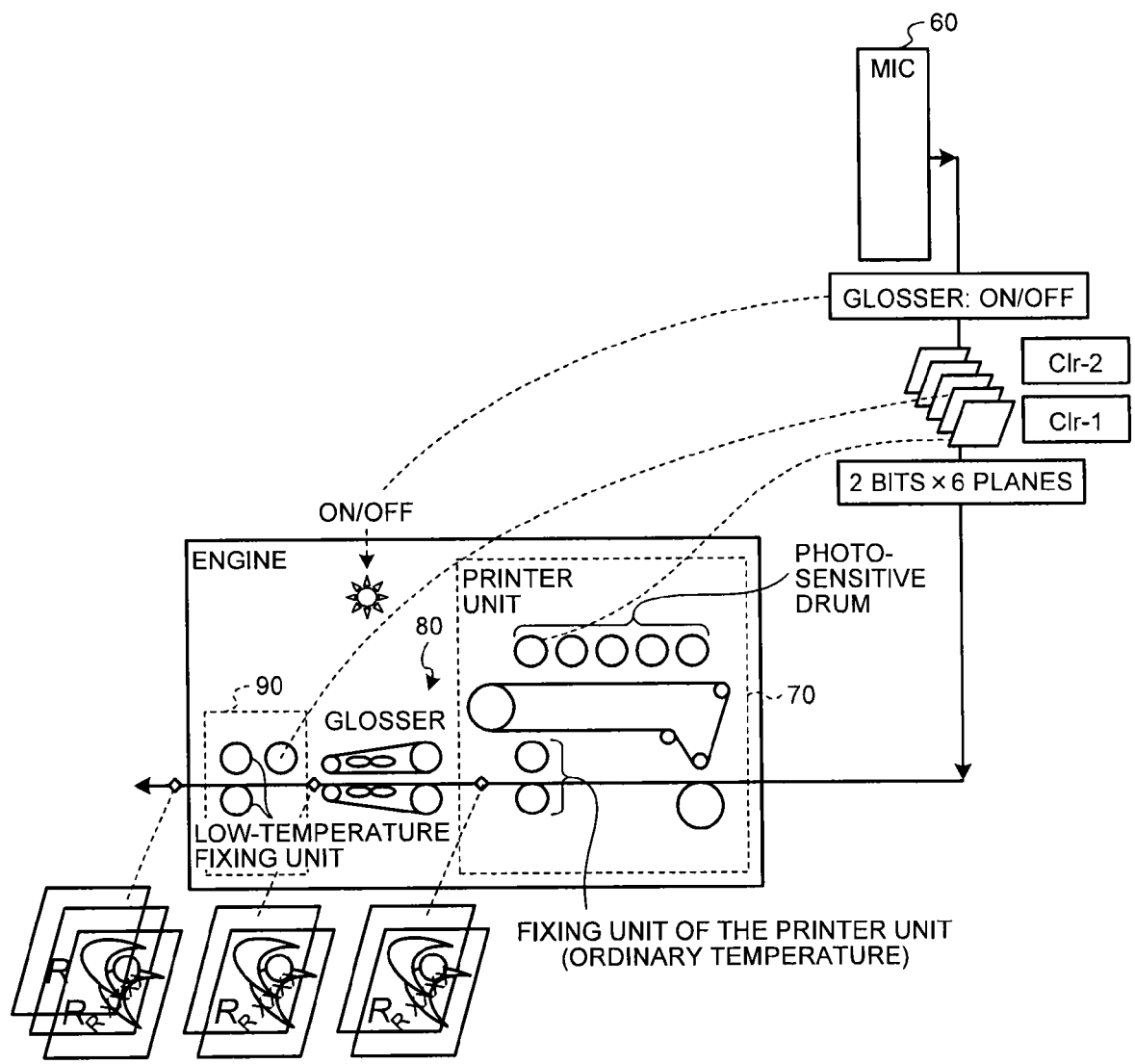
FIG. 16 is a diagram conceptually illustrating an example structure of the MIC.

The MIC 60 is connected to the DFE 50 and the printer unit 70, and receives the image data of color planes and the image data of the clear toner plane from the DFE 50. The image data is distributed to the devices corresponding to respective pieces of the image data, to control the postprocessor. More specifically, as illustrated in FIG. 16, the MIC 60 outputs the CMYK color plane image data among the image data output from the DFE 50, to the printer unit 70. In a case where there is the clear toner plane image data to be used at the printer unit 70, the clear toner plane image data is also output to the printer unit 70. Using the on/off information output from the DFE 50, the MIC 60 switches on or off the glosser 80. In a case where there is the clear toner plane image data to be used at the low-temperature fixing unit 90, the MIC 60 outputs the clear toner plane image data to the low-temperature fixing unit 90. The glosser 80 may switch between a path for performing fixing and a path for not performing fixing, based on the on/off information. Depending on the existence of clear toner plane image data, the low-temperature fixing unit 90 may switch on or off, and may switch paths in the same manner as the glosser 80.

Figure 17:
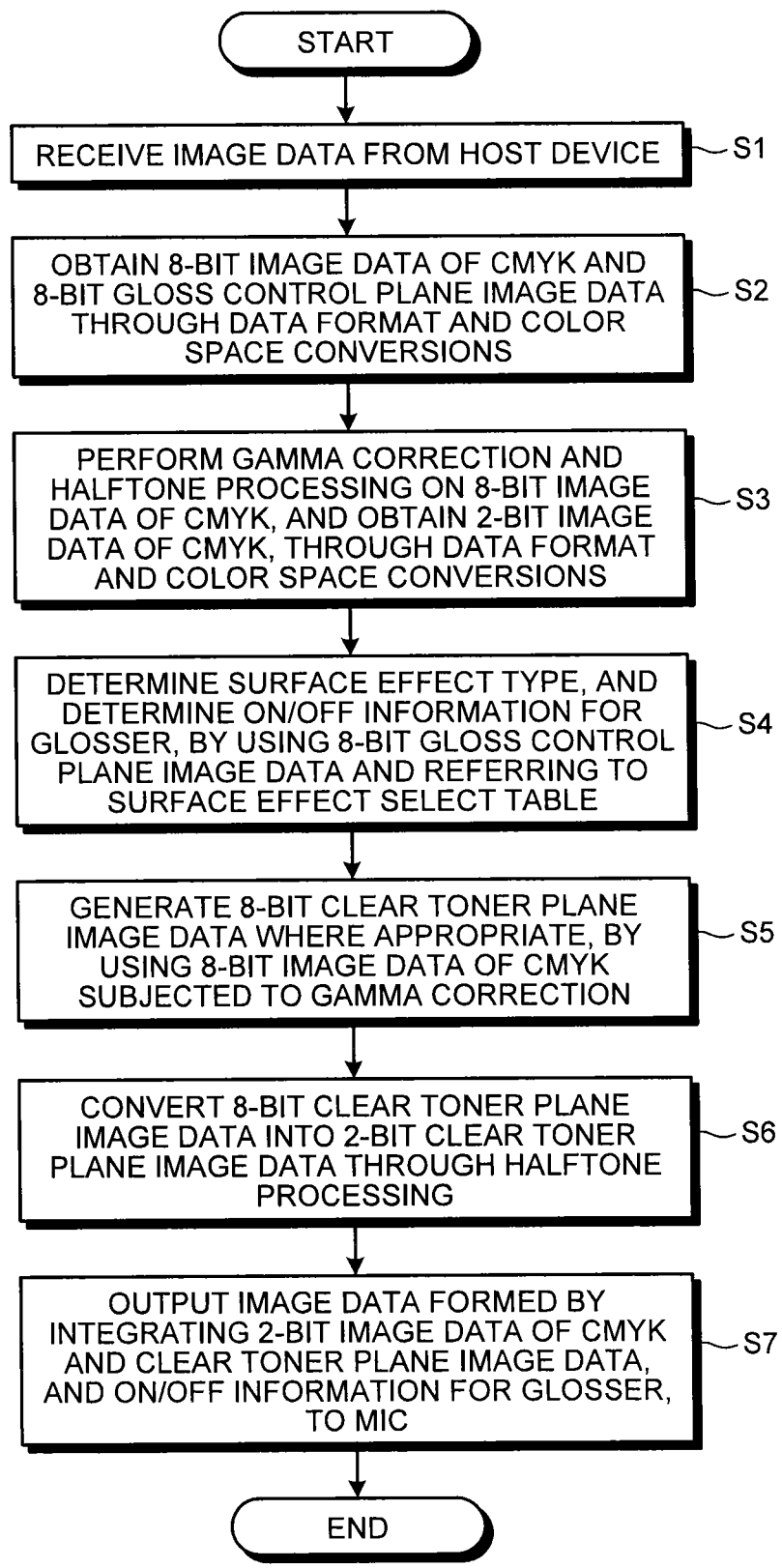
FIG. 17 is a flowchart illustrating the procedures in a gloss control operation to be performed by the image forming system.

Referring now to FIG. 17, the procedures in a gloss control operation to be performed by the image forming system according to this embodiment are described. When the DFE 50 receives image data from the host device 10 (step S1), the rendering engine 51 linguistically renders the received image data, and converts the image data expressed in the vector form into a raster form. The rendering engine 51 also converts the color space expressed in the RGB format into a CMYK color space, to obtain 8-bit image data of each of the CMYK color planes and an 8-bit gloss control plane (step S2).

Figure 18:
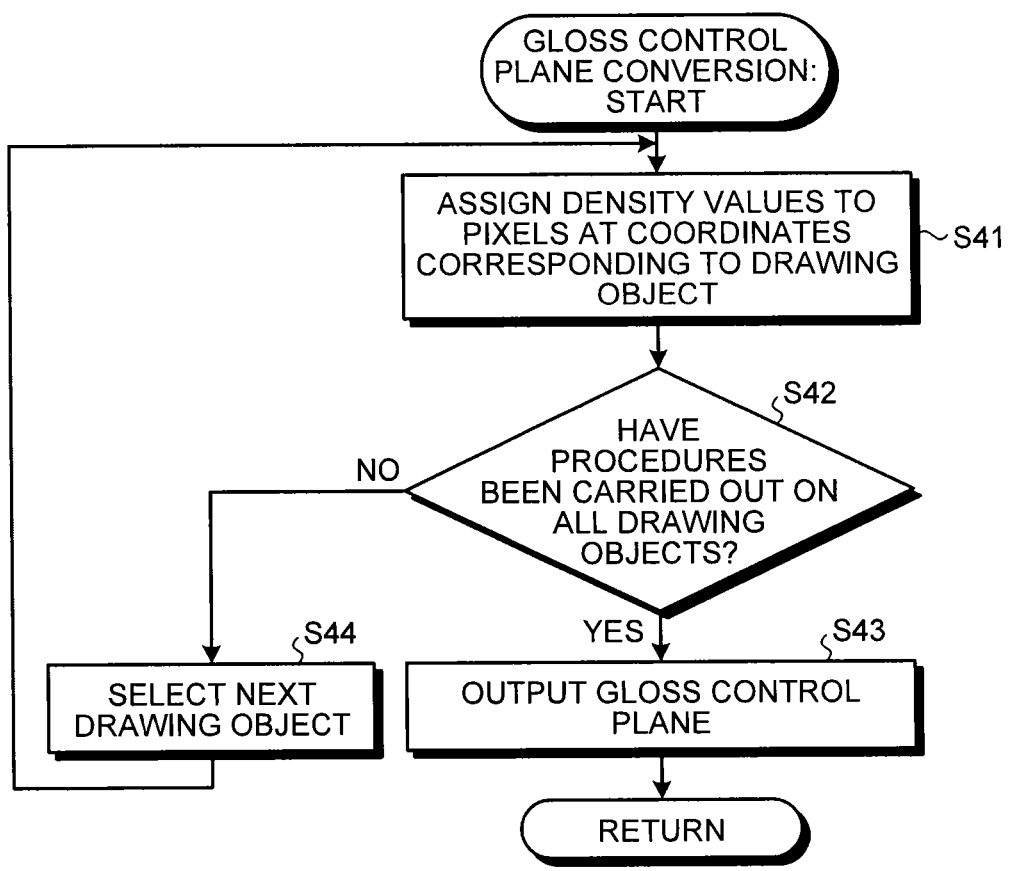
FIG. 18 is a flowchart illustrating the procedures in a gloss control plane image data converting operation.

The gloss control plane image data converting operation in step S2 is now described in detail. FIG. 18 is a flowchart illustrating the procedures in the gloss control plane image data converting operation. In this converting operation, the gloss control plane image data illustrated in FIG. 8, or the gloss control plane image data having density values designated for specifying surface effects for the respective drawing objects as illustrated in FIG. 13 is converted into gloss control plane image data having density values designated for the respective pixels forming the drawing objects.

The rendering engine 51 gives the density value set for a drawing object to the pixels in the coordinate range corresponding to the drawing object in the gloss control plane illustrated in FIG. 13 (step S41), to convert the gloss control plane image data. A check is then made to determine whether such a procedure has been carried out on all the drawing objects existing in the gloss control plane image data (step S42).

In a case where the procedure has not been carried out on all the drawing objects (No in step S42), the rendering engine 51 selects the next unprocessed drawing object from the gloss control plane image data (step S44), and the procedure of step S41 is repeated.

In a case where it is determined in step S42 that the procedure of step S41 has been carried out on all the drawing objects in the gloss control plane image data (Yes in step S42), the converted gloss control plane image data is output (step S43). Through the above operation, the gloss control plane image data is converted into data having surface effects set for the respective pixels.

Referring back to FIG. 17, when the 8-bit gloss control plane image data is output, the TRC 53 of the DFE 50 performs a gamma correction on the respective 8-bit image data of the CMYK color planes with a 1D_LUT gamma curve generated through calibration, and the halftone engine 55 performs halftone processing to convert the image data subjected to the gamma correction into 2-bit image data of each of CMYK to be output to the printer unit 70. Thus, the respective 2-bit image data of CMYK subjected to the halftone processing are obtained (step S3).

Using the 8-bit gloss control plane, the clear processor 56 of the DFE 50 refers to the surface effect select table, and determines the surface effects designated for the respective pixel values indicated by the gloss control plane. The clear processor 56 performs such a check on all the pixels constituting the gloss control plane. In the gloss control plane, all the pixels constituting regions to which a certain surface effect is to be given basically indicate density values within one range. Therefore, as for pixels located in the vicinity of pixels determined to be given a surface effect, the clear processor 56 determines those pixels to be included in the regions to which the same surface effect is to be given. In this manner, the clear processor 56 determines a region to which a surface effect is to be given, and the type of the surface effect to be given to the region. In accordance with the determination results, the clear processor 56 determines whether to switch on or off the glosser 80 (step S4).

Using the respective 8-bit image data of CMYK subjected to the gamma correction, the clear processor 56 of the DFE 50 generates 8-bit clear toner plane image data for applying the clear toner, where appropriate (step S5). The clear processor 56 then performs a gamma correction on the 8-bit clear toner plane image data with a gamma curve generated through the later described calibration, and performs halftone processing on the image data subjected to the gamma correction, to obtain 2-bit clear toner plane image data (step S6). This procedure will be described later in detail.

The si3 unit 57 of the DFE 50 then integrates the respective 2-bit image data of CMYK subjected to the halftone processing in step S3 and the 2-bit clear toner plane image data generated in step S6, and outputs the integrated image data and the on/off information indicating the switching on or off of the glosser 80 determined in step S4, to the MIC 60 (step S7).

In a case where the clear processor 56 has not generated clear toner plane image data in step S5, only the respective 2-bit image data of CMYK subjected to the halftone processing in step S3 are integrated and output to the MIC 60 in step S7.

Specific examples in accordance with types of surface effects are now described. The respective types of mirror gloss and solid gloss for giving gloss, and halftone matte and matte for reducing gloss are described in detail. Also, cases where one type of surface effect is designated in one page are described herein. In step S4, the clear processor 56 of the DFE 50 determines that the surface effect designated for the pixels having the density values of "238" to "255" is mirror gloss, by using the density values indicated by the respective pixels of the 8-bit gloss control plane, and referring to the surface effect select table illustrated as an example in FIG. 15. In this case, the clear processor 56 of the DFE 50 further determines whether the region in which mirror gloss is designated as the surface effect is equivalent to the entire region specified by the image data. In a case where the determination result is positive, the clear processor 56 of the DFE 50 generates an inverse mask according to the equation (1), for example, by using the image data corresponding to the region in the respective 8-bit image data of CMYK subjected to the gamma correction. The inverse mask represents the clear toner plane image data to be used at the printer unit 70. Since clear toner plane image data is not to be used at the low-temperature fixing unit 90 for this region, the DFE 50 does not generate the clear toner plane image data to be used at the low-temperature fixing unit 90. In step S7, the si3 unit 57 of the DFE 50 integrates the clear toner plane image data to be used at the printer unit 70 and the respective 2-bit image data of CMYK subjected to the halftone processing and obtained in step S3, and outputs the integrated image data and the on/off information indicating switching on of the glosser 80 to the MIC 60. The MIC 60 outputs the CMYK color plane image data and the clear toner plane image data to be used at the printer unit 70, which are the image data output from the DFE 50, to the printer unit 70. Using the on/off information output from the DFE 50, the MIC 60 switches on the glosser 80. Using the CMYK color plane image data and the clear toner plane image data output from the MIC 60, the printer unit 70 emits light beams from the exposing unit, forms toner images on the photosensitive element in accordance with the respective toners, transfers the toner images onto a transfer paper sheet, and fixes the images on the transfer paper sheet by heating and pressing at an ordinary temperature. In this manner, the clear toner as well as the CMYK toners is applied onto the transfer paper sheet, and an image is formed. After that, the glosser 80 presses the transfer paper sheet at a high temperature and a high pressure. Since clear toner plane image data has not been output to the low-temperature fixing unit 90, the clear toner is not applied at the low-temperature fixing unit 90, and the transfer paper sheet is discharged. As a result, the total application amount of the respective toners of CMYK and the clear toner is uniformly compressed in the entire region specified by the image data. Accordingly, the surface of the region achieves a high gloss level.

In a case where the region in which mirror gloss is designated as the surface effect is equivalent to part of the region specified by the image data, on the other hand, the following situations might be caused. First, clear toner plane image data indicating the above described inverse mask is used in the region in which mirror gloss is designated. In a case where the total application amount of the CMYK toners is set at a value equal to or larger than a predetermined value for all the other pixels, however, pressing performed by the glosser 80 leads to a uniform total application amount of the respective toners of CMYK and the clear toner in the region in which mirror gloss is designated and in the regions in which the total application amount of the CMYK toners is set at a value equal to or larger than the predetermined value.

For example, in a case where the total application amount of the CMYK toners is set at a value equal to or larger than the predetermined value for all the pixels forming the region specified by the image data, the results are the same as those of the case where mirror gloss is designated for the entire region specified by the image data.

Therefore, in a case where the region in which mirror gloss is designated as the surface effect is equivalent to part of the region specified by the image data, the DFE 50 generates the same clear toner plane image data as that in a case where mirror gloss is designated for the entire region specified by the image data, and, after the clear toner is applied onto a transfer paper sheet, pressing is performed by the glosser 80. To give the matte surface effect to the regions other than the region in which a mirror surface effect is designated as the surface effect on the transfer paper sheet pressed by the glosser 80, the clear toner plane image data to be used at the low-temperature fixing unit 90 is generated.

Specifically, the DFE 50 generates the inverse mask according to the equation (1) as the clear toner plane image data to be used at the printer unit 70, as described above. The DFE 50 further generates a solid mask according to the equation (2) for the regions other than the region in which a mirror surface effect is designated as the surface effect. The solid mask generated here serves as the clear toner plane image data to be used at the low-temperature fixing unit 90. In step S7, the si3 unit 57 of the DFE 50 integrates the clear toner plane image data to be used at the printer unit 70, the clear toner plane image data to be used at the low-temperature fixing unit 90, and the respective 2-bit image data of CMYK subjected to the halftone processing and obtained in step S3, and outputs the integrated image data and the on/off information indicating switching on of the glosser 80 to the MIC 60.

The MIC 60 outputs the CMYK color plane image data and the clear toner plane image data to be used at the printer unit 70 among the image data output from the DFE 50, to the printer unit 70. Using the on/off information output from the DFE 50, the MIC 60 switches on the glosser 80, and outputs the clear toner plane image data to be used at the low-temperature fixing unit 90 among the image data output from the DFE 50, to the low-temperature fixing unit 90. Using the CMYK color plane image data and the clear toner plane image data output from the MIC 60, the printer unit 70 forms an image by applying the CMYK toners and the clear toner onto a transfer paper sheet. After that, the glosser 80 presses the transfer paper sheet at a high temperature and a high pressure. Using the clear toner plane image data output from the MIC 60, the low-temperature fixing unit 90 forms a toner image with the clear toner. The low-temperature fixing unit 90 then superimposes the toner image onto the transfer paper sheet that has passed through the glosser 80, and fixes the image onto the transfer paper sheet by heating and pressing at a low temperature. As a result, the total application amount of the respective toners of CMYK and the clear toner is uniformly compressed in the entire region in which mirror gloss is designated. Accordingly, the surface of the region achieves a high gloss level. In the regions other than the region in which mirror gloss is designated, on the other hand, surface unevenness appears due to the application of the clear toner through the solid mask after the pressing by the glosser 80, and the gloss level of the surfaces of those regions is lowered.

Also, in step S4, the clear processor 56 of the DFE 50 determines that the surface effect designated for the pixels having the density values of "212" to "232" is solid gloss, by using the density values indicated by the respective pixels of the 8-bit gloss control plane, and referring to the surface effect select table. Particularly, as for the pixels having the density values of "228" to "232", the clear processor 56 determines the surface effect to be Gloss Type 1. In this case, the clear processor 56 of the DFE 50 generates the inverse mask 1, using the image data corresponding to the region in the respective 8-bit image data of CMYK subjected to the gamma correction. The inverse mask 1 represents the clear toner plane image data to be used at the printer unit 70. Since clear toner plane image data is not to be used at the low-temperature fixing unit 90 for this region, the DFE 50 does not generate the clear toner plane image data to be used at the low-temperature fixing unit 90. In step S7, the si3 unit 57 of the DFE 50 integrates the clear toner plane image data to be used at the printer unit 70 and the respective 2-bit image data of CMYK subjected to the halftone processing and obtained in step S3, and outputs the integrated image data and the on/off information indicating switching off of the glosser 80 to the MIC 60. The MIC 60 outputs the CMYK color plane image data and the clear toner plane image data to be used at the printer unit 70, which are the image data output from the DFE 50, to the printer unit 70. Using the on/off information output from the DFE 50, the MIC 60 switches off the glosser 80. Using the CMYK color plane image data and the clear toner plane image data to be used at the printer unit 70, which are output from the MIC 60, the printer unit 70 forms an image by applying the CMYK toners and the clear toner onto a transfer paper sheet. Since the glosser 80 is in an off state, the transfer paper sheet is not pressed thereafter at a high temperature and a high pressure. Since clear toner plane image data has not been output to the low-temperature fixing unit 90, the clear toner is not applied at the low-temperature fixing unit 90, and the transfer paper sheet is discharged. As a result, the total application amount of the respective toners of CMYK and the clear toner becomes relatively uniform in the region in which solid gloss is designated as the surface effect, and the surface of the region achieves a slightly high gloss level.

Also, in step S4, the clear processor 56 of the DFE 50 determines that the surface effect designated for the pixels having the density values of "23" to "43" is halftone matte, by using the density values indicated by the respective pixels of the 8-bit gloss control plane, and referring to the surface effect select table. In this case, the clear processor 56 of the DFE 50 generates image data indicating halftone as the clear toner plane image data to be used at the printer unit 70. Since clear toner plane image data is not to be used at the low-temperature fixing unit 90 for this region, the DFE 50 does not generate the clear toner plane image data to be used at the low-temperature fixing unit 90. In step S7, the si3 unit 57 of the DFE 50 integrates the clear toner plane image data to be used at the printer unit 70 and the respective 2-bit image data of CMYK subjected to the halftone processing and obtained in step S3, and outputs the integrated image data and the on/off information indicating switching off of the glosser 80 to the MIC 60. The MIC 60 outputs the CMYK color plane image data and the clear toner plane image data to be used at the printer unit 70, which are the image data output from the DFE 50, to the printer unit 70. Using the on/off information output from the DFE 50, the MIC 60 switches off the glosser 80. Using the CMYK color plane image data and the clear toner plane image data output from the MIC 60, the printer unit 70 forms an image by applying the CMYK toners and the clear toner onto a transfer paper sheet. Since the glosser 80 is in an off state, the transfer paper sheet is not pressed thereafter at a high temperature and a high pressure. Since clear toner plane image data has not been output to the low-temperature fixing unit 90, the clear toner is not applied at the low-temperature fixing unit 90, and the transfer paper sheet is discharged. As a result, halftone dots are added with the clear toner to the region in which halftone matte is designated as the surface effect, and surface unevenness appears. Accordingly, the gloss level of the surface of the region is slightly lowered.

Also, in step S4, the clear processor 56 of the DFE 50 determines that the surface effect designated for the pixels having the density values of "1" to "17" is matte, by using the density values indicated by the respective pixels of the 8-bit gloss control plane, and referring to the surface effect select table. In this case, the clear processor 56 of the DFE 50 determines whether to switch on or off the glosser 80, in accordance with the settings used in a case where another surface effect is designated in one page (described later). Whether the glosser 80 is on or off, the clear processor 56 does not generate the clear toner plane image data to be used at the printer unit 70, but generates a solid mask as the clear toner plane image data to be used at the low-temperature fixing unit 90. In step S7, the si3 unit 57 of the DFE 50 integrates the clear toner plane image data to be used at the low-temperature fixing unit 90 and the respective 2-bit image data of CMYK subjected to the halftone processing and obtained in step S3, and outputs the integrated image data and the on/off information indicating switching on or off of the glosser 80 to the MIC 60. The MIC 60 outputs the CMYK color plane image data among the image data output from the DFE 50 to the printer unit 70, and outputs the clear toner plane image data to be used at the low-temperature fixing unit 90 among the image data output from the DFE 50, to the low-temperature fixing unit 90. Using the CMYK color plane image data output from the MIC 60, the printer unit 70 forms an image by applying the CMYK toners onto a transfer paper sheet. In a case where the glosser 80 is switched on, the transfer paper sheet is pressed by the glosser 80 at a high temperature and a high pressure. In a case where the glosser 80 is switched off, the transfer paper sheet is not pressed at a high temperature and a high pressure. Using the clear toner plane image data output from the MIC 60, the low-temperature fixing unit 90 forms a toner image with the clear toner. The low-temperature fixing unit 90 then superimposes the toner image onto the transfer paper sheet that has passed through the glosser 80, and fixes the image onto the transfer paper sheet by heating and pressing at a low temperature. As a result, in the region in which matte is designated as the surface effect, surface unevenness appears due to the application of the clear toner through the solid mask, and the gloss level of the surface of the region is lowered.

In the above described cases, one surface effect is designated in each one page. However, the above described operations can also be performed in cases where different types of surface effects are designated in one page. That is, in a case where more than one surface effect is designated in one page, the gloss control plane image data shows that each of the density values corresponding to the types of surface effects illustrated in FIG. 15 is set for the pixels in the region to which the respective types of surface effects are to be given. Since a region to which a surface effect is to be given is designated for each of the types of surface effect in the gloss control plane, the DFE 50 should determine that the range of pixels set at the same density value is the region to which the same surface effect is to be given in the gloss control plane image data. Accordingly, each of the surface effects can be easily realized in one page.

In a case where more than one types of surface effects are designated in one page by density values in the gloss control plane image data, however, the glosser 80 cannot be switched on and off in the same page. Therefore, some types of surface effects can be realized at the same time, while some types of surface effects cannot be realized at the same time.

In this embodiment having a structure that includes the printer unit 70, the glosser 80, and the low-temperature fixing unit 90 as illustrated in FIG. 1, when surface effects that are mirror gloss (PG) and matte (PM) are designated in one page, the glosser 80 is switched on for mirror gloss (PG), and the glosser 80 is switched on or off for matte (PM) in accordance with the settings for another surface effect, as illustrated in FIG. 15. In this manner, those two types of surface effects can be simultaneously realized in one page.

In this case, in step S4, the clear processor 56 of the DFE 50 determines that the surface effect designated for the region of pixels having the density values of "238" to "255" is mirror gloss (PG), by using the density values indicated by the respective pixels of the 8-bit gloss control plane, and referring to the surface effect select table illustrated as an example in FIG. 15. The clear processor 56 of the DFE 50 then generates an inverse mask according to the equation (1), for example, by using the image data corresponding to the region in the respective 8-bit image data of CMYK subjected to the gamma correction. The inverse mask represents the clear toner plane image data to be used at the printer unit 70 for the region in which mirror gloss (PG) is designated as the surface effect. Since clear toner plane image data is not to be used at the low-temperature fixing unit 90 for this region in which mirror gloss is designated, the DFE 50 does not generate the clear toner plane image data to be used at the low-temperature fixing unit 90 for the region in which mirror gloss is designated.

Also, in step S4, the clear processor 56 of the DFE 50 determines that the surface effect designated for the region of pixels having the density values of "1" to "17" is matte (PM) in the same page as above, by referring to the surface effect select table. In this case, the clear processor 56 of the DFE 50 sets the on/off information indicating switching on of the glosser 80 in accordance with the settings for mirror gloss as the other surface effect in the same one page. The clear processor 56 does not generate the clear toner plane image data to be used at the printer unit 70 for the region in which matte is designated, but generates a solid mask as the clear toner plane image data to be used at the low-temperature fixing unit 90 for the region in which matte is designated.

In step S7, the si3 unit 57 of the DFE 50 integrates the clear toner plane image data to be used at the printer unit 70 for the region in which mirror gloss is designated, the clear toner plane image data to be used at the low-temperature fixing unit 90 for the region in which matte is designated, and the respective 2-bit image data of CMYK subjected to the halftone processing and obtained in step S3, and outputs the integrated image data and the on/off information indicating switching on of the glosser 80 to the MIC 60.

The MIC 60 outputs, to the printer unit 70, the CMYK color plane image data and the clear toner plane image data to be used at the printer unit 70 for the region in which mirror gloss is designated among the image data output from the DFE 50. The MIC 60 also outputs, to the low-temperature fixing unit 90, the clear toner plane image data to be used at the low-temperature fixing unit 90 for the region in which matte is designated among the image data output from the DFE 50. Using the on/off information output from the DFE 50, the MIC 60 switches on the glosser 80.

Using the CMYK color plane image data output from the MIC 60 and the clear toner plane image data for the region in which mirror gloss is designated, the printer unit 70 emits light beams from the exposing unit, forms toner images on the photosensitive element in accordance with the respective toners, transfers the toner images onto a transfer paper sheet, and fixes the images on the transfer paper sheet by heating and pressing at an ordinary temperature. In this manner, the clear toner as well as the CMYK toners is applied onto the transfer paper sheet, and an image is formed. After that, the glosser 80 presses the transfer paper sheet at a high temperature and a high pressure.

Using the clear toner plane image data that is output from the MIC 60 and is generated for the region in which matte is designated, the low-temperature fixing unit 90 forms a toner image with the clear toner. The low-temperature fixing unit 90 then superimposes the toner image onto the transfer paper sheet that has passed through the glosser 80, and fixes the image onto the transfer paper sheet by heating and pressing at a low temperature. As a result, the surface of the region in which mirror gloss is designated as the surface effect achieves a high gloss level. In the region in which matte is designated as the surface effect, surface unevenness appears due to the application of the clear toner through the solid mask, and the gloss level of the surface of the region is lowered.

In a case where solid gloss (G), halftone matte (M), and matte (PM) are designated as surface effects in one page in the structure of this embodiment, the glosser 80 is switched off for solid gloss (G) and halftone matte (M), but the glosser 80 is switched on or off for matte (PM) in accordance with the settings for another surface effect in the page, as illustrated in FIG. 15. In this manner, those three types of surface effects can be simultaneously realized in one page.

This case is now described in greater detail. In step S4, the clear processor 56 of the DFE 50 determines that the surface effect designated for the region of pixels having the density values of "212" to "232" is solid gloss, by using the density values indicated by the respective pixels of the 8-bit gloss control plane, and referring to the surface effect select table. Particularly, as for the pixels having the density values of "228" to "232", the clear processor 56 determines the surface effect to be Gloss Type 1. In this case, the clear processor 56 of the DFE 50 generates the inverse mask 1, using the image data corresponding to the region in the respective 8-bit image data of CMYK subjected to the gamma correction. The inverse mask 1 represents the clear toner plane image data to be used at the printer unit 70 for the region in which solid gloss is designated. Since clear toner plane image data is not to be used at the low-temperature fixing unit 90 for the region in which solid gloss is designated, the DFE 50 does not generate the clear toner plane image data to be used at the low-temperature fixing unit 90.

Also, in step S4, the clear processor 56 of the DFE 50 determines that the surface effect designated for the region of pixels having the density values of "23" to "43" is halftone matte (M) in the same page as above, by referring to the surface effect select table. In this case, the clear processor 56 of the DFE 50 generates image data indicating halftone as the clear toner plane image data to be used at the printer unit 70 for the region in which halftone matte is designated. Since clear toner plane image data is not to be used at the low-temperature fixing unit 90 for the region in which halftone matte is designated, the DFE 50 does not generate the clear toner plane image data to be used at the low-temperature fixing unit 90.

Further, in step S4, the clear processor 56 of the DFE 50 determines that the surface effect designated for the region of pixels having the density values of "1" to "17" is matte (PM) in the same page as above, by referring to the surface effect select table. In this case, the clear processor 56 of the DFE 50 sets switching off of the glosser 80 in accordance with the settings for solid gloss and halftone matte as the other surface effects designated in the same one page. The clear processor 56 does not generate the clear toner plane image data to be used at the printer unit 70 for the region in which matte is designated, but generates a solid mask as the clear toner plane image data to be used at the low-temperature fixing unit 90 for the region in which matte is designated.

In step S7, the si3 unit 57 of the DFE 50 integrates the clear toner plane image data to be used at the printer unit 70 for the region in which solid gloss is designated, the clear toner plane image data to be used at the printer unit 70 for the region in which halftone matte is designated, the clear toner plane image data to be used at the low-temperature fixing unit 90 for the region in which matte is designated, and the respective 2-bit image data of CMYK subjected to the halftone processing and obtained in step S3. The si3 unit 57 then outputs the integrated image data and the on/off information indicating switching off of the glosser 80 to the MIC 60.

The MIC 60 outputs, to the printer unit 70, the CMYK color plane image data output from the DFE 50, the clear toner plane image data to be used at the printer unit 70 for the region in which solid gloss is designated, and the clear toner plane image data to be used at the printer unit 70 for the region in which halftone matte is designated. Using the on/off information output from the DFE 50, the MIC 60 switches off the glosser 80. The MIC 60 also outputs, to the low-temperature fixing unit 90, the clear toner plane image data to be used at the low-temperature fixing unit 90 for the region in which matte is designated among the image data output from the DFE 50.

Using the CMYK color plane image data output from the MIC 60, the clear toner plane image data to be used at the printer unit 70 for the region in which solid gloss is designated, and the clear toner plane image data to be used at the printer unit 70 for the region in which halftone matte is designated, the printer unit 70 forms an image by applying the CMYK toners and the clear toner onto a transfer paper sheet. Since the glosser 80 is in an off state, the transfer paper sheet is not pressed thereafter at a high temperature and a high pressure.

Using the clear toner plane image data that is output from the MIC 60 and is generated for the region in which matte is designated, the low-temperature fixing unit 90 forms a toner image with the clear toner. The low-temperature fixing unit 90 then superimposes the toner image onto the transfer paper sheet, and fixes the image onto the transfer paper sheet by heating and pressing at a low temperature.

As a result, the total application amount of the respective toners of CMYK and the clear toner becomes relatively uniform in the region in which solid gloss is designated as a surface effect in the one page, and the surface of the region achieves a slightly high gloss level. Also, since halftone dots are added with the clear toner to the region in which halftone matte is designated as a surface effect in the one page, surface unevenness appears, and the gloss level of the surface of the region is slightly lowered. Further, in the region in which matte is designated as a surface effect in the one page, surface unevenness appears due to the application of the clear toner through the solid mask, and the gloss level of the surface of the region is lowered.

As described above, in a case where different types of surface effects are designated in one page, the different types of surface effects can be realized in the one page, if there is no need to switch on and off in accordance with the surface effects. However, different types of surface effects for which the glosser 80 needs to be switched on and off cannot be realized in one page.

For example, in a case where mirror gloss (PG) and solid gloss (G) are designated in one page in this embodiment having a structure that includes the printer unit 70, the glosser 80, and the low-temperature fixing unit 90, the glosser 80 is switched on for mirror gloss (PG), and the glosser 80 is switched off for solid gloss (G), as illustrated in FIG. 15. Therefore, the two types of surface effects, mirror gloss (PG) and solid gloss (G), cannot be realized in one page.

In a case where different types of surface effects cannot be realized in one page though the different types of surface effects are designated in the one page as described above, the DFE 50 of this embodiment realizes one of the surface effects that cannot be simultaneously realized, by substituting the one of the surface effects with a surface effect other than the designated surface effects.

Figure 19:
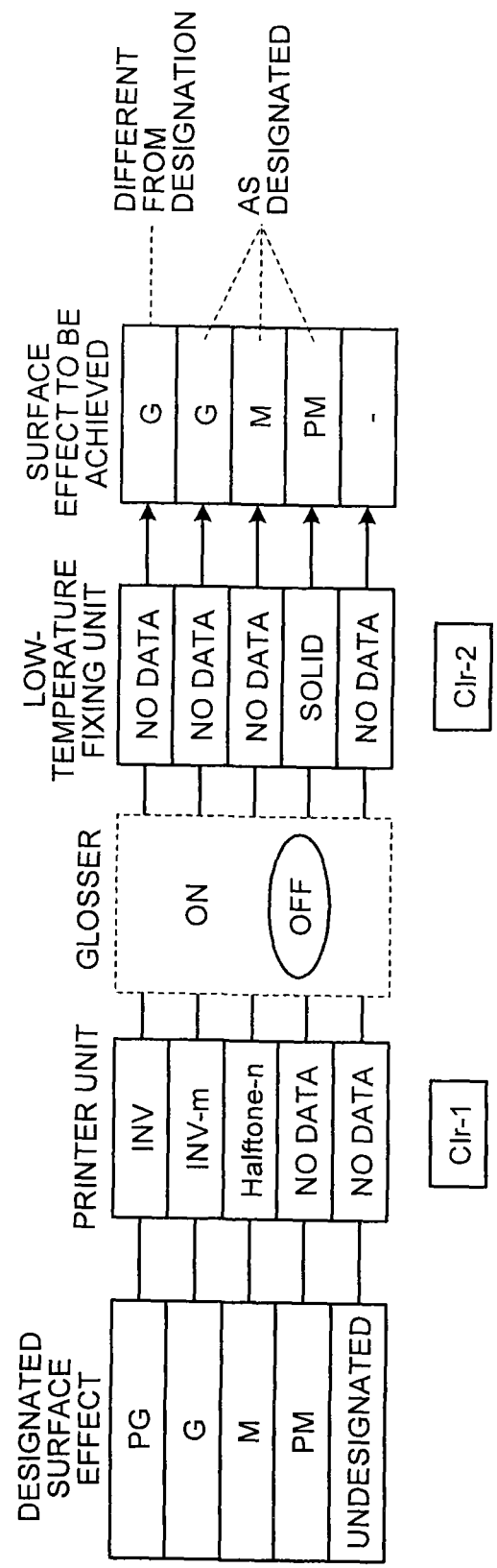
FIG. 19 is a diagram illustrating the combinations of types of designated surface effects, clear toner clear plane image data used by the printer unit, the clear toner plane image data used by the low-temperature fixing unit, and actually achieved surface effects.

For example, in a case where the four effects, mirror gloss (PG), solid gloss (G), halftone matte (M), and matte (PM), are designated in one page as illustrated in FIG. 19, the DFE 50 switches off the glosser 80, and realizes respective surface effects in the region determined to have solid gloss designated as the surface effect based on the density values in the gloss control plane, in the region determined to have halftone matte designated as the surface effect, and in the region determined to have matte designated as the surface effect. However, in the region determined to have mirror gloss designated as the surface effect, the DFE 50 selects solid gloss as a substitute surface effect. For the region determined to have mirror gloss designated as the surface effect, the DFE 50 generates an inverse mask A, B, or C (equivalent to INV in FIG. 19) as the clear toner plane image data to be used at the printer unit 70, by using the image data corresponding to the region in the respective 8-bit image data of CMYK subjected to the gamma correction, as in the case of solid gloss. The clear toner plane image data to be used at the low-temperature fixing unit 90 is not generated. In FIG. 15, when a density value is in the range of "248" to "255", the DFE 50 determines the effect to be Premium Gloss Type A, and the inverse mask A is used. It should be noted that INV-m in FIG. 19 corresponds to inverse masks 1 through 4 in FIG. 15, and halftone-n in FIG. 19 corresponds to the halftones 1 through 4 in FIG. 15. On the transfer paper sheet discharged through the printer unit 70, the glosser 80, which is off, and the low-temperature fixing unit 90 as described above, solid gloss is given as the surface effect to the region in which mirror gloss is designated and the region in which solid gloss is designated, halftone matte is given as the surface effect to the region in which halftone matte is designated, and matte is given as the surface effect to the region in which matte is designated. It should be noted that any of the surface effects is not given to regions that are not designated as regions to which a surface effect is to be given.

As described above, the DFE 50 uses the gloss control plane in which density values are set in accordance with types of surface effects designated by the user, and determines whether post-processing is to be performed at a postprocessor, depending on the existence of a postprocessor such as the glosser 80 or the low-temperature fixing unit 90 in the stage immediately after the printer unit 70, and on the type of the postprocessor. The DFE 50 then generates clear toner plane image data for applying the clear toner, where appropriate. In this manner, clear toner plane image data for giving common surface effects in image forming systems with various kinds of structures can be generated. Based on the clear toner plane image data, the clear toner is applied to an image formed with CMYK toner images, so that the respective surface effects can be given. Accordingly, the user does not need to take any trouble in giving a desired surface effect with the clear toner to a printed material having an image formed thereon.

Also, as the density values for specifying a surface effect for each of the pixels in the gloss control plane image data are set in this embodiment, more than one type of surface effect can be given in one page of transfer paper.

Figure 20:
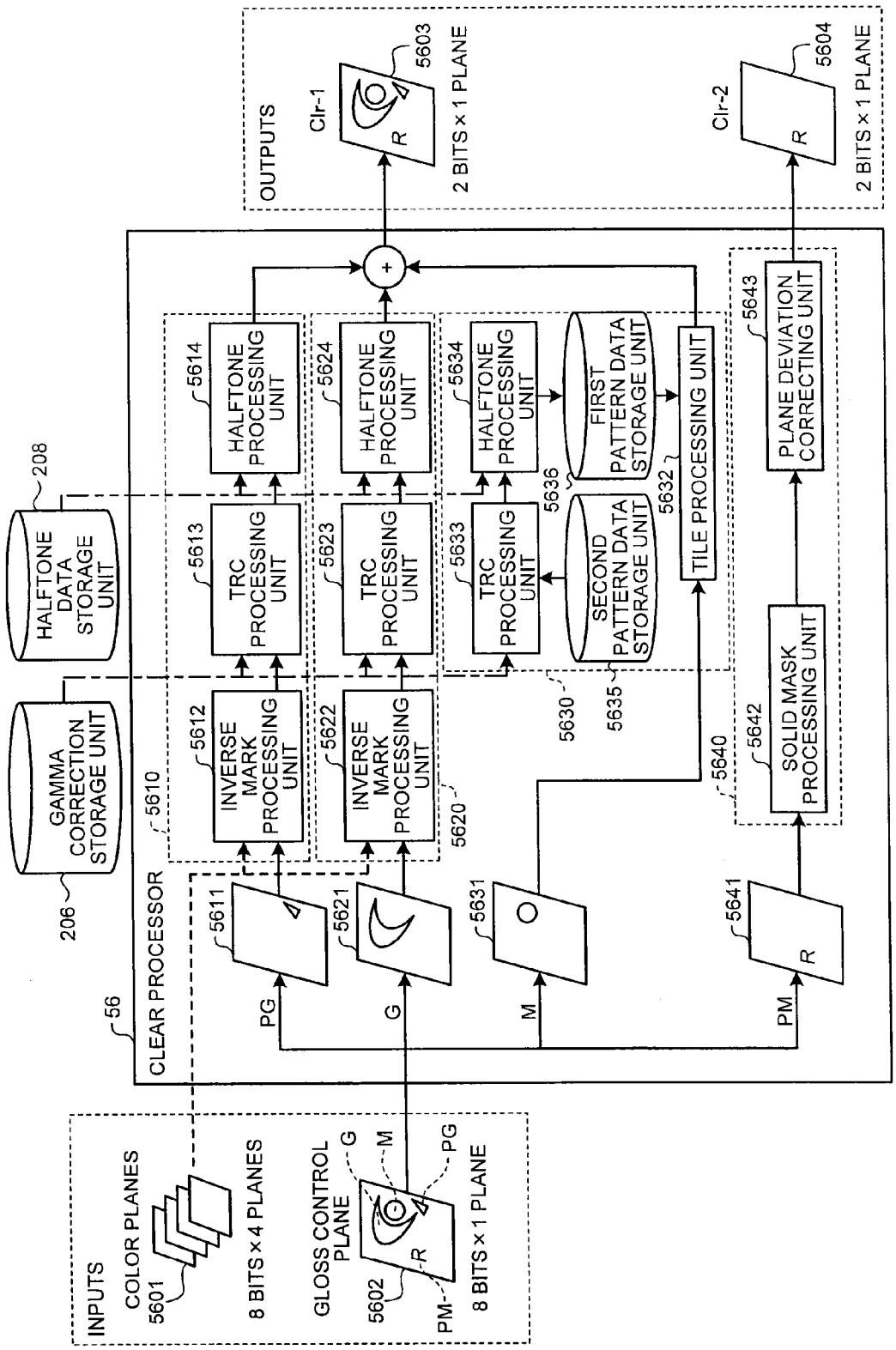
FIG. 20 is a diagram conceptually illustrating the functions of the clear processor.

Next, the functions of the clear processor 56 are described in detail. FIG. 20 is a diagram conceptually illustrating the functions of the clear processor 56. As already mentioned, an 8-bit gloss control plane 5602 converted by the rendering engine 51 is input to the clear processor 56 via the si1 unit 52, and the respective 8-bit image data of CMYK (hereinafter referred to the "color planes") 5601 subjected to the gamma correction performed by the TRC 53 are input to the clear processor 56 via the si2 unit 54. In the following, the gloss control plane 5602 in which the four effects, which are mirror gloss (PG), solid gloss (G), halftone matte (M), and matte (PM), are designated in one page is described as an example.

Different operations are performed on the regions in which the respective four surface effects (PG, G, M, and PM) are designated, so that the gloss control plane 5602 is converted into clear toner plane image data Clr-1 to be used at the printer unit 70 and clear toner plane image data Clr-2 to be used at the low-temperature fixing unit 90. This operation is described below in greater detail.

The clear processor 56 refers to the surface effect select table, and identifies a PG region indicating the region in which PG is designated, a G region indicating the region in which G is designated, an M region indicating the region in which M is designated, and a PM region indicating the region in which PM is designated in the gloss control plane 5602. The clear processor 56 then generates a gloss control plane 5611 for PG, a gloss control plane 5621 for G, a gloss control plane 5631 for M, and a gloss control plane 5641 for PM, from the gloss control plane 5602.

The respective pixels constituting the PG gloss control plane 5611 correspond to the respective pixels in the gloss control plane 5602, and the density values (or the density rates) of the pixels in the PG region of the PG gloss control plane 5611 are the same as the density values of the pixels in the PG region of the original gloss control plane 5602. Meanwhile, the density values of the pixels in the regions of the PG gloss control plane 5611 other than the PG region are set at "0".

The respective pixels constituting the G gloss control plane 5621 correspond to the respective pixels in the gloss control plane 5602, and the density values of the pixels in the G region of the G gloss control plane 5621 are the same as the density values of the pixels in the G region of the original gloss control plane 5602. Meanwhile, the density values of the pixels in the regions of the G gloss control plane 5621 other than the G region are set at "0".

The respective pixels constituting the M gloss control plane 5631 correspond to the respective pixels in the gloss control plane 5602, and the density values of the pixels in the M region of the M gloss control plane 5631 are the same as the density values of the pixels in the M region of the original gloss control plane 5602. Meanwhile, the density values of the pixels in the regions of the M gloss control plane 5631 other than the M region are set at "0".

The respective pixels constituting the PM gloss control plane 5641 correspond to the respective pixels in the gloss control plane 5602, and the density values of the pixels in the PM region of the PM gloss control plane 5641 are the same as the density values of the pixels in the PM region of the original gloss control plane 5602. Meanwhile, the density values of the pixels in the regions of the PM gloss control plane 5641 other than the PM region are set at "0".

As illustrated in FIG. 20, the clear processor 56 also includes a PG converting unit 5610 that converts the PG gloss control plane 5611 into a 2-bit Clr-PG plane, a G converting unit 5620 that converts the G gloss control plane 5621 into a 2-bit Clr-G plane, an M converting unit 5630 that converts the M gloss control plane 5631 into a 2-bit Clr-M plane, and a PM converting unit 5640 that converts the PM gloss control plane 5641 into a 2-bit Clr-PM plane.

First, the operation to convert the PG gloss control plane 5611 into the Clr-PG plane is described. As illustrated in FIG. 20, the PG converting unit 5610 includes an inverse mask processing unit 5612, a TRC processing unit 5613, and a halftone processing unit 5614.

Using the image data of the portions corresponding to the PG region in the color planes 5601, the inverse mask processing unit 5612 performs an operation (inverse mask processing) to convert the density values of the respective pixels in the PG region included in the PG gloss control plane 5611 into density values expressed by an inverse mask for PG (one of the inverse masks A, B, and C). Through this operation, the PG gloss control plane 5611 is converted into 8-bit clear toner plane image data. The 8-bit clear toner plane image data obtained through the inverse mask processing by the inverse mask processing unit 5612 can be regarded as the clear toner plane image data corresponding to the region (the PG region) in which PG is designated in the gloss control plane 5611.

The TRC processing unit 5613 performs TRC processing on the PG gloss control plane 5611 on which the inverse mask processing has been performed by the inverse mask processing unit 5612 (or the 8-bit clear toner plane image data obtained through the inverse mask processing by the inverse mask processing unit 5612). More specifically, the TRC processing unit 5613 reads a gamma curve for PG from a gamma correction storage unit 206, and performs a gamma correction (an example of a tone correction) according to the read gamma curve on the PG gloss control plane 5611 on which the inverse mask processing has been performed.

The gamma correction storage unit 206 stores gamma curves (an example of tone correction parameters) to be used for performing gamma corrections on clear toner plane image data for the respective types of surface effects. The gamma correction storage unit 206 of this embodiment is equivalent to the "second storage unit" in the claims. The halftone processing unit 5614 then reads halftone data (dither data) from a halftone data storage unit 208, and performs halftone processing on the image data subjected to the gamma correction, using the read halftone data. Through this operation, the PG gloss control plane 5611 is converted into 2-bit image data (the Clr-PG plane).

Next, the operation to convert the G gloss control plane 5621 into the Clr-G plane is described. As illustrated in FIG. 20, the G converting unit 5620 includes an inverse mask processing unit 5622, a TRC processing unit 5623, and a halftone processing unit 5624.

Using the image data of the portions corresponding to the G region in the color planes 5601, the inverse mask processing unit 5622 performs an operation (inverse mask processing) to convert the density values of the respective pixels in the G region included in the G gloss control plane 5621 into densities expressed by an inverse mask for G (one of the inverse masks 1, 2, 3, and 4). Through this operation, the G gloss control plane 5621 is converted into 8-bit clear toner plane image data. The 8-bit clear toner plane image data obtained through the inverse mask processing by the inverse mask processing unit 5622 can be regarded as the clear toner plane image data corresponding to the region (the G region) in which G is designated in the gloss control plane 5611.

The TRC processing unit 5623 performs TRC processing on the G gloss control plane 5621 on which the inverse mask processing has been performed by the inverse mask processing unit 5622 (or the 8-bit clear toner plane image data obtained through the inverse mask processing by the inverse mask processing unit 5622). More specifically, the TRC processing unit 5623 reads a gamma curve for G from the gamma correction storage unit 206, and performs a gamma correction according to the read gamma curve on the G gloss control plane 5621 on which the inverse mask processing has been performed.

The halftone processing unit 5624 then reads halftone data (dither data) from the halftone data storage unit 208, and performs halftone processing on the image data subjected to the gamma correction, using the read halftone data. Through this operation, the G gloss control plane 5621 is converted into 2-bit image data (the Clr-G plane).

Next, the operation to convert the M gloss control plane 5631 into the Clr-M plane is described. As illustrated in FIG. 20, the M converting unit 5630 includes a tile processing unit 5632, a first pattern data storage unit 5636, a second pattern data storage unit 5635, a TRC processing unit 5633, and a halftone processing unit 5634. The tile processing unit 5632 refers to the surface effect select table, and reads M pattern data corresponding to the density values of the pixels in the M region included in the M gloss control plane 5631 from the first pattern data storage unit 5636. Using the read pattern data, the tile processing unit 5632 performs tile processing.

In this example, the M pattern data stored in the first pattern data storage unit 5636 is image data obtained by performing image processing on original pattern data, and each of the pixels is expressed by two bits.

The original pattern data is 8-bit image data, and more than one type of original pattern data associated with density values (the density values corresponding to M) in the gloss control plane is stored in the second pattern data storage unit 5635. The TRC processing unit 5633 performs TRC processing on the original pattern data stored in the second pattern data storage unit 5635. More specifically, the TRC processing unit 5633 performs a gamma correction on the original pattern data, in accordance with the M gamma curve read from the gamma correction storage unit 206. The halftone processing unit 5634 then reads dither data from the halftone data storage unit 208, and performs halftone processing on the pattern data subjected to the gamma correction, using the read dither data. Through this operation, 2-bit pattern data (M pattern data) is obtained. The M pattern data is associated with density values in the gloss control plane, and is stored into the first pattern data storage unit 5636.

Figure 21:
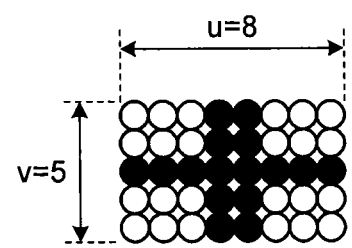
FIG. 21 is a diagram illustrating an example pattern image.
Figure 22:
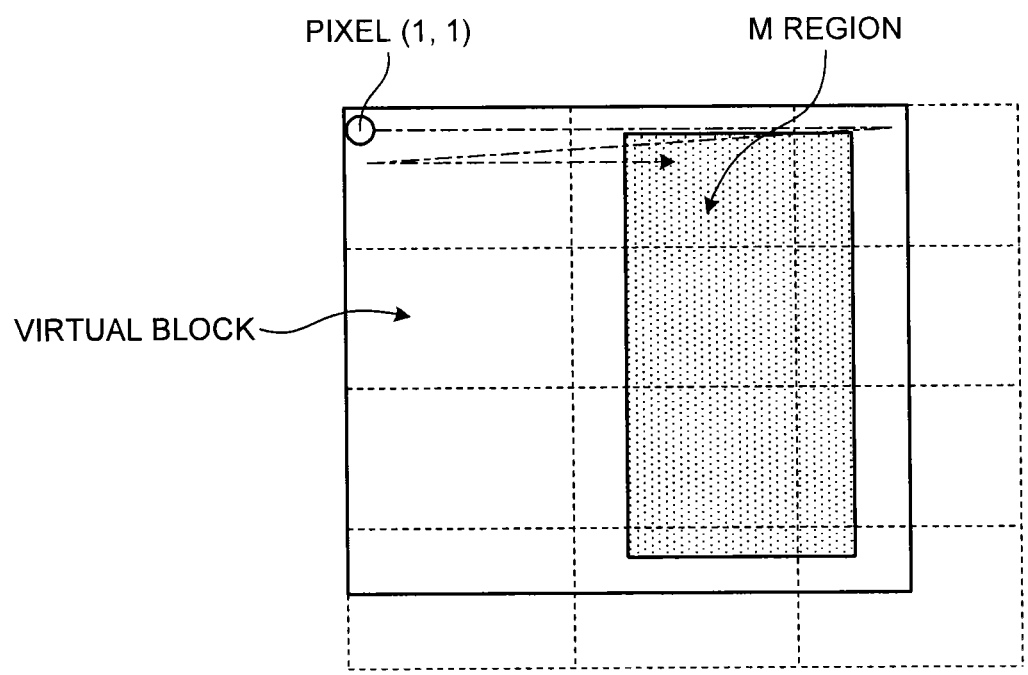
FIG. 22 is a diagram for explaining tile processing.

The tile processing is now described in greater detail. Here, an example case where the pattern image illustrated in FIG. 21 is used is described. The tile processing unit 5632 reads the pattern data (the pattern image illustrated in FIG. 21 in this case) corresponding to the density values of the pixels in the M region included in the M gloss control plane 5631 from the first pattern data storage unit 5636, and divides the M gloss control plane 5631 into virtual blocks having the size of the read pattern image. In the example illustrated in FIG. 22, the M gloss control plane 5631 is formed with pixels arranged in a matrix of 17 rows and 20 columns. In other words, the width w of the M gloss control plane 5631 is equivalent to 20 pixels, and the height h is equivalent to 17 pixels. In the example illustrated in FIG. 22, as a result of the dividing, 2.5 (=20/8) virtual blocks exist in the row direction (the transverse direction) of the M gloss control plane 5631, and 3.4 (=17/5) virtual blocks exist in the column direction (the longitudinal direction). Hereinafter, the pixel located in the x-th ($1 \leq x \leq 20$) row and in the y-th ($1 \leq y \leq 17$) column in the M gloss control plane 5631 will be referred to as the pixel (x, y).

The tile processing unit 5632 then performs an operation ("tile processing") to determine the density values of the respective pixels in the M region in a case where a pattern image is assigned to each of the divisional regions. Through this operation, the M gloss control plane 5631 is converted into 2-bit image data. This 2-bit image data is called the Clr-M plane. This tile processing is sequentially performed pixel by pixel in the order indicated by the arrow with a dot-and-dash line, starting from the pixel (1, 1) located at the upper left corner in FIG. 22. Here, the tile processing to be performed on the pixel (12, 12) included in the M region is described as an example. It should be noted that the density values of the pixels included in the regions other than the M region are set at "0".

Figure 23:
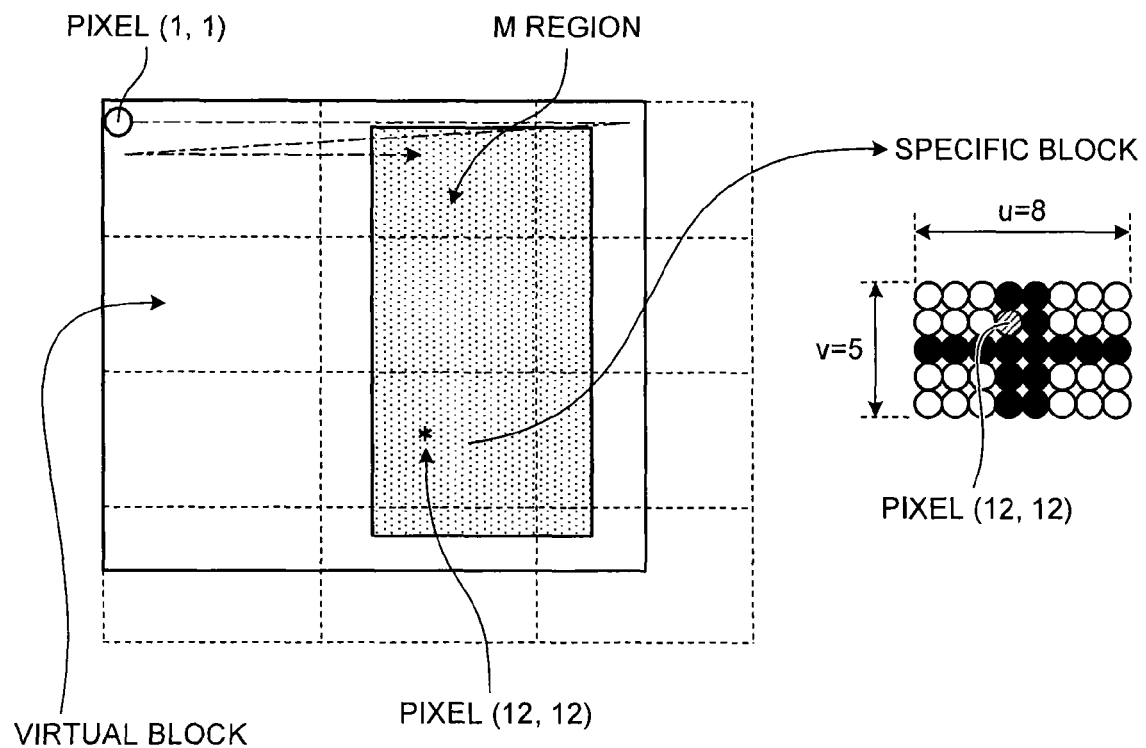
FIG. 23 is a diagram for explaining the tile processing.

First, the tile processing unit 5632 identifies the location of the pixel (12, 12) in the virtual block to which this target pixel belongs (this virtual block will be hereinafter referred to as the "specific block", for ease of explanation). As for the row direction, the pixel (12, 12) is located in the 12th row, and the number of rows (or the height v) of each virtual block is 5 (see FIG. 21). Accordingly, "2", which is the remainder of 12/5, is identified as the location of the pixel in the row direction in the specific block. Likewise, as for the column direction, the pixel (12, 12) is located in the 12th column, and the number of columns (or the width u) of each virtual block is 8 (see FIG. 21). Accordingly, "4", which is the remainder of 12/8, is identified as the location of the pixel in the column direction in the specific block. In this case, the pixel (12, 12) is determined to be located in the second row and the fourth column in the specific block, as illustrated in FIG. 23. As can be seen from FIG. 21, among the pixels constituting the pattern image, the density value of the pixel located in the second row and the fourth column is "255". Therefore, the density value of the pixel (12, 12) is determined to be "255".

Figure 24:
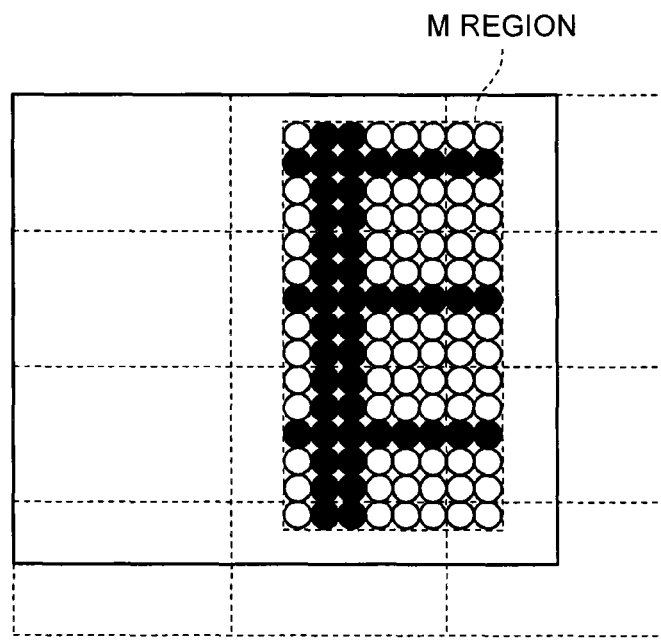
FIG. 24 is a diagram illustrating an example of 2-bit image data obtained through the time processing.

FIG. 24 is a diagram illustrating the density values of the respective pixels in the M region determined by repeatedly performing the above described tile processing. The pixels represented by white circles are pixels having density values set at "0", and the pixels represented by black circles are pixels having density values set at "255". In this manner, the Clr-M plane is generated.

The clear processor 56 combines the Clr-PG plane, the Clr-G plane, and the Clr-M plane generated in the above described manner, to generate and output the clear toner plane Clr-1 to be used at the printer unit 70.

Next, the operation to convert the PM gloss control plane 5641 into the Clr-PM plane is described. As illustrated in FIG. 20, the PM converting unit 5640 includes a solid mask processing unit 5642 and a plane deviation correcting unit 5643. The solid mask processing unit 5642 performs solid mask processing on the image data of the PM region contained in the PM gloss control plane 5641. Through this process, the PM gloss control plane 5641 is converted into 2-bit image data (the Clr-PM plane).

The solid mask processing is basically an operation to add "11 (binary)" to target pixels (the respective pixels in the PM region in this case). However, there are variations of the solid mask processing, and "01" may be added to some of the pixels to vary the densities in the solid mask. It should be noted that a gamma correction is not performed on the Clr-PM plane obtained through the solid mask processing, and therefore, a gamma curve for PM is not required.

The Clr-PM plane is to be transmitted to the low-temperature fixing unit 90, instead of the printer unit 70. As a result, there is a possibility that a plane deviation from the color planes is caused depending on the degree of transfer accuracy. In view of this, the plane deviation correcting unit 5643 performs a plane deviation correction to cause the Clr-PM plane to make a parallel shift in this embodiment. The Clr-PM plane subjected to the plane deviation correction is then output as the clear toner plane Clr-2 to be used at the low-temperature fixing unit 90.

As described above, the clear processor 56 performs a gamma correction according to the PG gamma curve on the clear toner plane image data corresponding to the PG region in the gloss control plane 5611 (or the 8-bit clear toner plane image data obtained through the inverse mask processing by the inverse mask processing unit 5612), performs a gamma correction according to the G gamma curve on the clear toner plane image data corresponding to the G region (or the 8-bit clear toner plane image data obtained through the inverse mask processing by the inverse mask processing unit 5622), and performs a gamma correction according to the M gamma curve on the clear toner plane image data corresponding to the M region (or the pattern data corresponding to the density values of the respective pixels in the M region). That is, it can be considered that the clear processor 56 (equivalent to the "generating unit" in the claims) includes tone correcting units (the TRC processing units 5613, 5623, and 5633) that perform tone corrections (gamma corrections in this example) varying with types of surface effects, on the regions in which surface effects are designated in the gloss control plane 5602 (or on the clear toner plane image data corresponding to the regions in which surface effects are designated in the gloss control plane 5602). In this manner, gloss levels suitable for the respective types of surface effects can be realized.

Figure 25:
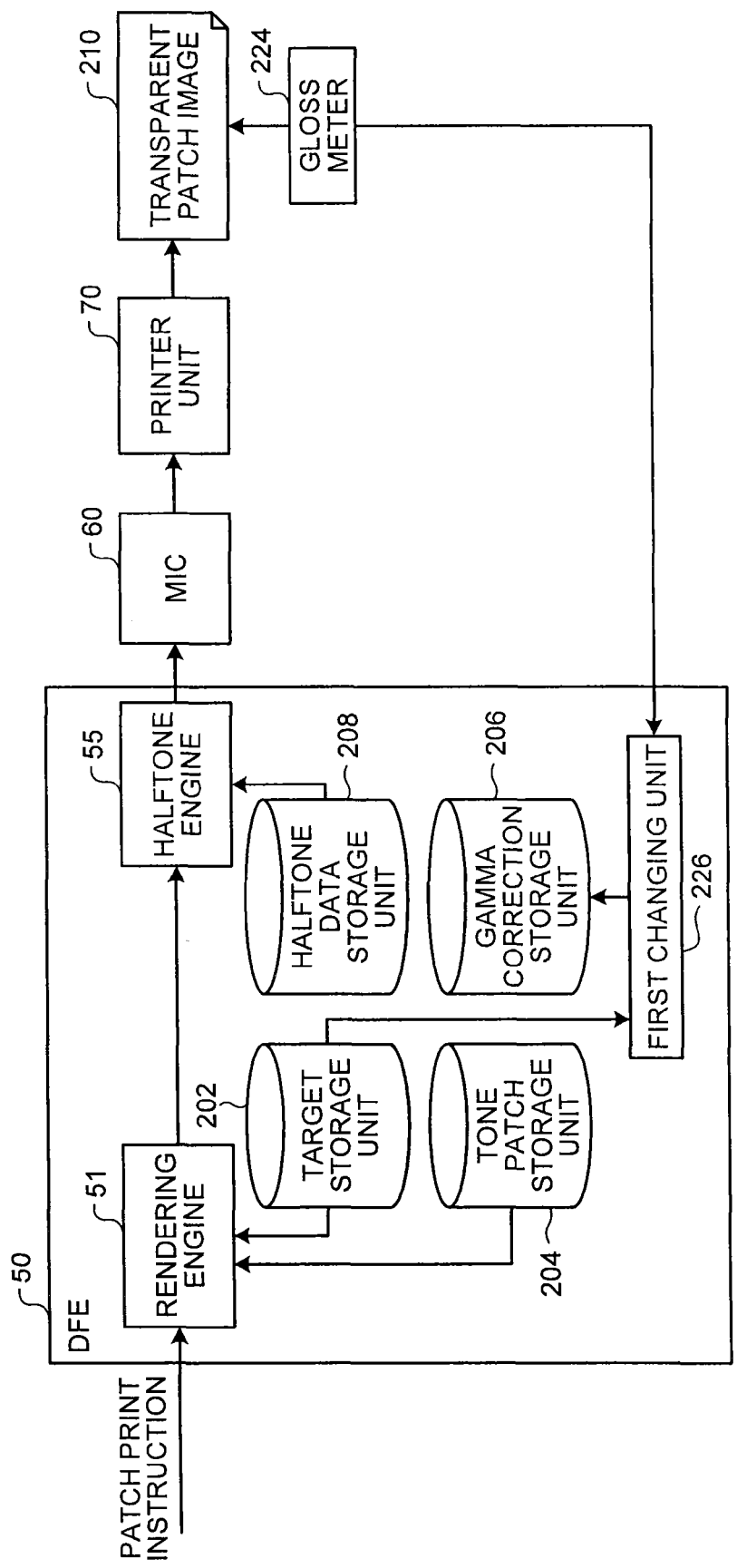
FIG. 25 is a diagram illustrating specific example functions of the clear processor.

Next, a calibration operation to be performed by the image forming system of this embodiment is described. Here, a calibration operation is an operation to set tone correction parameters. FIG. 25 is a diagram illustrating an example structure of an image forming system required for a calibration operation. As illustrated in FIG. 25, the image forming system further includes a gloss meter 224 that is capable of measuring the gloss level of an image formed on a transfer paper sheet.

In FIG. 25, only the components necessary for the calibration operation among the functions of the DFE 50 are illustrated. As illustrated in FIG. 25, the DFE 50 includes a target storage unit 202, a tone patch storage unit 204, and a first changing unit 226, as well as the rendering engine 51, the halftone engine 55, the gamma correction storage unit 206, and the halftone data storage unit 208.

The target storage unit 202 stores target information that indicates the relationships between the density values (the gloss control values) in the gloss control planes and the gloss levels to be achieved as a result of printing, for the respective types of surface effects. The target storage unit 202 is equivalent to the "first storage unit" in the claims. FIG. 26 is a diagram illustrating an example of the target information stored in the target storage unit 202. The target information indicates what gloss levels are to be achieved on a transfer paper sheet after a printing operation, with respect to the density rates (or the density values) in the gloss control planes (5611, 5621, and 5631). In the example illustrated in FIG. 26, the ranges of density rates in the gloss control planes corresponding to the respective types of surface effects are determined in accordance with the surface effect select table illustrated in FIG. 15, but the present invention is not limited to that.

In the example illustrated in FIG. 26, in a case where the gloss level range required for the surface effect PG is defined as A to B, the gloss levels corresponding to the density rates within the range of the density rates (the density rates corresponding to PG) for giving PG as a surface effect (94% to 100% in the example illustrated in FIG. 26) are made to fall within the range of A to B. As for the values of A and B, A may be 94, and B may be 100, to conform to the range of the density rates for giving PG, for example. In this case, the gloss level (the target value) to be achieved as a printing result is 94 with respect to the density rate of 94% in the gloss control plane, and the gloss level (the target value) to be achieved as a printing result is 100 with respect to the density rate of 100% in the gloss control plane. The range may be widened so that A is 80, and B is 100. In this case, the gloss level (the target value) to be achieved as a printing result is 80 with respect to the density rate of 94% in the gloss control plane, and the gloss level (the target value) to be achieved as a printing result is 100 with respect to the density rate of 100% in the gloss control plane. By widening the range, an expression difference caused by a gloss level can be easily made to appear when gloss control planes are changed.

Likewise, the gloss level range required for G is set in accordance with the range of density rates required for giving G as a surface effect. Also, the gloss level range required for M is set in accordance with the range of density rates required for giving M as a surface effect. As described above, the target information that indicates the relationship between the density values in the gloss control plane and the gloss levels is set beforehand for each of the types of surface effects, and is stored into the target storage unit 202.

The tone patch storage unit 204 stores layout information for specifying layouts (the locations, the shapes, or the like of transparent patch images in the page) of transparent patch images (tone images to be used in calibration for respective surface effects). Although the details will be described later, when receiving a patch print instruction to print a transparent patch image, the DFE 50 generates the image data of transparent patch images (hereinafter referred to the "transparent patch image data") for each of the types of surface effects, and outputs the generated transparent patch image data to the printer unit 70 via the MIC 60. Using the transparent patch image data output from the MIC 60, the printer unit 70 forms images by applying the clear toner onto a transfer paper sheet. In this manner, transparent patch images are formed on a transfer paper sheet.

Figure 27:
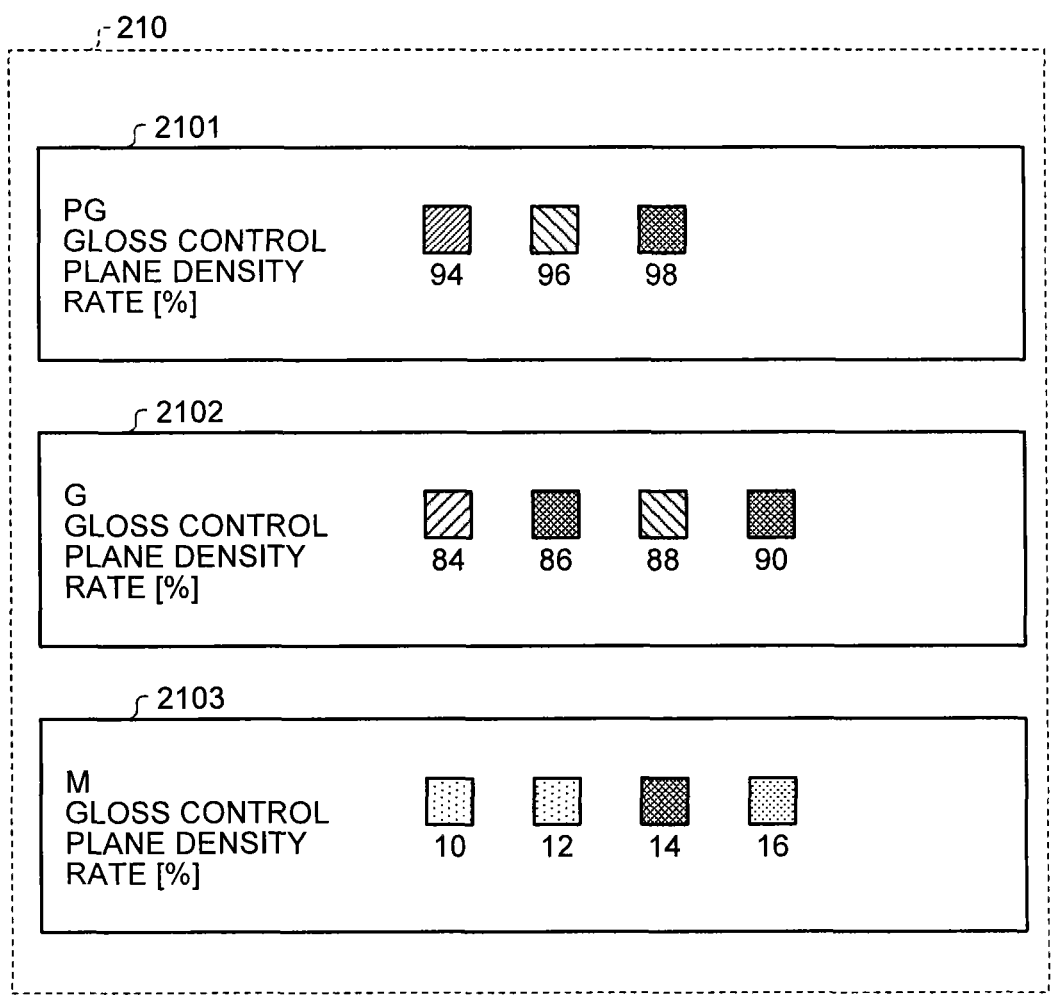
FIG. 27 is a diagram illustrating an example transparent patch image.

FIG. 27 is a diagram illustrating an example of transparent patch images of respective surface effects formed on a transparent paper sheet. In the example illustrated in FIG. 27, transparent patch images for PG are formed in a region 2101 on a transfer paper sheet (a sheet) 210, transparent patch images for G are formed in a region 2102, and transparent patch images for M are formed in a region 2103. Although the respective transparent patch images for PG, G, and M are formed on one sheet in this example, the present invention is not limited to that, and the transparent patch images for the respective surface effects may be formed on different sheets.

The transparent patch images for PG are tone images in which the density rate of the gloss control plane for giving PG as a surface effect is varied. As described above, a type of surface effect is associated with every 2% in the density rate of the gloss control plane (see FIG. 15). Therefore, the transparent patch images for PG are formed with a rectangular image corresponding to a density rate of 94%, a rectangular image corresponding to a density rate of 96%, and a rectangular image corresponding to a density rate of 98%, as illustrated in FIG. 27.

The transparent patch images for G are tone images in which the density rate of the gloss control plane for giving G as a surface effect is varied. As illustrated in FIG. 27, the transparent patch images for G are formed with a rectangular image corresponding to a density rate of 84%, a rectangular image corresponding to a density rate of 86%, a rectangular image corresponding to a density rate of 88%, and a rectangular image corresponding to a density rate of 90%.

Further, the transparent patch images for M are tone images in which the density rate of the gloss control plane for giving M as a surface effect is varied. As illustrated in FIG. 27, the transparent patch images for M are formed with a rectangular image corresponding to a density rate of 10%, a rectangular image corresponding to a density rate of 12%, a rectangular image corresponding to a density rate of 14%, and a rectangular image corresponding to a density rate of 16%.

Figure 28:
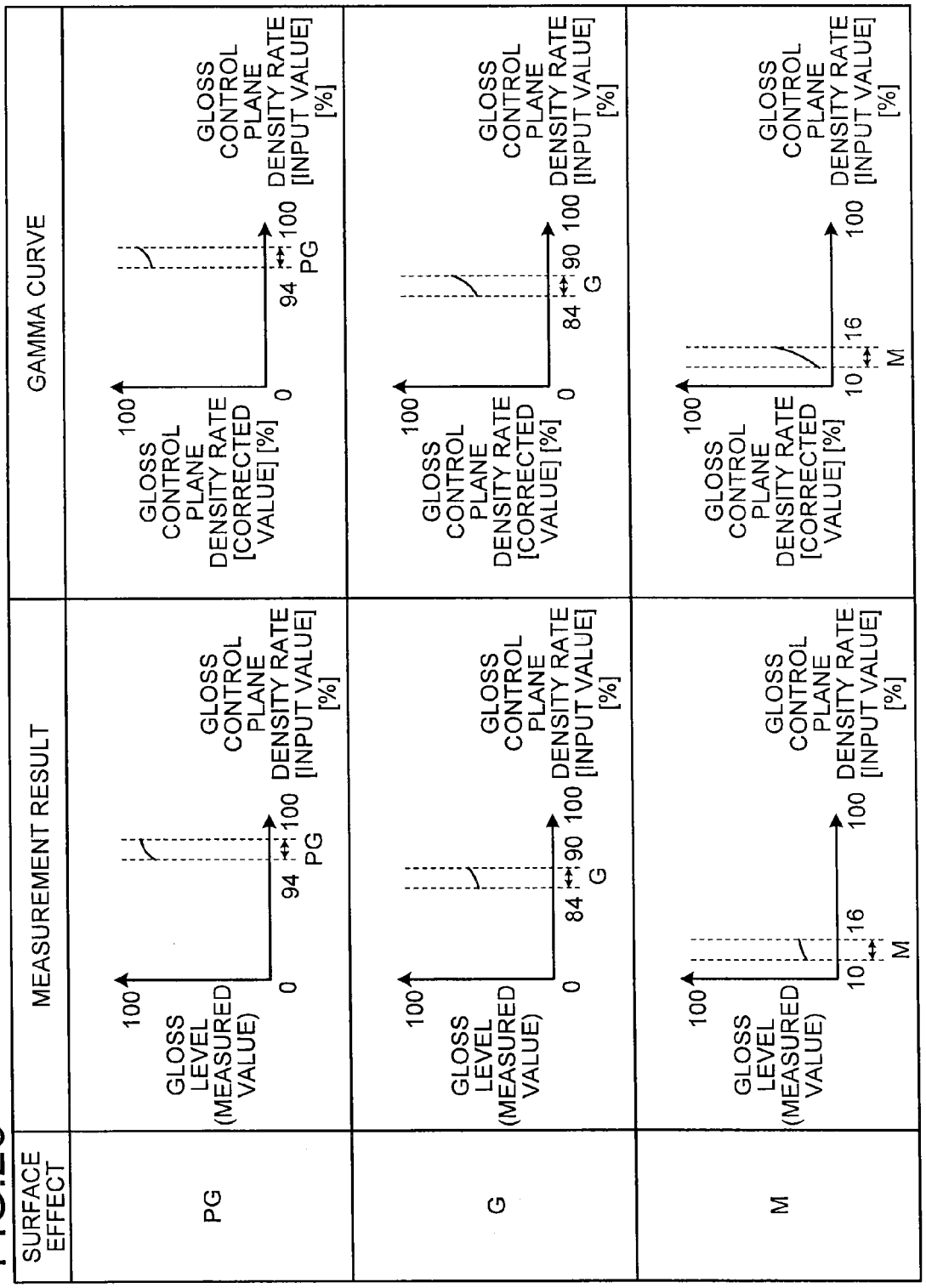
FIG. 28 is a diagram illustrating the association between the results of measurement carried out by a gloss meter and the gamma curves obtained after changes by the first changing unit.

Referring back to FIG. 25, the first changing unit 226 uses the results of measurement carried out by the gloss meter 224 to measure the gloss levels of the patch images and the target information stored in the target storage unit 202, and changes (updates) the gamma curves stored in the gamma correction storage unit 206, so as to achieve the relationships (characteristics) indicated by the target information for the respective types of surface effects. FIG. 28 is a diagram in which the results of the measurement carried out by the gloss meter 224 to measure the gloss levels of the patch images corresponding to the respective types of surface effects are associated with the gamma curves changed by the first changing unit 226 for the respective types of surface effects. In this example, the results of the measurement carried out by the gloss meter 224 are illustrated as data that associates the density rates in the transparent patch image data with the measured values of the gloss levels of the rectangular images corresponding to the density values. For example, based on the measured values of the gloss levels transmitted from the gloss meter 224, the first changing unit 226 can generate data that associates the density rates in the transparent patch image data with the measured values of the gloss levels of the rectangular images corresponding to the density rates, for each of the types of surface effects.

As can be seen from FIGS. 26 and 28, using the results of the measurement carried out by the gloss meter 224 to measure the gloss levels of the transparent patch images corresponding to the respective types of surface effects, and the target information corresponding to the respective types of surface effects, the first changing unit 226 generates a gamma curve for each of the types of surface effects, so as to achieve the relationships indicated by the target information corresponding to the types of surface effects. The first changing unit 226 then registers the newly generated gamma curves, instead of the gamma curves previously registered in the gamma correction storage unit 206.

Figure 29:
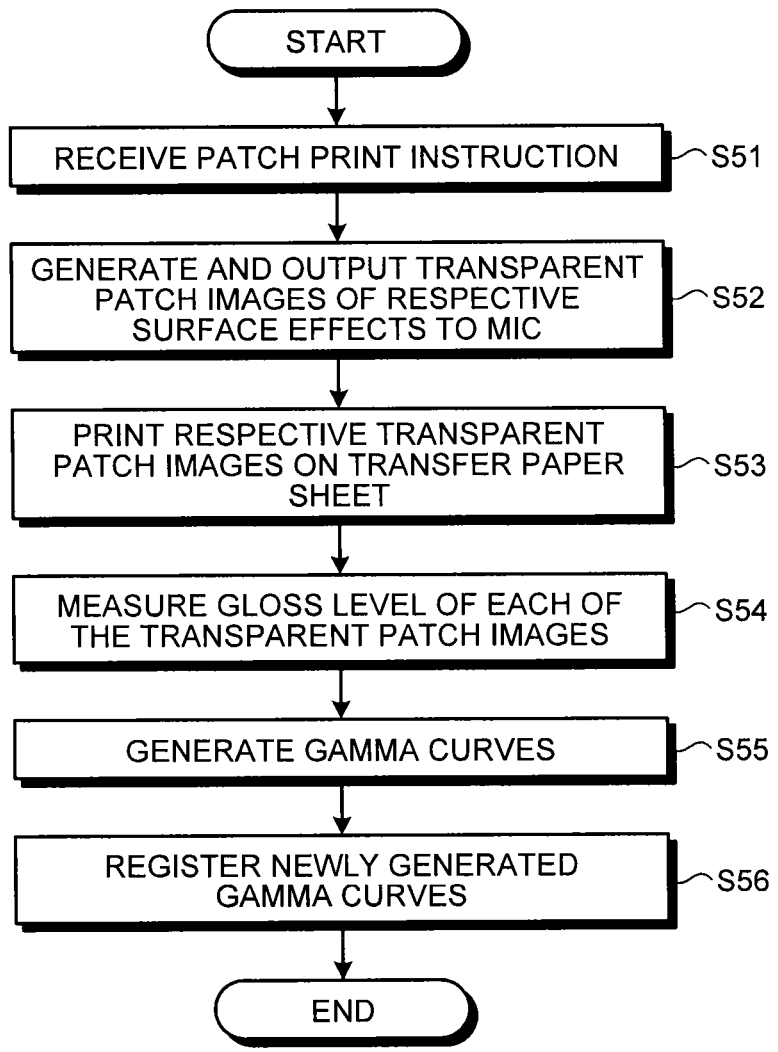
FIG. 29 is a flowchart illustrating an example of a calibration operation of the first embodiment.

Referring now to FIG. 29, the calibration operation to be performed by the image forming system of this embodiment is described. FIG. 29 is a flowchart illustrating an example of the calibration operation to be performed by the image forming system of this embodiment. As illustrated in FIG. 29, the DFE 50 first receives a patch print instruction from the host device 10 or the like (step S51).

Here, the patch print instruction is an instruction to print respective transparent patch images for PG, G, and M. However, the patch print instruction is not limited to that, and may be an instruction to print transparent patch images for one of the surface effects, for example. Although an example case where calibration is performed for PG, G, and M is now described, the present invention is not limited to that, and only the calibration for one of the surface effects can be performed, for example. In a case where the calibration only for PG is performed, for example, the patch print instruction may contain the on/off information (not illustrated) indicating switching on of the glosser 80, and the on/off information may be output together with the transparent patch image data to the MIC 60. The transparent patch images formed on a transfer paper sheet by the printer unit 70 are then pressed by the glosser 80 at a high temperature and a high pressure, to turn into transparent patch images with high gloss levels.

Using the target information stored in the target storage unit 202 and the layout information stored in the tone patch storage unit 204, the DFE 50 then generates image data of transparent patch images, and outputs the image data to the MIC 60 (step S52). This is described below in greater detail. As illustrated in FIG. 25, when receiving a patch print instruction, the rendering engine 51 reads the target information corresponding to the respective types of surface effects from the target storage unit 202, and reads the layout information corresponding to the respective types of surface effects from the tone patch storage unit 204, for each of the types of surface effects. Using the target information corresponding to the respective types of surface effects and the layout information corresponding to the respective types of surface effects, the rendering engine 51 generates 8-bit transparent patch image data for each of the types of surface effects. The halftone engine 55 then reads halftone data (dither data) stored in the halftone data storage unit 208, and performs halftone processing on the transparent patch image data for each surface effect, using the read halftone data. In this manner, the 8-bit transparent patch image data is converted into 2-bit transparent patch image data, and is output to the MIC 60.

As described above, it can be considered that the DFE 50 includes a patch image generating unit (the rendering engine 51 and the halftone engine 55 in this example) that generates the transparent patch image data to be used for the respective types of surface effects in setting the gamma curves corresponding to the respective types of surface effects.

Referring back to FIG. 29, the transparent patch image data for each surface effect output to the MIC 60 is then output to the printer unit 70. Using the respective transparent patch image data (2-bit image data) transferred from the MIC 60, the printer unit 70 forms images by applying the clear toner onto a transfer paper sheet. That is, each transparent patch image is printed on a transfer paper sheet (step S53). The gloss meter 224 then measures the gloss level of each of the transparent patch images formed on the transfer paper sheet (step S54). The results of the measurement of the gloss levels of the respective transparent patch images are output to the first changing unit 226. Using the results of the measurement carried out by the gloss meter 224 and the target information, the first changing unit 226 generates gamma curves (step S55). More specifically, using the results of the measurement of the gloss levels of the transparent patch images corresponding to the respective types of surface effects, and the target information corresponding to the respective types of surface effects, the first changing unit 226 generates a gamma curve for each of the types of surface effects, so as to achieve the relationships indicated by the target information corresponding to the respective types of surface effects. The first changing unit 226 then registers the newly generated gamma curves, instead of the gamma curves previously registered in the gamma correction storage unit 206 (step S56).

As described above, in this embodiment, gamma curves corresponding to the respective types of surface effects are generated so as to achieve the relationships indicated by the target information corresponding to the respective types of surface effects, by using the results of the measurement of the gloss levels of patch images corresponding to the respective types of surface effects, and the target information corresponding to the respective types of surface effects. In this manner, gloss levels suitable for the respective types of surface effects can be advantageously achieved.

Second Embodiment

Next, a second embodiment is described. It should be noted that the same components as those in the above described first embodiment are denoted by the same reference numerals as those used in the first embodiment, and explanation of them is omitted herein. In this embodiment, the halftone data storage unit 208 stores more than one piece of dither data with different numbers of screen lines set therein. The DFE 50 generates transparent patch image data corresponding to each of the pieces of the dither data stored in the halftone data storage unit 208. The DFE 50 changes gamma curves, using the results of measurement of the gloss level of the patch image having the widest range of gloss levels measured by the gloss meter 224, and target information. The DFE 50 also sets the dither data corresponding to the transparent patch image with the widest range of gloss levels measured by the gloss meter 224, as the dither data to be used in the halftone processing to be performed to generate clear toner plane image data. This operation is described below in greater detail.

Figure 30:
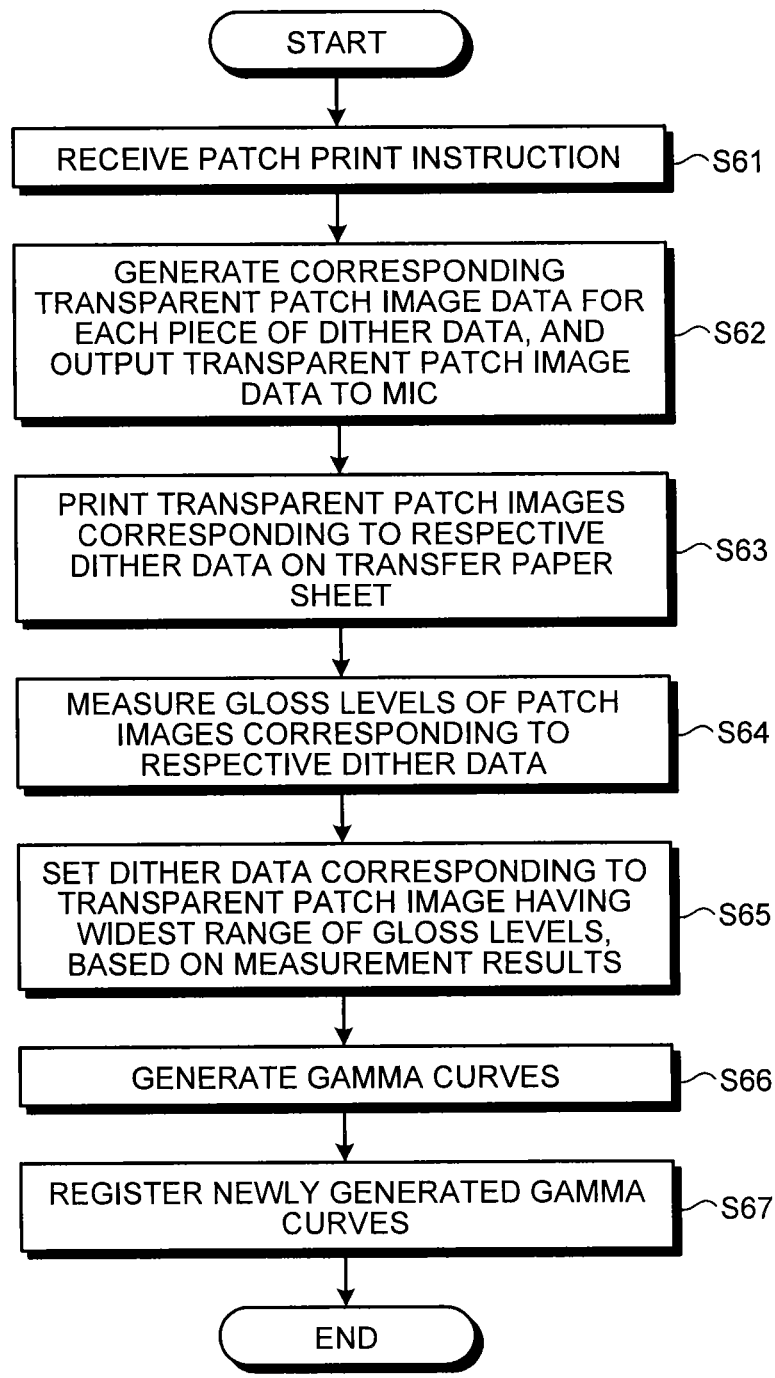
FIG. 30 is a flowchart illustrating an example of a calibration operation of a second embodiment.

FIG. 30 is a flowchart illustrating an example of a calibration operation to be performed by the image forming system of this embodiment. As illustrated in FIG. 30, the DFE 50 first receives a patch print instruction from the host device 10 or the like (step S61).

The DFE 50 then generates transparent patch image data for each of the pieces of dither data stored in the halftone data storage unit 208, and outputs the transparent patch image data corresponding to the dither data to the MIC 60 (step S62). The details of this procedure are as follows. When receiving a patch print instruction, the rendering engine 51 reads the target information corresponding to the respective types of surface effects from the target storage unit 202, and reads the layout information corresponding to the respective types of surface effects from the tone patch storage unit 204, for each of the types of surface effects. Using the target information corresponding to the respective types of surface effects and the layout information corresponding to the respective types of surface effects, the rendering engine 51 generates 8-bit transparent patch image data for each of the types of surface effects. The halftone engine 55 then performs halftone processing on the transparent patch image data for each surface effect, using the pieces of the dither data stored in the halftone data storage unit 208. Through this process, 2-bit transparent patch image data (the transparent patch image data for the respective surface effects) on which the halftone processing using the dither data has been performed is generated for each piece of the dither data, and is output to the MIC 60.

The transparent patch image data output to the MIC 60 is then output to the printer unit 70. Using the transparent patch image data transferred from the MIC 60, the printer unit 70 forms images by applying the clear toner onto a transfer paper sheet. That is, transparent patch images (transparent patch images for the respective surface effects) corresponding to the respective pieces of dither data are printed on a transfer paper sheet (step S63). The gloss meter 224 then measures the gloss level of each of the transparent patch images corresponding to the respective pieces of dither data formed on the transfer paper sheet (step S64). The results of the measurement of the gloss levels of the transparent patch images corresponding to the respective pieces of dither data are output to the first changing unit 226.

Based on the results of the measurement carried out by the gloss meter 224, the first changing unit 226 sets the dither data corresponding to the transparent patch image with the widest range of gloss levels measured by the gloss meter 224 among the pieces of dither data stored in the halftone data storage unit 208, as the dither data to be used in the halftone processing to be performed to generate clear toner plane image data (step S65).

The first changing unit 226 then generates a gamma curve for each of the types of surface effects, using the results of the measurement of the gloss level of the patch image having the widest range of gloss levels measured by the gloss meter 224, and the target information (step S66). The details of this procedure are basically the same as those of step S55 of FIG. 29. The first changing unit 226 then registers the newly generated gamma curves, instead of the gamma curves previously registered in the gamma correction storage unit 206 (step S67).

As described above, in this embodiment, a gamma curve for each of the types of surface effects is generated by using the results of the measurement of the gloss level of the patch image having the widest range of gloss levels measured by the gloss meter 224, and the target information. Also, the dither data corresponding to the transparent patch image with the widest range of gloss levels measured by the gloss meter 224 is set as the dither data to be used in the halftone processing to be performed to generate clear toner plane image data. That is, according to this embodiment, the setting in which the range of gloss levels becomes widest is used, so that an expression difference caused by a gloss level can be easily made to appear every time a gloss control plane is supplied.

Third Embodiment

Next, a third embodiment is described. It should be noted that the same components as those in the above described respective embodiments are denoted by the same reference numerals as those used in the above described embodiments, and explanation of them is omitted herein. This embodiment differs from each of the above described embodiments in that the target storage unit 202 stores more than one piece of target information that is set beforehand for each type of surface effects, in accordance with combinations of types of surface effects and types of paper sheets.

FIG. 31 is a diagram illustrating more than one piece (three pieces in this example) of target information corresponding to the surface effect "PG". FIG. 31 illustrates target information that is set for the combination of PG and "plain paper A", target information that is set for the combination of PG and "plain paper B", and target information that is set for the combination of PG and "gloss coated paper A". However, the present invention is not limited to that, and target information that is set for a combination of PG and any other paper sheet may be stored in the target storage unit 202. The same applies to the surface effects "G" and "M".

In this example, a tone correction parameter is set for each combination of a type of surface effect and a type of paper sheet. That is, a different parameter is set for each combination of a type of surface effect and a type of paper sheet. More specifically, the gamma correction storage unit 206 stores gamma curves corresponding to respective combinations of types of surface effects and types of paper sheets. Also, the tone patch storage unit 204 stores layout information for specifying transparent patch image layouts for the respective combinations of types of surface effects and types of paper sheets.

The calibration operation in this case is basically the same as that of the above described first embodiment, and can also be combined with that of the second embodiment. Referring now to FIG. 29, this operation is briefly described. First, the DFE 50 receives a patch print instruction from the host device 10 or the like (step S51 in FIG. 29). Using the target information stored in the target storage unit 202 and the layout information stored in the tone patch storage unit 204, the DFE 50 then generates image data of transparent patch images, and outputs the image data to the MIC 60 (step S52 in FIG. 29). The details of this procedure are as follows. When receiving a patch print instruction, the rendering engine 51 reads the corresponding target information from the target storage unit 202, and reads the corresponding layout information from the tone patch storage unit 204, for each combination of a type of surface effect and a type of paper sheet. Using the corresponding target information and the corresponding layout information, the rendering engine 51 generates 8-bit transparent patch image data for each combination of a type of surface effect and a type of paper sheet. The halftone engine 55 then reads halftone data (dither data) stored in the halftone data storage unit 208, and performs halftone processing on the transparent patch image data generated for each combination of a type of surface effect and a type of paper sheet, using the read halftone data. In this manner, the 8-bit transparent patch image data is converted into 2-bit transparent patch image data, and is output to the MIC 60.

The respective transparent patch image data output to the MIC 60 is then output to the printer unit 70. Using the respective transparent patch image data (2-bit image data) transferred from the MIC 60, the printer unit 70 forms images by applying the clear toner onto a transfer paper sheet. That is, each transparent patch image is printed on a transfer paper sheet (step S53 in FIG. 29). The gloss meter 224 then measures the gloss level of each of the transparent patch images formed on the transfer paper sheet (step S54 in FIG. 29). The results of the measurement of the gloss levels of the respective transparent patch images are output to the first changing unit 226. Using the results of the measurement carried out by the gloss meter 224 and the target information, the first changing unit 226 generates gamma curves (step S55 in FIG. 29). More specifically, using the results of the measurement of the gloss levels of the transparent patch images corresponding to the respective combinations of types of surface effects and types of paper sheets, and the target information corresponding to the respective combinations, the first changing unit 226 generates a gamma curve for each of the combinations, so as to achieve the relationships indicated by the target information corresponding to the respective combinations. The first changing unit 226 then registers the newly generated gamma curves, instead of the gamma curves previously registered in the gamma correction storage unit 206 (step S56 in FIG. 29).

As described above, the gamma curve for each of the combinations is changed so as to achieve the relationships indicated by the target information corresponding to the respective combinations, by using the results of the measurement of the gloss levels of the transparent patch images corresponding to the respective combinations of types of surface effects and types of paper sheets, and the target information corresponding to the respective combinations. Thus, gloss levels suitable for the respective combinations of types of surface effects and types of paper sheets can be advantageously achieved.

Fourth Embodiment

Next, a fourth embodiment is described. It should be noted that the same components as those in the above described respective embodiments are denoted by the same reference numerals as those used in the above described embodiments, and explanation of them is omitted herein. This embodiment differs from each of the above described embodiments in that the DFE 50 has a function to change the target information stored in the target storage unit 202 in accordance with an input. This aspect is described below in greater detail.

Figure 32:
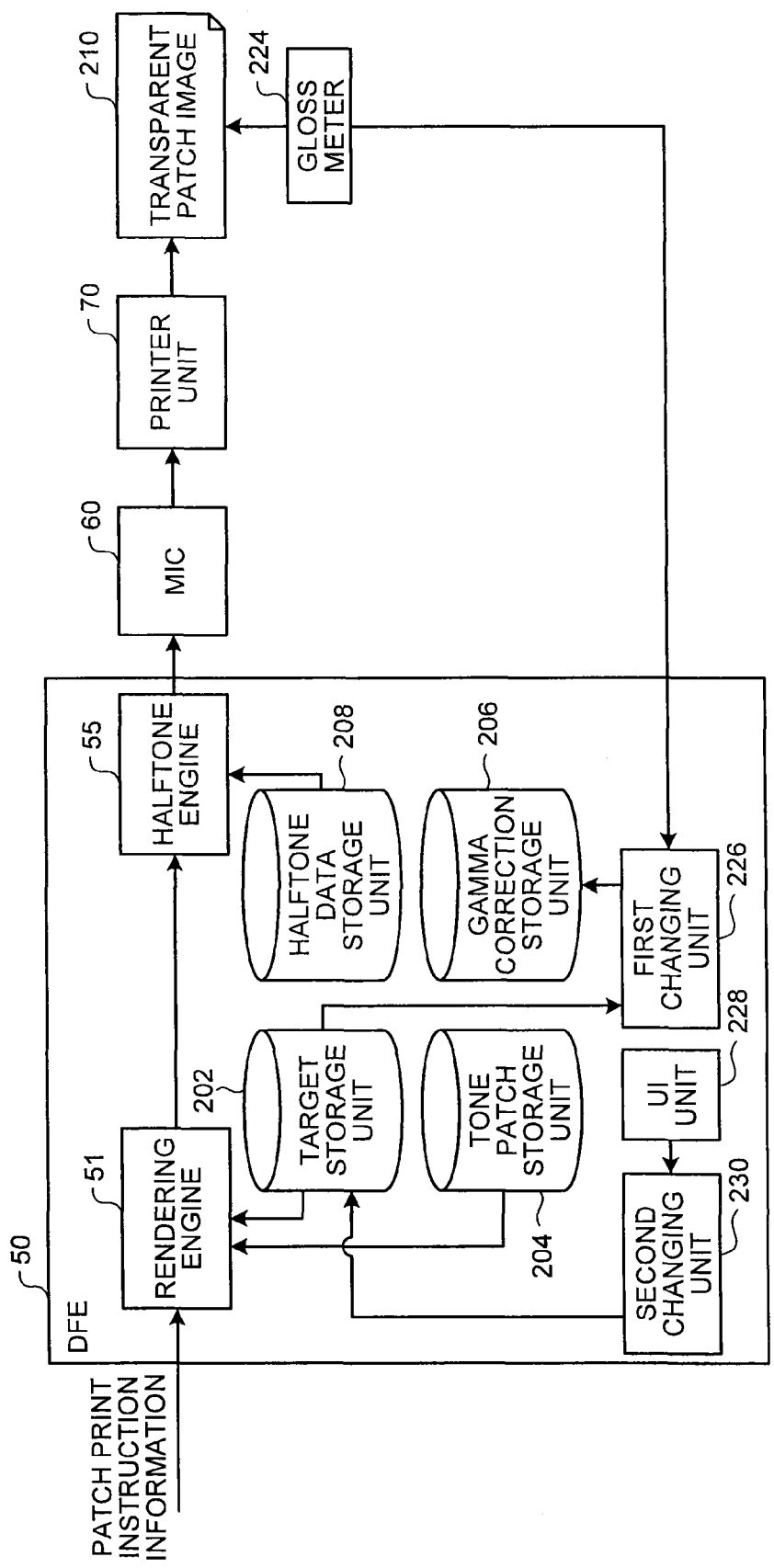
FIG. 32 is a diagram schematically illustrating an example structure of an image forming system of a fourth embodiment.

FIG. 32 is a diagram schematically illustrating an example structure of an image forming system of this embodiment. In this drawing, only the components necessary for the calibration operation are illustrated, as in FIG. 25. As illustrated in FIG. 32, the DFE 50 differs from the structure illustrated in FIG. 25, in further including a UI (User Interface) unit 228 and a second changing unit 230.

Figure 33:
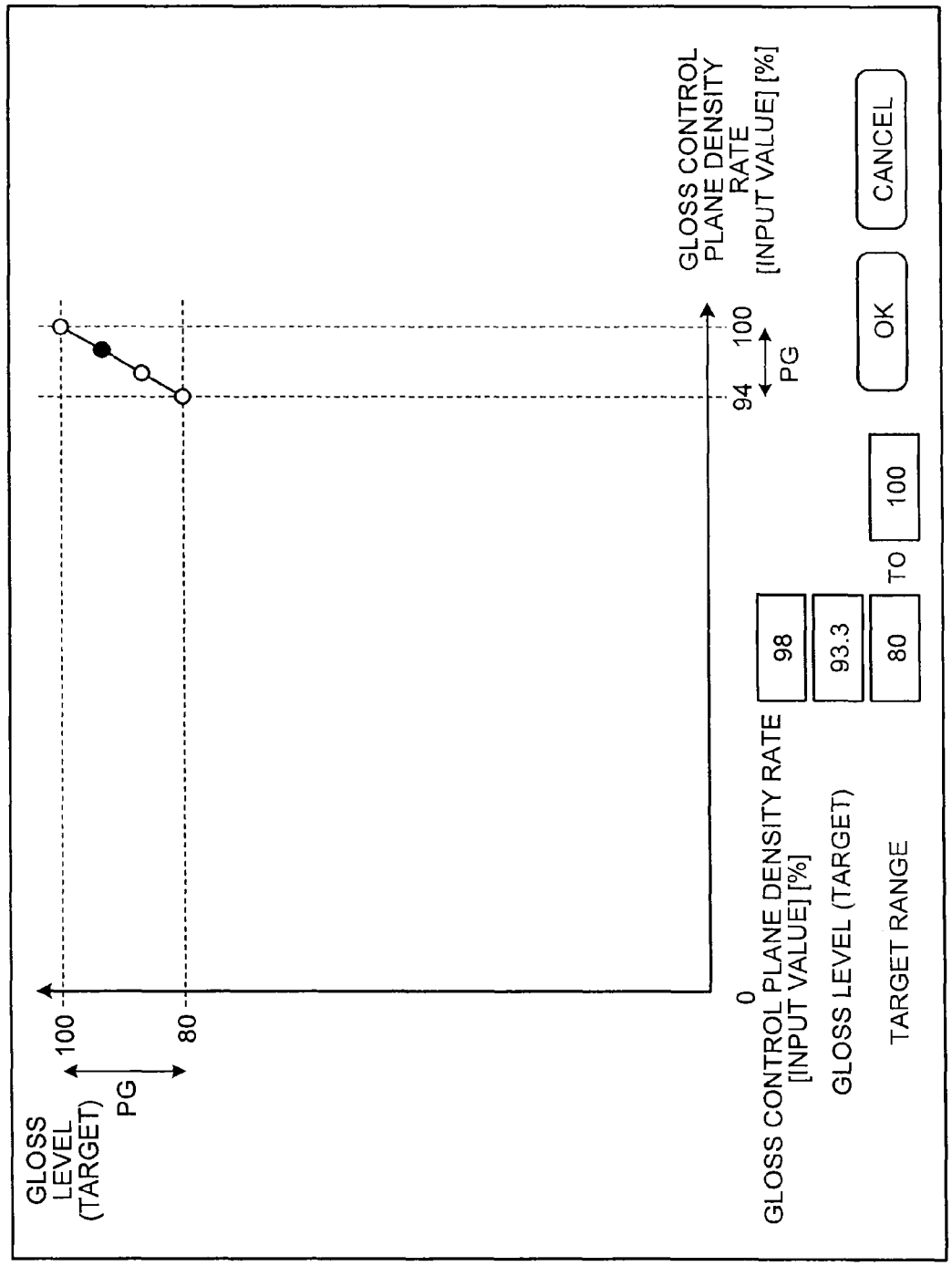
FIG. 33 is a diagram illustrating an example screen on which a user is made to edit target information.

The UI unit 228 displays various kinds of information and receives various kinds of instructions. In this embodiment, a screen for the user to edit target information is displayed on the UI unit 228, as illustrated in FIG. 33. Here, an example of the screen for editing a target value is illustrated. The target value indicates what gloss level should be achieved as a result of printing with respect to the density rate in the PG region of the PG gloss control plane 5611. The UI unit 228 can display the same editing screen for G and M.

In the example illustrated in FIG. 33, the user designates a target range of gloss levels for PG, and can then input a density rate (an input value) of the gloss control plane corresponding to PG and a target value (a gloss level) corresponding to the density rate. In this example, the target range of gloss levels for PG is 80 to 100, the range of density rates of the gloss control plane corresponding to PG is 94 to 100, and the target information is edited for a density rate within the range of density rates corresponding to PG. For example, the target value for a density rate of 98% of the gloss control plane can be set at 93.3. In the example illustrated in FIG. 33, the target information is represented by a straight line indicating a monotonic increase. However, the target information is not limited to that, and may be represented by a curved line, for example.

Referring back to FIG. 32, the second changing unit 230 changes the target information stored in the target storage unit 202 in accordance with an input received by the UI unit 228. As described above, the DFE 50 of this embodiment has the function to change the target information stored in the target storage unit 202 in accordance with an input. Accordingly, the target information can be flexibly set in accordance with user environments.

Fifth Embodiment

Next, a fifth embodiment is described. It should be noted that the same components as those in the above described respective embodiments are denoted by the same reference numerals as those used in the above described embodiments, and explanation of them is omitted herein. This embodiment differs from each of the above described embodiments in that the DFE 50 has a function to change the gamma curves stored in the gamma correction storage unit 206 in accordance with an input. This aspect is described below in greater detail.

Figure 34:
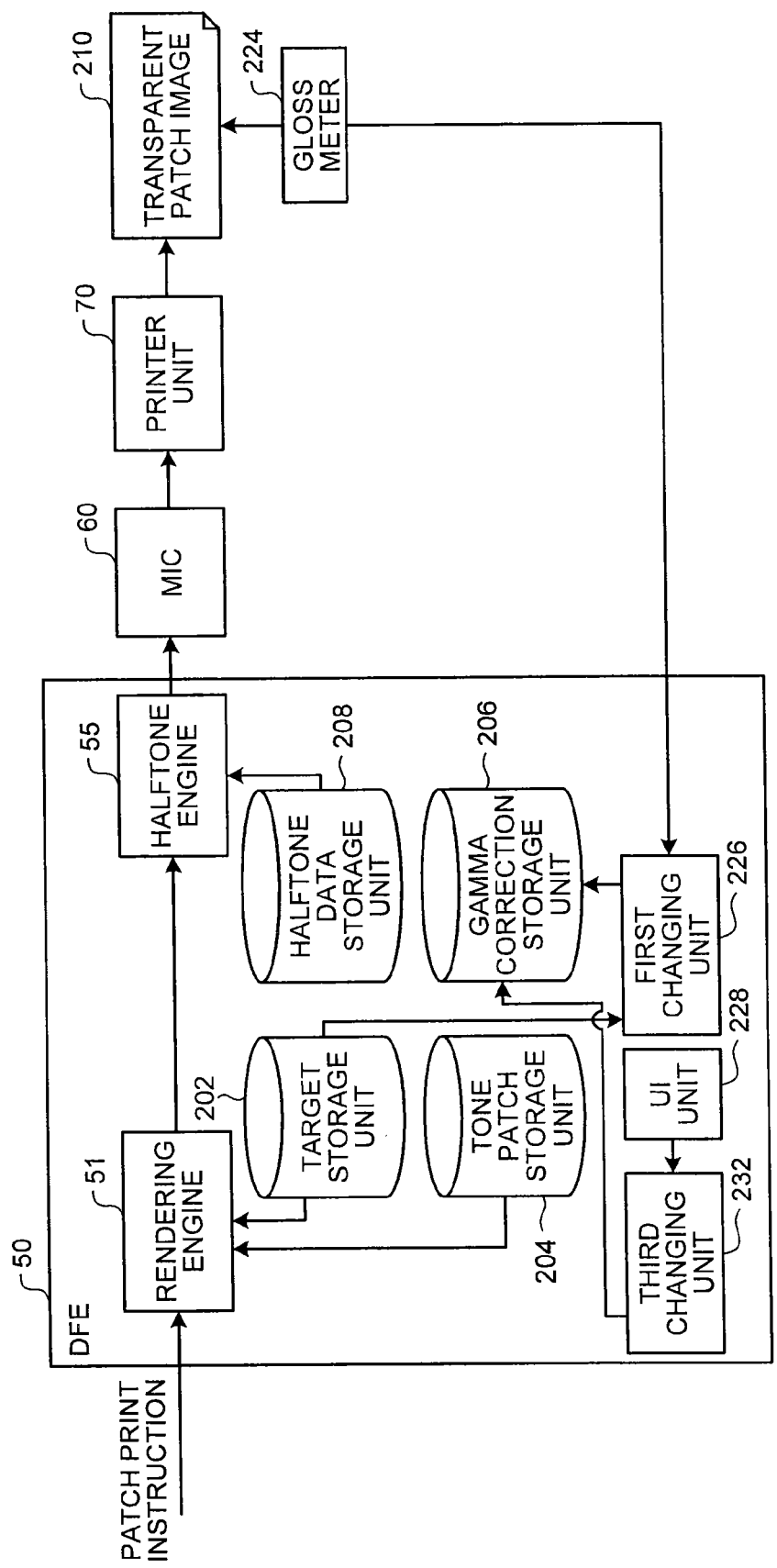
FIG. 34 is a diagram schematically illustrating an example structure of an image forming system of a fifth embodiment.

FIG. 34 is a diagram schematically illustrating an example structure of an image forming system of this embodiment. In this drawing, only the components necessary for the calibration operation are illustrated, as in FIG. 25. As illustrated in FIG. 34, the DFE 50 differs from the structure illustrated in FIG. 25, in further including a UI (User Interface) unit 228 and a third changing unit 232.

Figure 35:
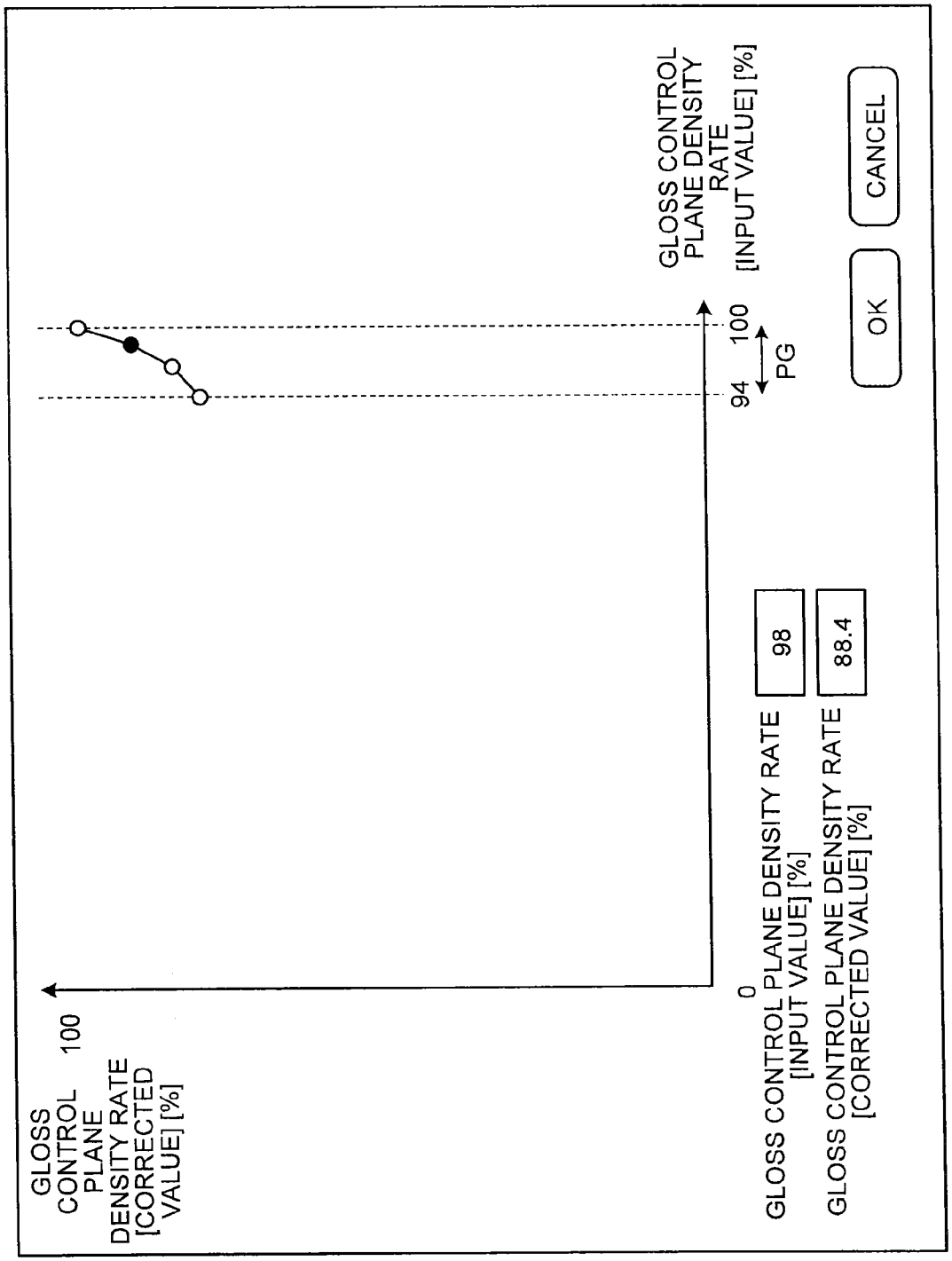
FIG. 35 is a diagram illustrating an example screen on which a user is made to edit a gamma curve.

The UI unit 228 displays various kinds of information and receives various kinds of instructions. In this embodiment, a screen for the user to edit gamma curves is displayed on the UI unit 228, as illustrated in FIG. 35. In this drawing, a screen for editing a gamma curve corresponding to PG is illustrated as an example. The UI unit 228 can display the same editing screen for G and M.

In the example illustrated in FIG. 35, the user can input a corrected (gamma-corrected) density rate with respect to the density rate of a gloss control plane that is an input. In this example, the range of density rates of the gloss control plane corresponding to PG is 94 to 100, and a corrected density rate is edited for a density rate within the range of density rates corresponding to PG. For example, the corrected density for a density rate of 98% of the gloss control plane can be set at 88.4. In the example illustrated in FIG. 35, the gamma curve is represented by a curved line indicating a monotonic increase. However, the gamma curve is not limited to that, and may be represented by a straight line, for example.

Referring back to FIG. 34, the third changing unit 232 changes the gamma curves stored in the gamma correction storage unit 206 in accordance with an input received by the UI unit 228. As described above, the DFE 50 of this embodiment has the function to change the gamma curves stored in the gamma correction storage unit 206 in accordance with an input. Accordingly, gamma curves can be flexibly set in accordance with user environments.

Sixth Embodiment

Next, a sixth embodiment is described. It should be noted that the same components as those in the above described respective embodiments are denoted by the same reference numerals as those used in the above described embodiments, and explanation of them is omitted herein. This embodiment differs from each of the above described embodiments in that the gloss meter 224 is not provided, and the calibration operation is performed without the use of the results of measurement of gloss levels of transparent patch images. This aspect is described below in greater detail.

Figure 36:
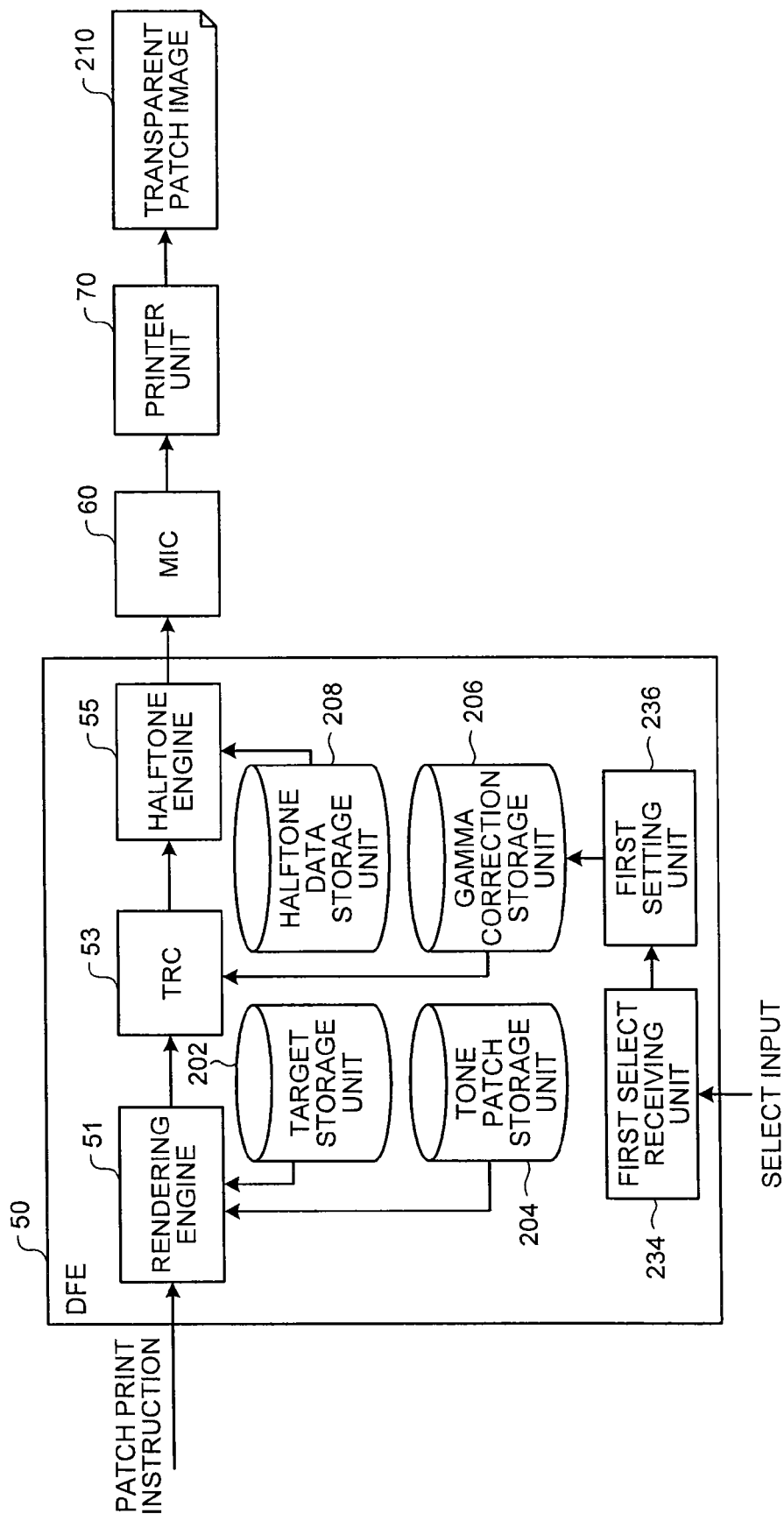
FIG. 36 is a diagram schematically illustrating an example structure of an image forming system of a sixth embodiment.

FIG. 36 is a diagram schematically illustrating an example structure of an image forming system of this embodiment. In this drawing, only the components necessary for the calibration operation are illustrated, as in FIG. 25. As illustrated in FIG. 36, the image forming system of this embodiment does not include the gloss meter 224. Also, the DFE 50 differs from that illustrated in FIG. 25 in requiring the TRC 53. The DFE 50 also differs from that illustrated in FIG. 25 in further including a first select receiving unit 234 and a first setting unit 236. Further, the gamma correction storage unit 206 stores more than one candidate gamma curve for each type of surface effect.

In this embodiment, the DFE 50 generates image data of transparent patch images (transparent patch image data) to be used for setting a gamma curve corresponding to a type of surface effect, for each candidate corresponding to the type of surface effect. The first select receiving unit 234 receives a select input indicating which one of the transparent patch images corresponding to the respective types of surface effects is to be selected for each of the types of surface effects. The first setting unit 236 sets the candidate corresponding to the transparent patch image indicated by the select input received by the first select receiving unit 234, as the gamma curve corresponding to the type of surface effect.

Figure 37:
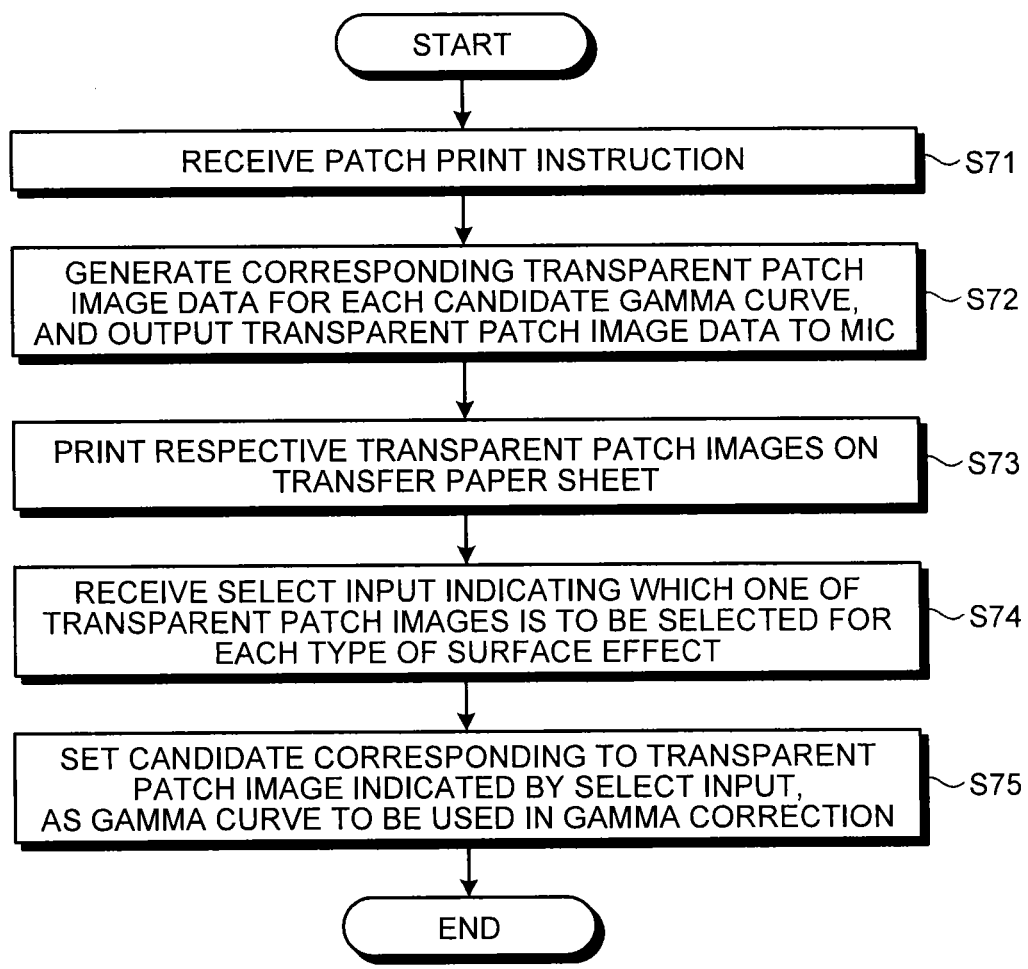
FIG. 37 is a flowchart illustrating an example of a calibration operation of the sixth embodiment.

FIG. 37 is a flowchart illustrating an example of a calibration operation to be performed by the image forming system of this embodiment. As illustrated in FIG. 37, the DFE 50 first receives a patch print instruction from the host device 10 or the like (step S71).

The DFE 50 then generates transparent patch image data corresponding to each candidate gamma curve corresponding to a type of surface effect, and outputs the transparent patch image data to the MIC 60 (step S72). The details of this procedure are as follows.

When receiving a patch print instruction, the rendering engine 51 reads the target information corresponding to the respective types of surface effects from the target storage unit 202, and reads the layout information corresponding to the respective types of surface effects from the tone patch storage unit 204, for each of the types of surface effects. Using the target information corresponding to the respective types of surface effects and the layout information corresponding to the respective types of surface effects, the rendering engine 51 generates 8-bit transparent patch image data for each of the types of surface effects. The TRC 53 then reads candidate gamma curves corresponding to each type of surface effects from the gamma correction storage unit 206. The TRC 53 performs a gamma correction on the transparent patch image data for each surface effect, with respect to each candidate corresponding to the type of surface effect. That is, transparent patch image data on which a gamma correction has been performed in accordance with each candidate is generated for each of the candidates corresponding to the type of surface effect. The halftone engine 55 then reads halftone data (dither data) stored in the halftone data storage unit 208, and performs halftone processing on the respective transparent patch image data, using the read halftone data. In this manner, the 8-bit transparent patch image data is converted into 2-bit transparent patch image data, and is output to the MIC 60. Those are the details of step S72.

As described above, it can be considered that the DFE 50 includes a patch image generating unit (the rendering engine 51, the TRC 53, and the halftone engine 55) that generates the transparent patch image data to be used for setting gamma curves corresponding to a type of surface effect, for each of the candidates corresponding to the type of surface effect.

Figure 38:
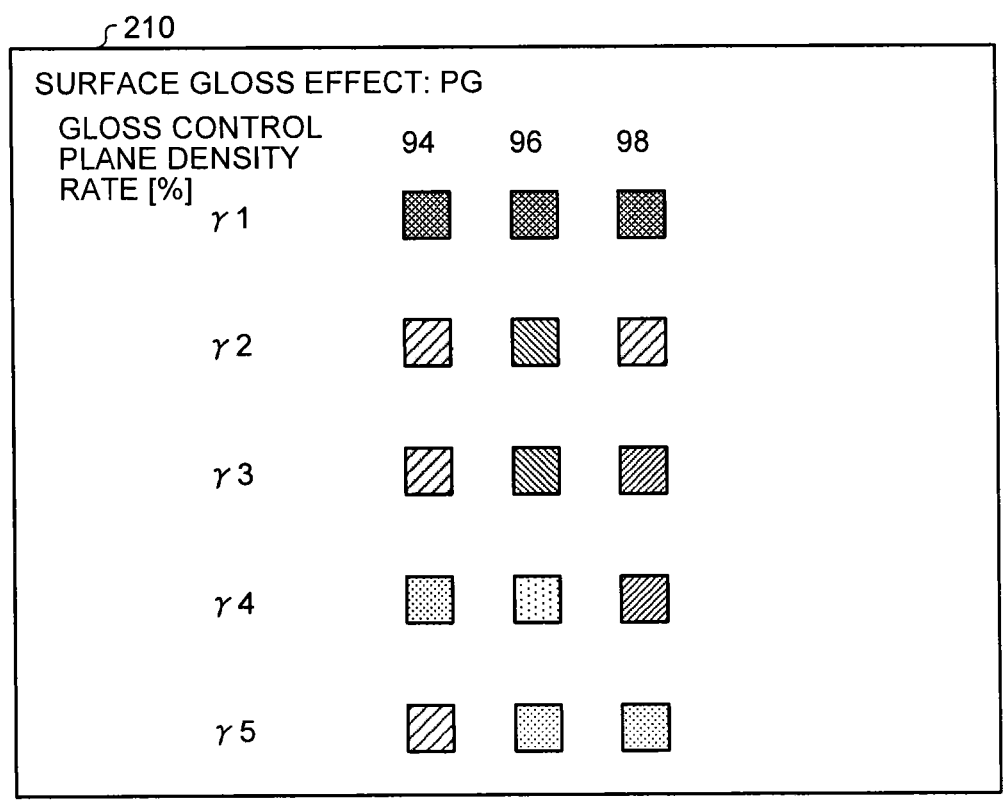
FIG. 38 is a diagram illustrating examples of transparent patch images formed for respective candidate gamma curves corresponding to the surface effect PG on a transfer paper sheet.

The respective transparent patch image data output to the MIC 60 is then output to the printer unit 70. Using the respective transparent patch image data (2-bit image data) transferred from the MIC 60, the printer unit 70 forms images by applying the clear toner onto a transfer paper sheet. That is, each transparent patch image is printed on a transfer paper sheet (step S73). FIG. 38 is a diagram illustrating an example of transparent patch images formed for respective candidate gamma curves (γ1 through γ5 in this example) corresponding to PG on a transfer paper sheet 210. It should be noted that the number of candidates is not limited to five, and any other number of candidates may be used. The same applies to the other surface effects.

The user then looks at each of the transparent patch images formed on the transfer paper sheet 210, and selects an optimum transparent patch image for each of the types of surface effects. That is, the first select receiving unit 234 receives a select input indicating which one of the transparent patch images corresponding to the respective types of surface effects is to be selected for each of the types of surface effects (step S74). The first setting unit 236 then sets the candidate corresponding to the transparent patch image indicated by the select input received by the first select receiving unit 234, as the gamma curve to be used in the gamma correction at the time of generation of clear toner plane data (step S75).

As described above, transparent patch images corresponding to each of candidate gamma curves corresponding to the respective types of surface effects are formed on the transfer paper sheet 210. Accordingly, the user can look at each of the transparent patch images formed on the transfer paper sheet 210, and select an optimum transparent patch image for each type of surface effect. Since the candidate gamma curve corresponding to the selected transparent patch image is set as the gamma curve to be used in the gamma correction, input/output characteristics to the user's favorite can be realized.

Seventh Embodiment

Next, a seventh embodiment is described. It should be noted that the same components as those in the above described respective embodiments are denoted by the same reference numerals as those used in the above described embodiments, and explanation of them is omitted herein. This embodiment differs from each of the above described embodiments in that gamma curves are not stored in the gamma correction storage unit 206 before the calibration operation is performed. Also, the gloss meter 224 is not provided, as in the sixth embodiment. This aspect is described below in greater detail.

Figure 39:
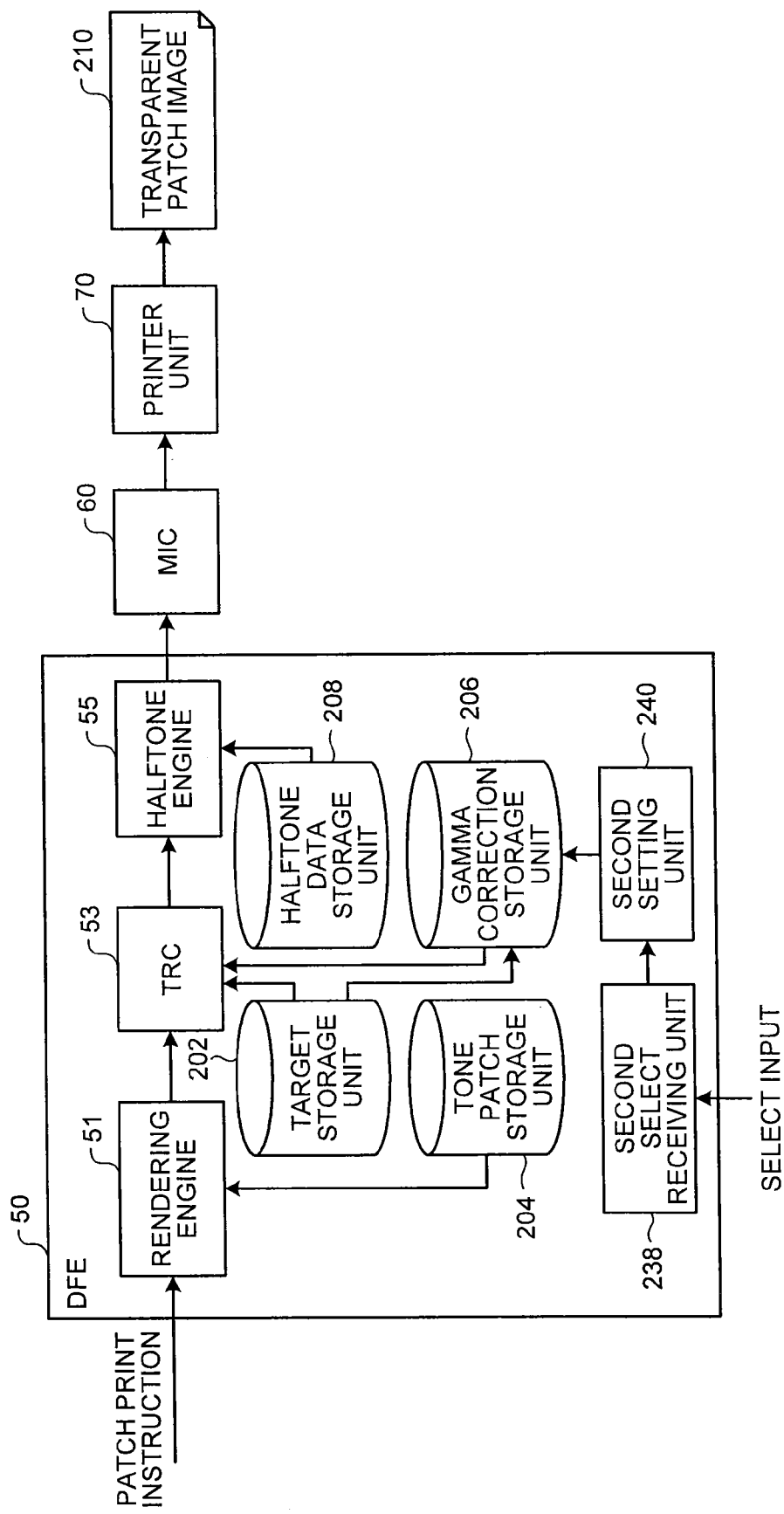
FIG. 39 is a diagram schematically illustrating an example structure of an image forming system of a seventh embodiment.

FIG. 39 is a diagram schematically illustrating an example structure of an image forming system of this embodiment. In this drawing, only the components necessary for the calibration operation are illustrated, as in FIG. 25. As illustrated in FIG. 39, the image forming system of this embodiment does not include the gloss meter 224. Also, the DFE 50 differs from that illustrated in FIG. 25 in requiring the TRC 53. The DFE 50 also differs from that illustrated in FIG. 25 in further including a second select receiving unit 238 and a second setting unit 240. Further, the target storage unit 202 stores at least one piece of target information for each type of surface effect. In this example, the target storage unit 202 stores more than one type of target information for each type of surface effect. However, the present invention is not limited to that, and the target storage unit 202 may store one piece of target information for each type of surface effect.

In this embodiment, the DFE 50 generates image data of transparent patch images (transparent patch image data) to be used for setting a gamma curve corresponding to each type of surface effect, for each piece of target information corresponding to the type of surface effect. The second select receiving unit 238 receives a select input indicating which one of the transparent patch images corresponding to the respective types of surface effects is to be selected for each of the types of surface effects. The second setting unit 240 sets the target information corresponding to the transparent patch image indicated by the select input received by the second select receiving unit 238, as the gamma curve corresponding to the type of surface effect. As described above, the target information indicates the relationship between the density rates of the gloss control planes and the gloss levels (target values) to be obtained as a result of printing. However, it can also be considered that the target information indicates the relationship between the density rates prior to the gamma correction and the density rates after the gamma correction. Accordingly, the target information can be set as gamma curves.

Figure 40:
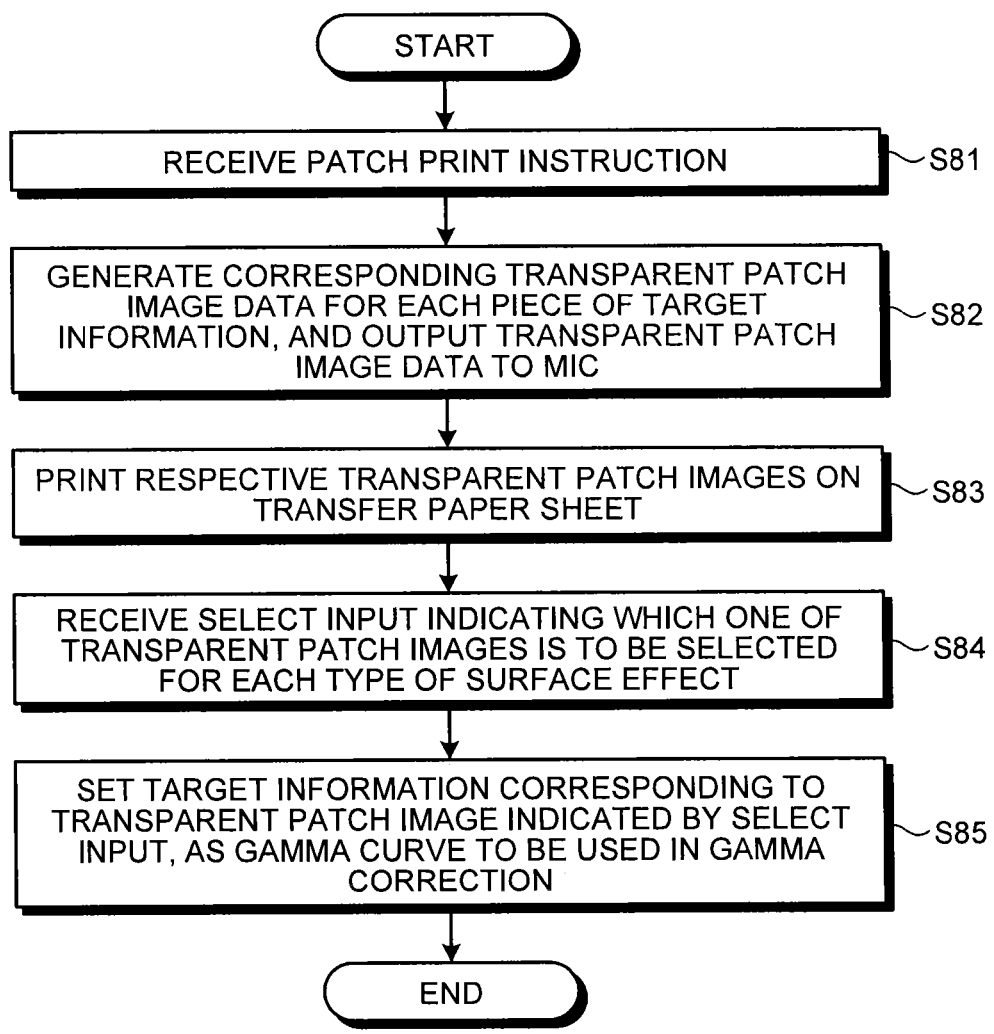
FIG. 40 is a flowchart illustrating an example of a calibration operation of the seventh embodiment.

FIG. 40 is a flowchart illustrating an example of a calibration operation to be performed by the image forming system of this embodiment. As illustrated in FIG. 40, the DFE 50 first receives a patch print instruction from the host device 10 or the like (step S81).

The DFE 50 then generates transparent patch image data corresponding to each piece of target information corresponding to the respective types of surface effects, and outputs the transparent patch image data to the MIC 60 (step S82). The details of this procedure are as follows.

When receiving a patch print instruction, the rendering engine 51 reads the layout information corresponding to the respective types of surface effects from the tone patch storage unit 204, for each of the types of surface effects. Using the layout information corresponding to the respective types of surface effects, the rendering engine 51 generates 8-bit transparent patch image data for each of the types of surface effects. The TRC 53 then reads at least one piece of target information from the target storage unit 202, for each type of surface effect. The TRC 53 performs a gamma correction on the transparent patch image data for each surface effect, with respect to the target information corresponding to each of the types of surface effects. That is, transparent patch image data on which a gamma correction has been performed in accordance with each piece of target information is generated for each piece of the target information corresponding to the types of surface effects. The halftone engine 55 then reads halftone data (dither data) stored in the halftone data storage unit 208, and performs halftone processing on the respective transparent patch image data, using the read halftone data. In this manner, the 8-bit transparent patch image data is converted into 2-bit transparent patch image data, and is output to the MIC 60. Those are the details of step S82.

As described above, it can be considered that the DFE 50 includes a patch image generating unit (the rendering engine 51, the TRC 53, and the halftone engine 55) that generates the transparent patch image data to be used for setting gamma curves corresponding to the respective types of surface effects, for each piece of target information corresponding to the respective types of surface effects.

The respective transparent patch image data output to the MIC 60 is then output to the printer unit 70. Using the respective transparent patch image data (2-bit image data) transferred from the MIC 60, the printer unit 70 forms images by applying the clear toner onto a transfer paper sheet. That is, each transparent patch image is printed on a transfer paper sheet 210 (step S83). The user then looks at each of the transparent patch images formed on the transfer paper sheet 210, and selects an optimum transparent patch image for each of the types of surface effects. That is, the second select receiving unit 238 receives a select input indicating which one of the transparent patch images corresponding to the respective types of surface effects is to be selected for each of the types of surface effects (step S84). The second setting unit 240 then sets the target information corresponding to the transparent patch image indicated by the select input received by the second select receiving unit 238, as the gamma curve to be used in the gamma correction at the time of generation of clear toner plane data (step S85).

As described above, transparent patch images corresponding to at least each piece of target information corresponding to the respective types of surface effects are formed on the transfer paper sheet 210. Accordingly, the user can look at each of the transparent patch images formed on the transfer paper sheet 210, and select an optimum transparent patch image for each type of surface effect. Since the target information corresponding to the selected transparent patch image is set as the gamma curve to be used in the gamma correction, input/output characteristics to the user's favorite can be realized.

Eighth Embodiment

An image forming system of an eighth embodiment has some of the functions of a host device and a DFE installed in a server device in a network.

Figure 41:
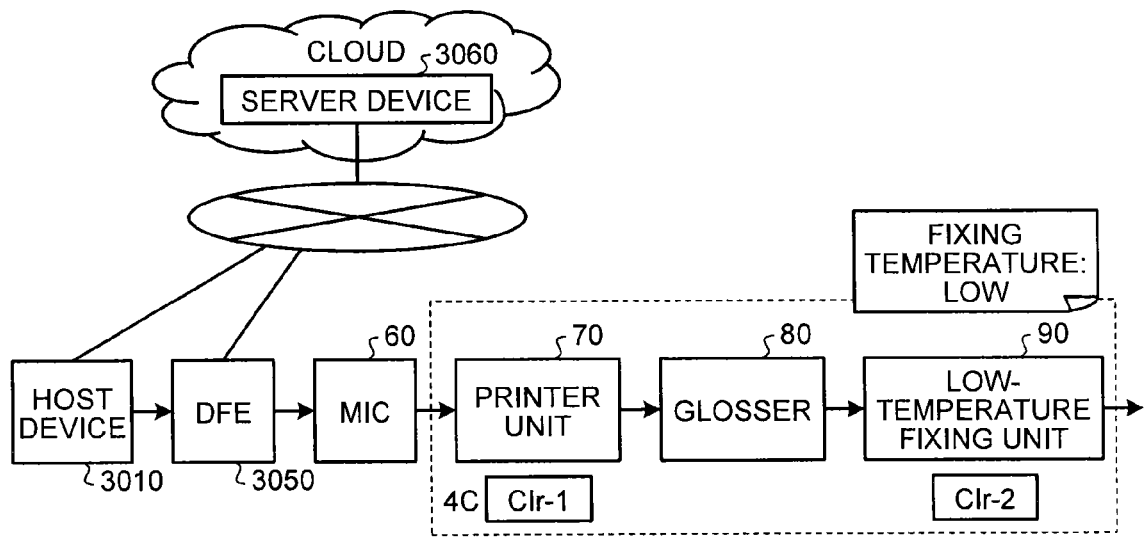
FIG. 41 is a diagram illustrating an example structure of an image forming system according to an eighth embodiment.

FIG. 41 is a diagram illustrating an example structure of an image forming system according to the eighth embodiment. As illustrated in FIG. 41, the image forming system of this embodiment includes a host device 3010, a DFE 3050, a MIC 60, a printer unit 70, a glosser 80, a low-temperature fixing unit 90, and a server device 3060 in the cloud. The post-processing devices such as the glosser 80 and the low-temperature fixing unit 90 are not limited to them.

In this embodiment, the host device 3010 and the DFE 3050 are connected to the server device 3060 via a network such as the Internet. Also, in this embodiment, the plane data generating unit and the print data generating unit of the host device 10 of the first embodiment, and the clear processor of the DFE 50 of the first embodiment are formed in the server device 3060.

Here, the connection configuration of the host device 3010, the DFE 3050, the MIC 60, the printer unit 70, the glosser 80, and the low-temperature fixing unit 90 is the same as that in the first embodiment.

Figure 42:
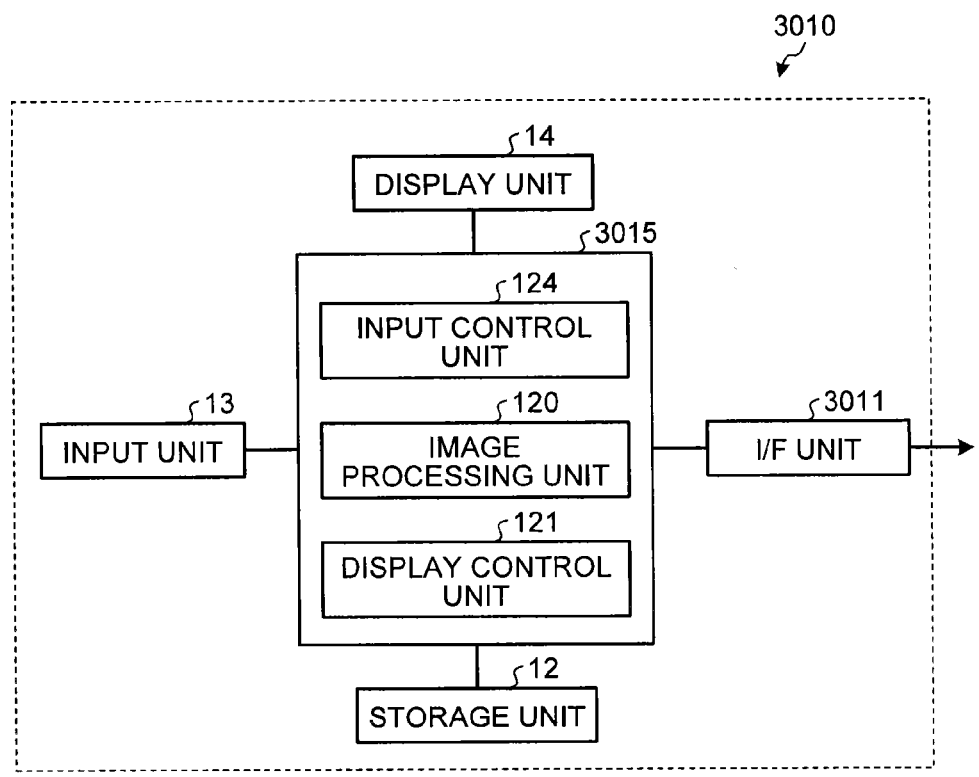
FIG. 42 is a block diagram illustrating the functional structure of the host device of the eighth embodiment.

First, the host device 3010 of this embodiment is described. FIG. 42 is a block diagram illustrating the functional structure of the host device 3010 according to the eighth embodiment. The host device 3010 of this embodiment includes an I/F unit 3011, a storage unit 12, an input unit 13, a display unit 14, and a control unit 3015, as illustrated in FIG. 42. The I/F unit 3011 is an interface device for performing communications with the server device 3060 and the DFE 3050. The storage unit 12, the input unit 13, and the display unit 14 have the same functions and structures as those of the host device 10 of the first embodiment.

The control unit 3015 controls the entire host device 3010, and is a computer that includes a CPU, ROM, RAM, and the like. As illustrated in FIG. 42, the control unit 3015 primarily includes an input control unit 124, an image processing unit 120, and a display control unit 121. Among those components, the input control unit 124 and the display control unit 121 are realized by the CPU of the control unit 3015 reading an operating system program stored in the ROM or the like, loading the program into the RAM, and executing the program. The image processing unit 120 can be realized by the CPU of the control unit 3015 reading the program of the above described image processing application stored in the ROM or the like, loading the program into the RAM, and executing the program. At least one of those components may be realized by an individual circuit (hardware). The functions and structures of the input control unit 124, the display control unit 121, and the image processing unit 120 are the same as those of the first embodiment.

In the host device 3010 of this embodiment, the input control unit 124 receives image designation information for designating an image to which a surface effect is to be given among various images (such as photographs, characters, figures, and images combining photographs, characters, and figures) stored in the storage unit 12, or color plane image data (a target image), and designation information containing a designation of the region to which the surface effect is to be given and the type of the surface effect, and a designation of a transparent image such as a watermark or a texture and the region to which the transparent image is to be given, as the user operates the input unit 13 while checking the target image displayed on the display unit 14, as in the first embodiment. Based on the designation of the region to which a surface effect is to be given and the type of the surface effect, which is contained in the designation information, the server device 3060 generates gloss control plane image data. Based on the designation of a transparent image such as a watermark or a texture and the region to which the transparent image is to be given, which is contained in the designation information, the server device 3060 generates clear plane image data. Generation of the image data of the respective planes will be described later.

Of the designation information, the designation of the region to which a surface effect is to be given and the type of the surface region will be hereinafter also referred to simply as the "surface effect designation". Of the designation information, the designation of a transparent image such as a watermark or a texture and the region to which the transparent image is to be given will be hereinafter also referred to simply as the "transparent image designation".

The I/F unit 3011 transmits a print data generation request, together with the image designation information and the designation information, to the server device 3060. The I/F unit 3011 also receives, from the server device 3060, print data generated by the server device 3060 in response to the generation request. Here, gloss control plane image data, color plane image data, and clear plane image data are the same as the respective image data in the first embodiment. Print data is formed by integrating color plane image data, gloss control plane image data, clear plane image data, and a job command, and is the same as the print data of the first embodiment illustrated in FIG. 10.

Figure 43:
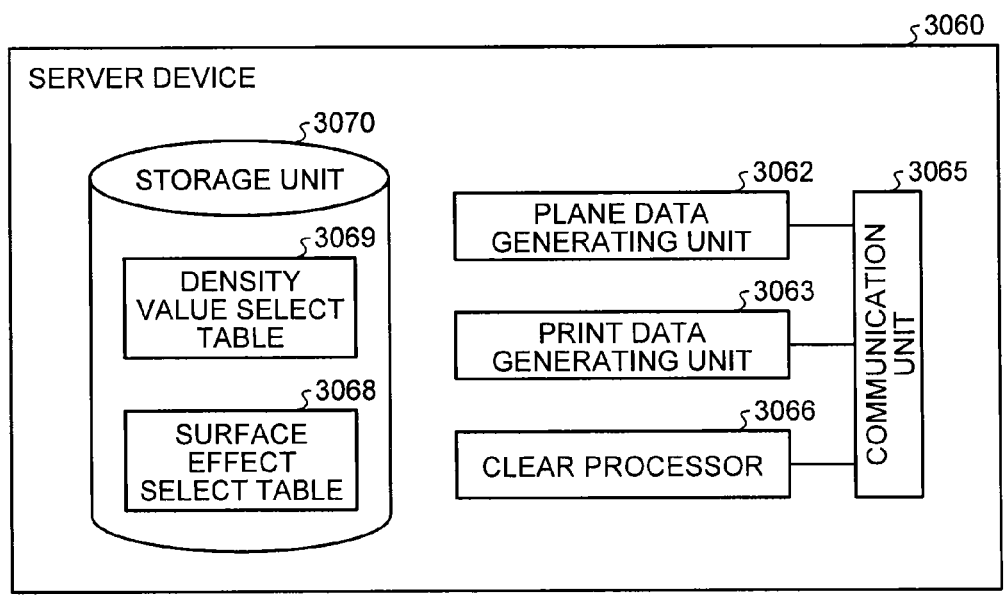
FIG. 43 is a block diagram illustrating the functional structure of the server device of the eighth embodiment.

Next, the server device 3060 is described. FIG. 43 is a block diagram illustrating the functional structure of the server device 3060 according to the eighth embodiment. As illustrated in FIG. 43, the server device 3060 primarily includes a storage unit 3070, a plane data generating unit 3062, a print data generating unit 3063, a clear processor 3066, and a communication unit 3065.

The storage unit 3070 is a storage medium such as a HDD or memory, and stores a density value select table 3069 and a surface effect select table 3068. The density value select table 3069 is the same as the density value select table 3069 of the first embodiment described with reference to FIG. 9. The surface effect select table 3068 is the same as the surface effect select table of the first embodiment described with reference to FIG. 11.

The communication unit 3065 exchanges various kinds of data and requests with the host device 3010 and the DFE 3050. More specifically, the communication unit 3065 receives image designation information, designation information, and a print data generation request from the host device 3010, and transmits generated print data to the host device 3010. The communication unit 3065 also receives 8-bit gloss control plane image data, 8-bit color plane image data, and a clear toner plane generation request from the DFE 3050, and transmits generated clear toner plane image data and on/off information to the DFE 3050.

The plane data generating unit 3062 has the same functions as those of the plane data generating unit in the host device 10 of the first embodiment, and generates color plane image data, gloss control plane image data, and clear plane image data.

Specifically, the plane data generating unit 3062 generates color plane image data, based on image designation information. That is, in a case where the image designation information contains a color designation made by the user for a drawing object of a target image, the plane data generating unit 3062 generates color plane image data in accordance with the color designation.

In a case where designation information contains a designation of a transparent image such as a watermark or a texture other than surface effects, and the region to which the transparent image is to be given, the plane data generating unit 3062 generates clear plane image data for specifying the transparent image and the region to which the transparent image is to be given on a transfer paper sheet, in accordance with the designation in the designation information from the user.

The plane data generating unit 3062 also refers to the density value select table 3069, and generates gloss control plane image data that can specify the region to which a surface effect is to be given on a transfer paper sheet, and the type of the surface effect, based on the designation of the region to which the surface effect is to be given and the type of the surface effect in the designation information. Here, the plane data generating unit 3062 generates gloss control plane image data designating regions to which surface effects indicated by gloss control values are to be given, on the basis of drawing objects of image data of target images (see FIGS. 4 and 13).

The print data generating unit 3063 of this embodiment generates the print data illustrated in FIG. 10, like the print data generating unit of the host device 10 of the first embodiment.

The clear processor 3066 has the same functions as those of the clear processor in the DFE 50 of the first embodiment. Specifically, using gloss control plane image data received by the communication unit 3065 from the DFE 3050, the clear processor 3066 refers to the described surface effect select table 3068, and determines the surface effects corresponding to the density values (pixel values) represented by the respective pixels forming the gloss control plane. In accordance with the determination results, the clear processor 3066 determines whether to switch on or off the glosser 80, and generates an inverse mask or a solid mask, where necessary, by using respective input 8-bit image data of CMYK. By doing so, the clear processor 3066 generates 2-bit clear toner plane image data for applying the clear toner, where appropriate. In accordance with the results of the surface effect determination, the clear processor 3066 generates the clear toner plane image data to be used at the printer unit 70, and the clear toner plane image data to be used at the low-temperature fixing unit 90, where appropriate, and outputs those image data. The clear processor 3066 also outputs the on/off information indicating switching on or off of the glosser 80.

Figure 44:
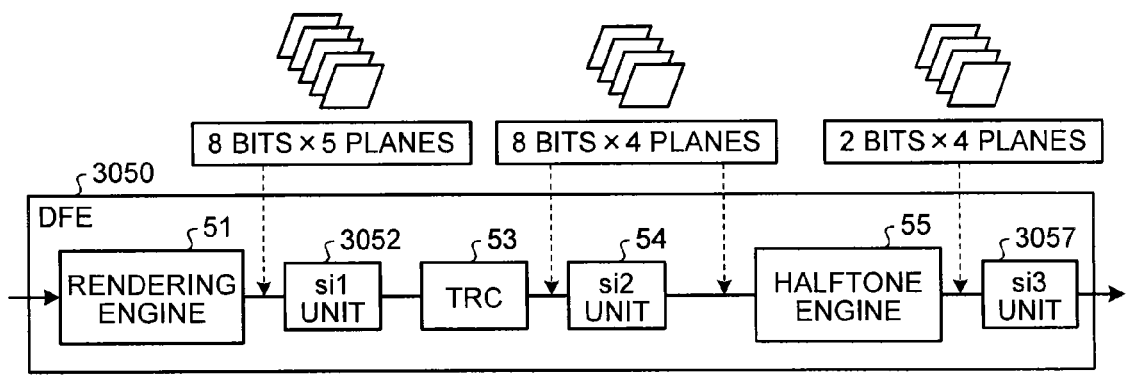
FIG. 44 is a block diagram illustrating the functional structure of the DFE of the eighth embodiment.

Next, the DFE 3050 is described. FIG. 44 is a block diagram illustrating the functional structure of the DFE 3050 of the eighth embodiment. The DFE 3050 of this embodiment primarily includes a rendering engine 51, a si1 unit 52, a TRC 53, a si2 unit 3054, a halftone engine 55, and a si3 unit 3057. Here, the rendering engine 51, the si1 unit 52, the TRC 53, and the halftone engine 55 have the same functions and structures as those of the DFE 50 of the first embodiment.

The si2 unit 3054 of this embodiment transmits an 8-bit gloss control plane converted by the rendering engine 51, 8-bit color plane image data of CMYK subjected to a gamma correction by the TRC 53, and a clear toner plane generation request to the server device 3060. The si3 unit 3057 receives clear toner plane image data and on/off information from the server device 3060.

Figure 45:
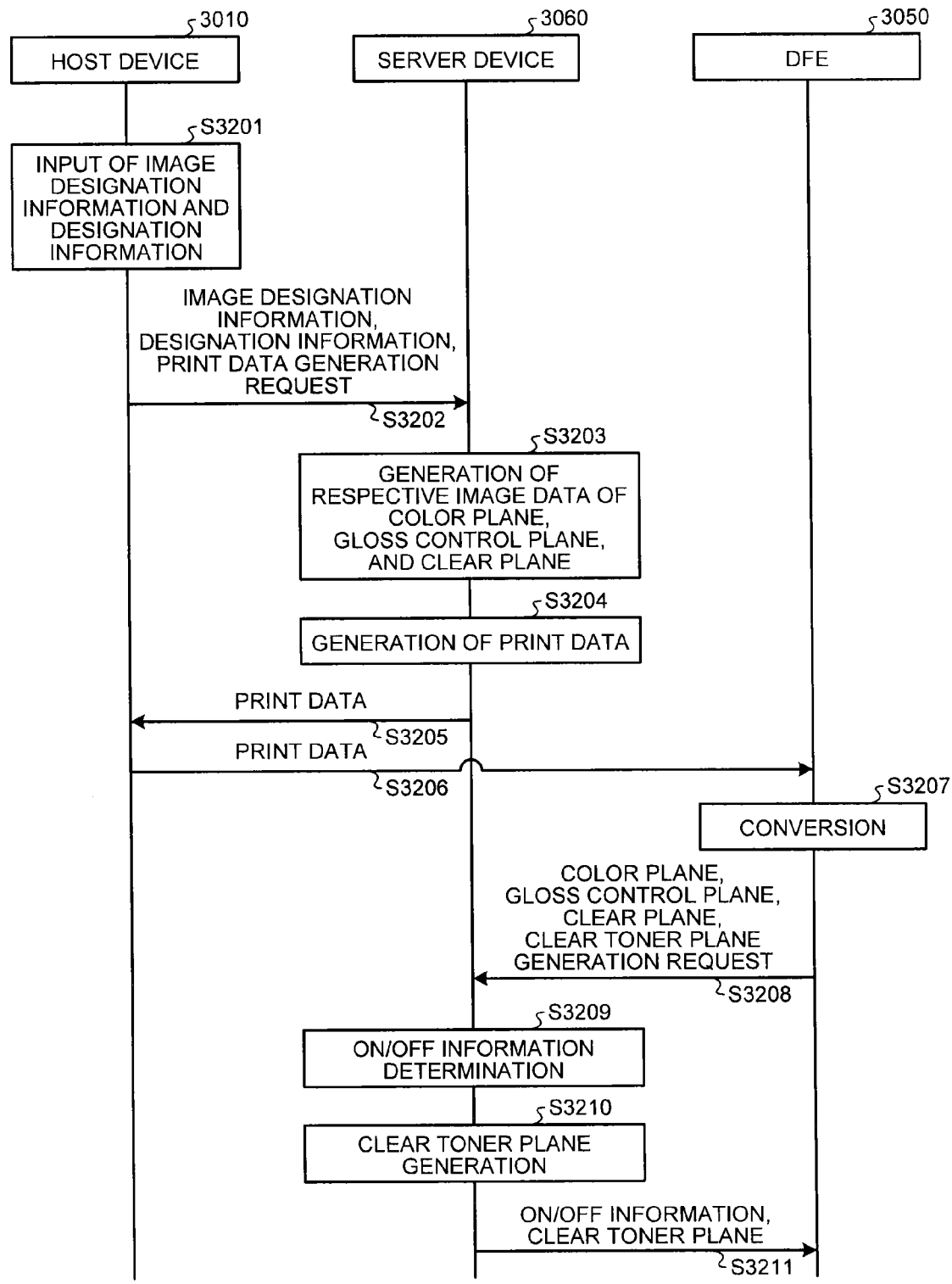
FIG. 45 is a sequence diagram illustrating the entire flow of a clear toner plane generating operation of the eighth embodiment.

Next, an operation to generate a clear toner plane required in a printing operation performed by the image forming system according to this embodiment with the above described structure is described. First, the entire flow of the clear toner plane generating operation is described. FIG. 45 is a sequence diagram illustrating the entire flow of the clear toner plane generating operation according to the eighth embodiment.

First, the host device 3010 receives an input of image designation information and designation information from the user (step S3201), and transmits a print data generation request, as well as the image designation information and the designation information, to the server device 3060 (step S3202).

The server device 3060 receives the print data generation request as well as the image designation information and the designation information, and generates color plane image data, gloss control plane image data, and clear plane image data (step S3203). The server device 3060 then generates print data from those image data (step S3204), and transmits the generated print data to the host device 3010 (step S3205).

Receiving the print data, the host device 3010 transmits the print data to the DFE 3050 (step S3206).

Receiving the print data from the host device 3010, the DFE 3050 analyzes the print data, obtains the color plane image data, the gloss control plane image data, and the clear plane image data, and performs a conversion, a correction, or the like on those image data (step S3207). The DFE 3050 then transmits the color plane image data, the gloss control plane image data, the clear plane image data, and a clear toner plane generation request to the server device 3060 (step S3208).

Receiving the color plane image data, the gloss control plane image data, the clear plane image data, and the clear toner plane generation request, the server device 3060 determines on/off information (step S3209), and generates clear toner plane image data (step S3210). The server device 3060 then transmits the generated clear toner plane image data to the DFE 3050 (step S3211).

Figure 46:
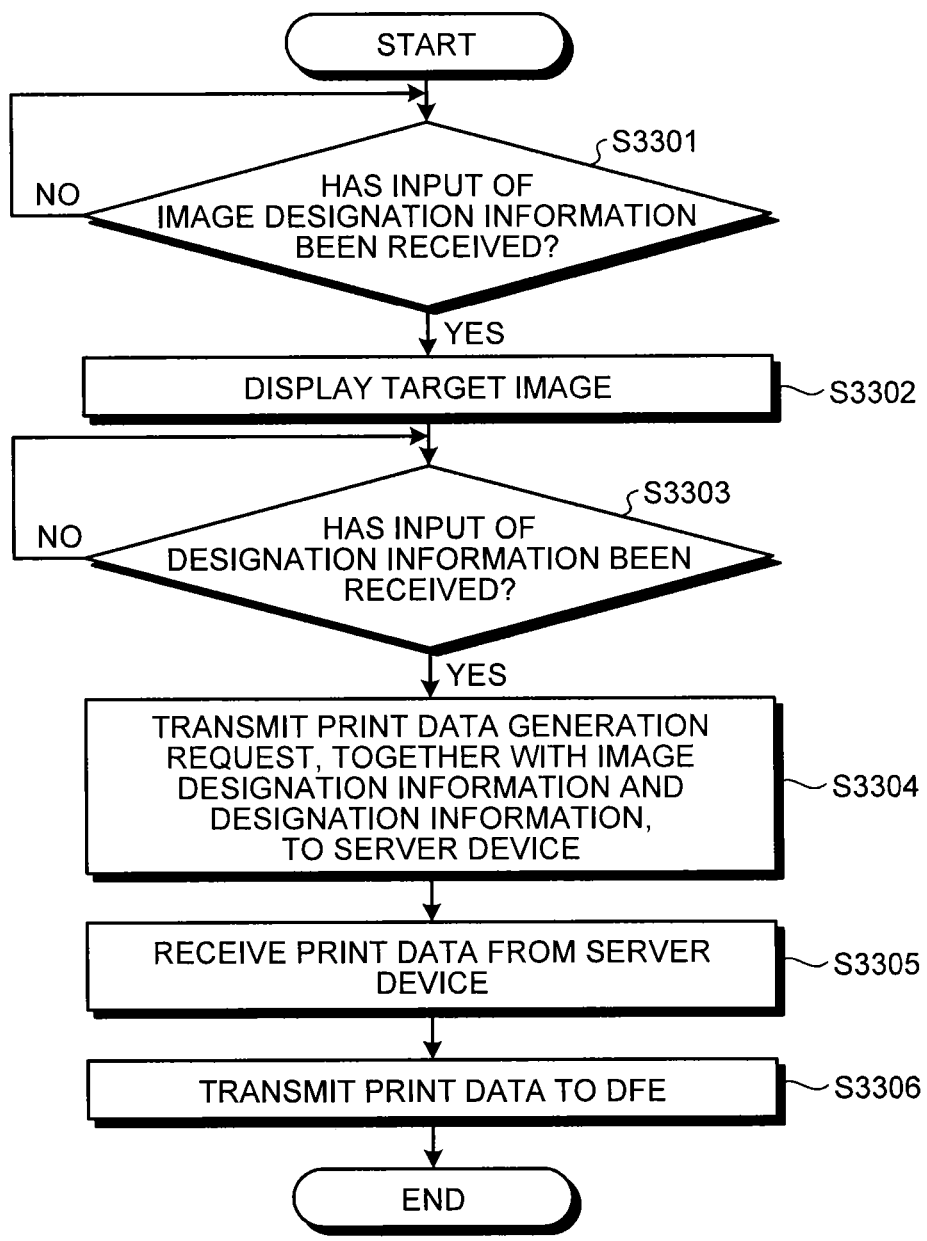
FIG. 46 is a flowchart illustrating the procedures in an operation by the host device of the eighth embodiment.

In the following, respective operations to be performed by the host device 3010, the server device 3060, and the DFE 3050 cooperating with one another in the above described entire flow are described in detail. First, the gloss control plane and print data generating operations to be performed by the host device 3010 and the server device 3060 are described. FIG. 46 is a flowchart illustrating the procedures in the operation by the host device 3010 of the eighth embodiment.

First, when the input control unit 124 receives an input of image designation information (YES in step S3301), the display control unit 121 controls the display unit 14 to display the image designated by the received image designation information (step S3302). When the input control unit 124 receives an input of designation information designating a surface effect and a transparent image (YES in step S3303), the I/F unit 3011 transmits a print data generation request, together with the input image designation information and the designation information, to the server device 3060 (step S3304).

When print data is generated in the server device 3060, the I/F unit 3011 receives the data (step S3305). The I/F unit 3011 then transmits the print data to the DFE 3050 (step S3306).

Figure 47:
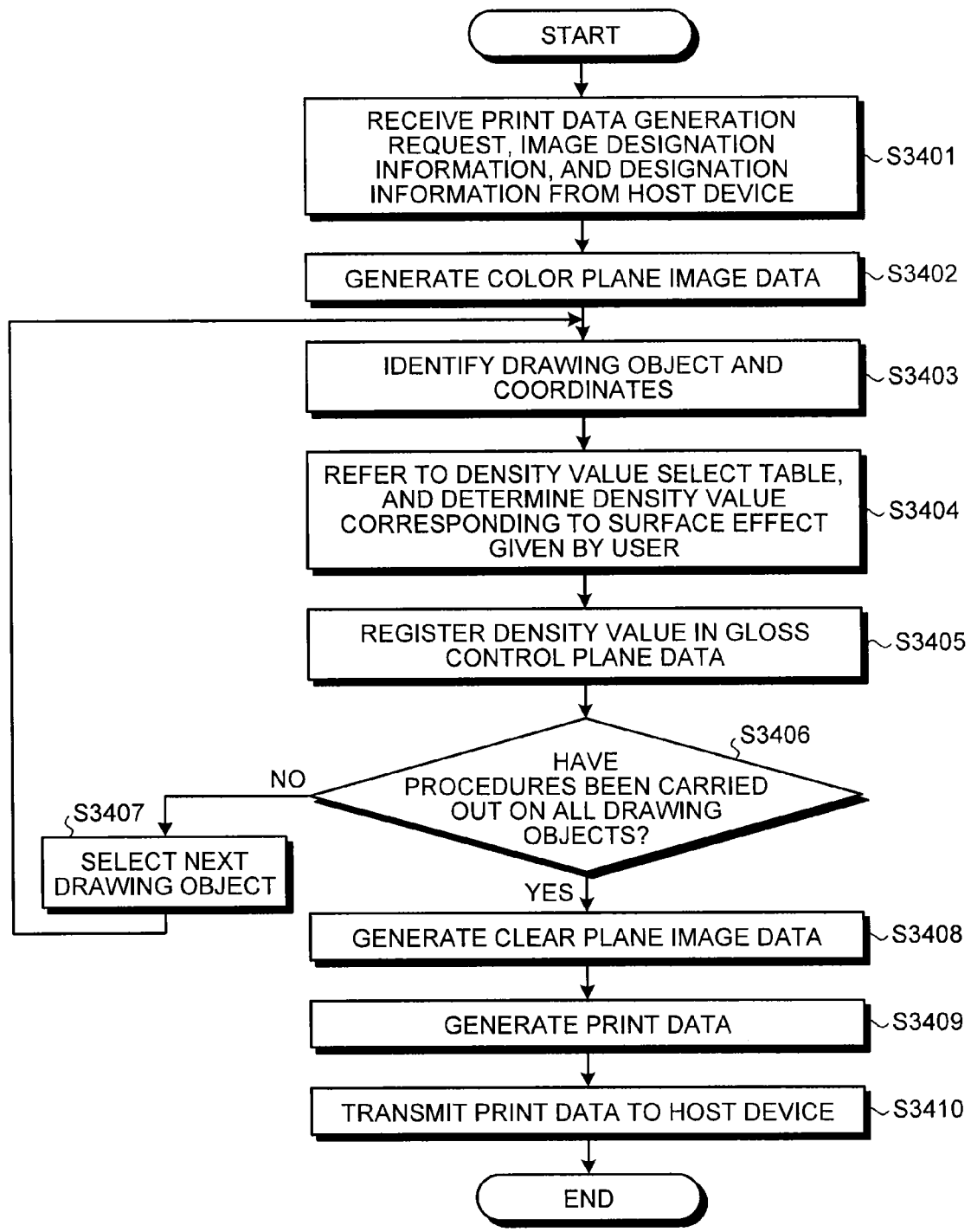
FIG. 47 is a flowchart illustrating the procedures in gloss control plane image data and print data generating operations by the server device of the eighth embodiment.

FIG. 47 is a flowchart illustrating the procedures in the gloss control plane image data and print data generating operations by the server device 3060 according to the eighth embodiment. When the communication unit 3065 receives a print data generation request, image designation information, and designation information from the host device 3010 (step S3401), the plane data generating unit 3062 first generates color plane image data, based on the image designation information (step S3402).

Using a drawing command provided by the operating system or the like, and coordinate values and the like set by the drawing command, the plane data generating unit 3062 identifies the drawing object to which a surface effect is given for the target image, and the coordinates of the drawing object, based on the designation information (step S3403).

The plane data generating unit 3062 then refers to the density value select table 3069 stored in the storage unit 3070, and determines the density value as the gloss control value corresponding to the type of the surface effect given by the user through the designation information (step S3404).

The plane data generating unit 3062 associates the gloss control plane image data (empty data at first) with the drawing object and the density value determined in accordance with the type of the surface effect, and registers the data (step S3405).

The plane data generating unit 3062 then determines whether the procedures of step S3402 through S3404 have been carried out on all the drawing objects existing in the target image (step S3406). In a case where the procedures have not been carried out on all the drawing objects (No in step S3406), the plane data generating unit 3062 selects the next drawing object yet to be processed in the target image (step S3407), and the procedures of steps S3403 through S3405 are repeated.

In a case where it is determined in step S3406 that the procedures of steps S3403 through S3405 have been carried out on all the drawing objects in the target image (Yes in step S3406), the gloss control plane image data generation is ended, and the gloss control plane image data illustrated in FIGS. 8 and 13 is obtained.

The plane data generating unit 3062 then generates clear plane image data, based on the designation of a transparent image in the designation information (step S3408).

A print data generating unit 3063 generates document data by integrating the color plane image data, the gloss control plane image data, and the clear plane image data, and generate the print data in the PDF format illustrated in FIG. 10 by adding a job command to the integrated document data (step S3409). The communication unit 3065 then transmits the generated print data to the host device 3010 (step S3410).

Figure 48:
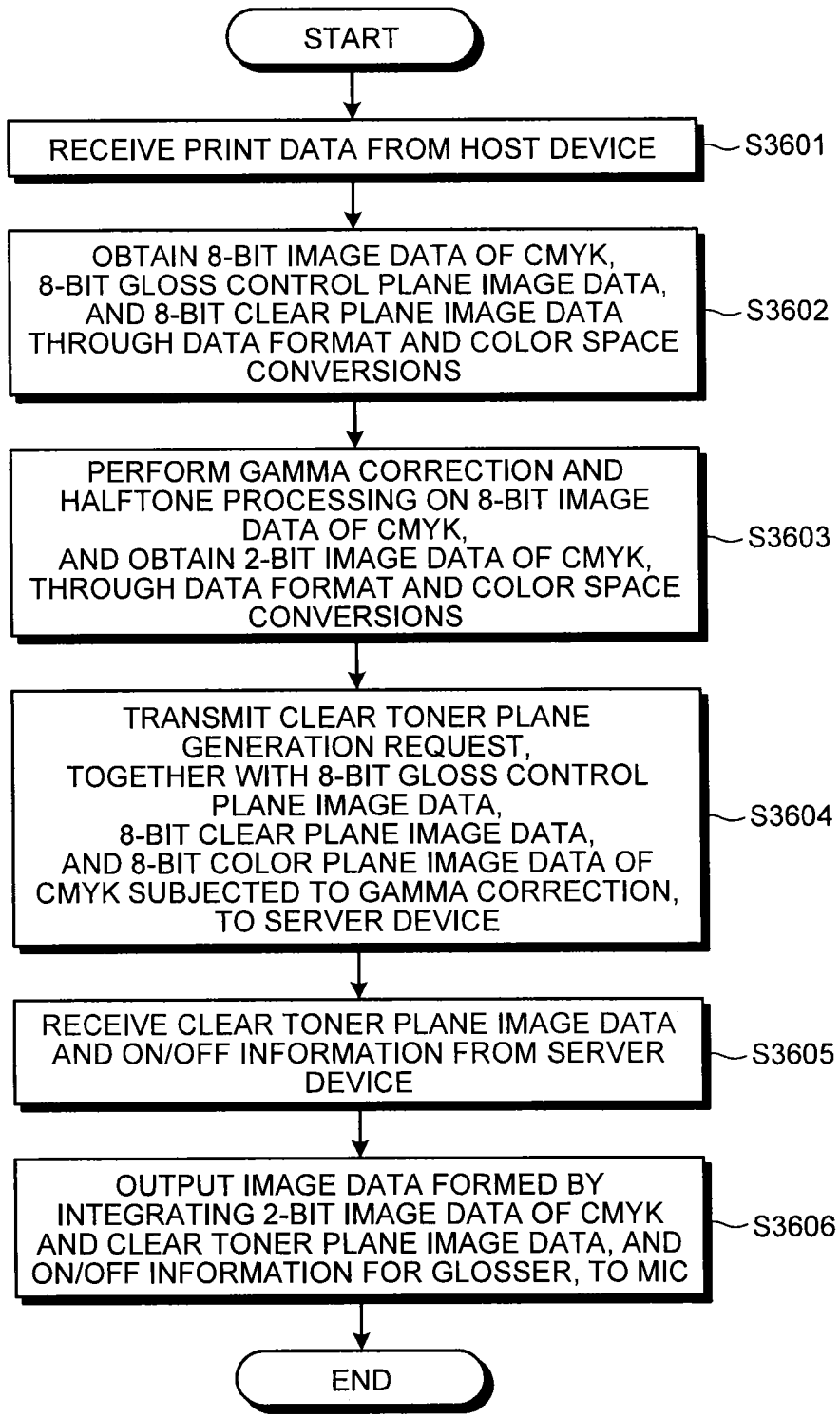
FIG. 48 is a flowchart illustrating the procedures in an operation by the DFE of the eighth embodiment.

Next, the clear toner plane image data generating operation to be performed by the DFE 3050 and the server device 3060 is described. FIG. 48 is a flowchart illustrating the procedures in the operation to be performed by the DFE 3050.

When the DFE 3050 receives print data from the host device 3010 (step S3601), the rendering engine 51 linguistically renders the print data, and converts the gloss control plane image data expressed in the vector form into a raster form. The rendering engine 51 also converts the color space expressed in the RGB format into a CMYK color space, to obtain 8-bit image data of each of the CMYK color planes, 8-bit gloss control plane image data, and 8-bit clear plane image data (step S3602).

The details of the gloss control plane image data converting operation in step S3602 are the same as the gloss control plane image data converting operation of the first embodiment described with reference to FIG. 18. Through this converting operation, the gloss control plane image data is converted into data in which a surface effect is set for each pixel.

When the 8-bit gloss control plane image data is output, the TRC 53 of the DFE 3050 performs a gamma correction on the respective 8-bit image data of the CMYK color planes with a 1D_LUT gamma curve generated through calibration, and the halftone engine 55 performs halftone processing to convert the image data subjected to the gamma correction into 2-bit image data of each of CMYK to be output to the printer unit 70. Thus, the respective 2-bit image data of CMYK subjected to the halftone processing are obtained (step S3603).

The si2 unit 3054 then transmits a clear toner plane generation request, as well as the 8-bit gloss control plane image data, the respective 8-bit image data of the CMYK color planes subjected to the gamma correction, and the 8-bit clear plane image data, to the server device 3060 (step S3604).

Figure 49:
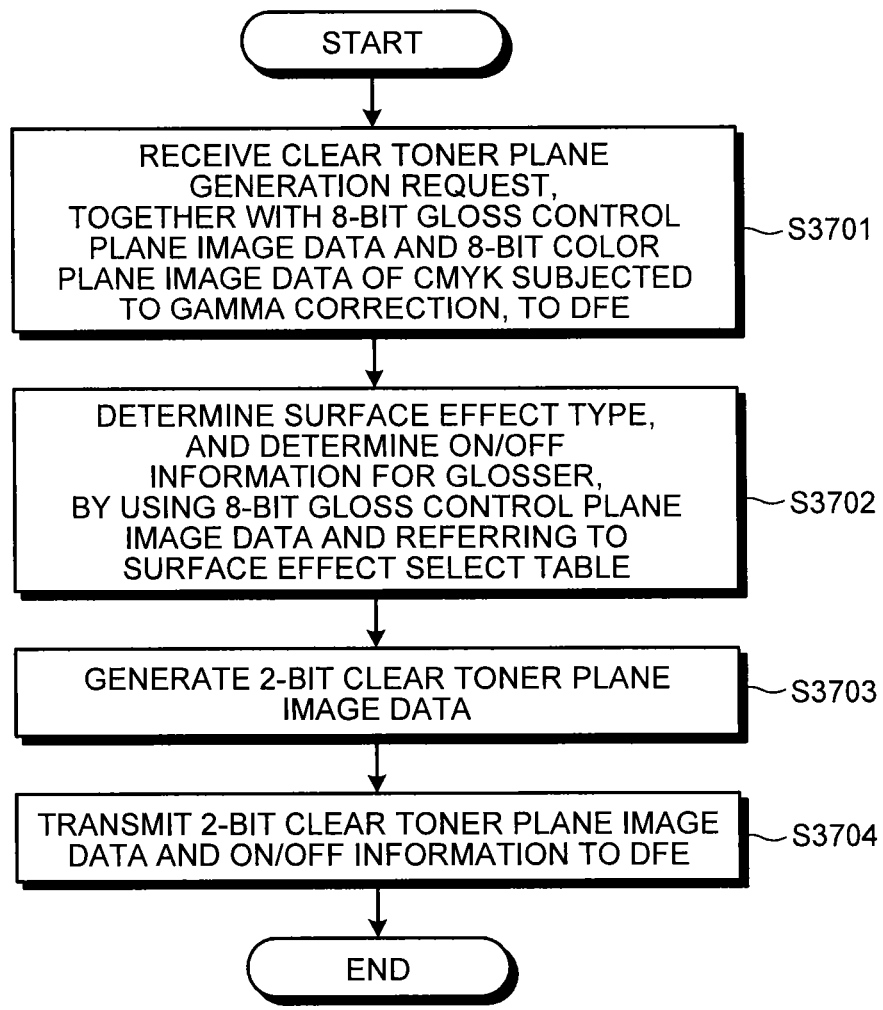
FIG. 49 is a flowchart illustrating the procedures in a clear toner plane generating operation by the server device of the eighth embodiment.

The clear toner plane generating operation to be performed by the server device 3060 is now described. FIG. 49 is a flowchart illustrating the procedures in the clear toner plane generating operation to be performed by the server device 3060.

In the server device 3060, the communication unit 3065 receives the 8-bit gloss control plane image data, the respective 8-bit gloss control plane image data of the CMYK color planes, and the clear toner plane generation request from the DFE 3050 (step S3701).

Using the 8-bit gloss control plane image data, the clear processor 3066 refers to the surface effect select table 3068 in the storage unit 3070, and determines the surface effects designated for the respective pixels values indicated by the gloss control plane image data. The clear processor 3066 performs such a check on all the pixels constituting the gloss control plane image data. In the gloss control plane image data, all the pixels constituting regions to which a certain surface effect is to be given basically indicate density values within one range. Therefore, as for pixels located in the vicinity of pixels determined to be given a surface effect, the clear processor 3066 determines those pixels to be included in the regions to which the same surface effect is to be given. In this manner, the clear processor 3066 determines a region to which a surface effect is to be given, and the type of the surface effect to be given to the region, and, in accordance with the determination result, determines whether to switch on or off the glosser 80 (step S3702).

The clear processor 3066 then generates a gloss control plane for PG, a gloss control plane for G, a gloss control plane for M, and a gloss control plane for PM, from the 8-bit gloss control plane image data. The details of this procedure are the same as those described in the first embodiment. The clear processor converts the gloss control plane for PG into a 2-bit Clr-PG plane, the gloss control plane for G into a 2-bit Clr-G plane, the gloss control plane for M into a 2-bit Clr-M plane, and the gloss control plane for PM into a 2-bit Clr-PM plane, and combines the converted image data as appropriate, to generate 2-bit clear toner plane image data (step S3703). A gamma correction storage unit 206 and a halftone data storage unit 208 may be stored in the storage unit 3070 of the server device 3060, or may be stored in the DFE 3050.

The communication unit 3065 transmits the 2-bit clear toner plane image data generated by the clear processor 3066, and the on/off information to the DFE 3050 (step S3704).

Referring back to FIG. 48, after transmitting the clear toner plane generation request to the server device 3060, the si3 unit 3057 in the DFE 3050 receives the 2-bit clear toner plane image data and the on/off information from the server device 3060 (step S3605).

The si3 unit 3057 then integrates the respective 2-bit image data of CMYK subjected to the halftone processing in step S3603 and the 2-bit clear toner plane image data received in step S3605, and outputs the integrated image data and the on/off information that indicates switching on or off of the glosser 80 and has been received in step S3605, to the MIC 60 (step S3606).

In a case where the server device 3060 has not generated clear toner plane image data, only the respective 2-bit image data of CMYK subjected to the halftone processing in step S3603 are integrated and output to the MIC 60 in step S3607.

The procedures to be carried out thereafter at the MIC 60, the printer unit 70, the glosser 80, and the low-temperature fixing unit 90 are the same as those in the first embodiment.

As described above, in this embodiment, the server device 3060 in the cloud generates color plane image data, gloss control plane image data, clear plane image data, print data, and clear toner plane image data. Accordingly, even in a case where more than one host device 3010 or more than one DFE 3050 exists, collective changes can be made to the density value select table and the surface effect select table, which is convenient to the manager.

In this embodiment, the plane data generating unit 3062, the print data generating unit 3063, and the clear processor 3066 are formed in the single server device 3060 in the cloud, and the plane data generating operation to generate color plane data, clear plane data, and gloss control plane data, the print data generating operation, and the clear toner plane data generating operation are performed in the server device 3060. However, the present invention is not limited to that.

Figure 50:
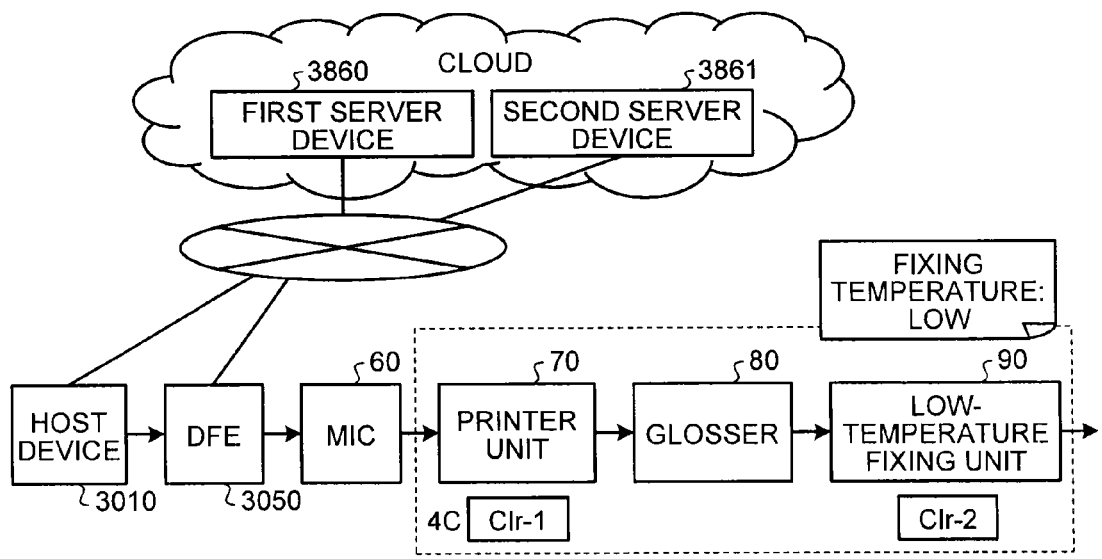
FIG. 50 is a diagram illustrating a network configuration in which two servers are provided in the cloud.

For example, two or more server devices may be provided in the cloud, and the above described operations may be distributed among the two or more server devices. FIG. 50 is a diagram illustrating a network configuration in which two servers (a first server device 3860 and a second server device 3861) are provided in the cloud. In the example illustrated in FIG. 50, the first server device 3860 and the second server device 3861 perform the plane data generating operation to generate color plane data, clear plane data, and gloss control plane data, the print data generating operation, and the clear toner plane data generating operation in a distributed manner.

For example, the plane data generating unit 3062 and the print data generating unit 3063 are provided in the first server device 3860, so that the plane data generating operation and the print data generating operation are performed in the first server device 3860. The clear processor 3066 is provided in the second server device 3861, so that the clear toner plane data generating operation is performed in the second server device 3861. The distribution of the respective operations to the respective server devices is not limited to that, and may be performed in any other fashion.

That is, as long as the minimum components, such as the input unit 13, the input control unit 124, the image processing unit 120, the display control unit 121, and the display unit 14 are provided in the host device 3010, part of or all of the plane data generating unit 3062, the print data generating unit 3063, and the clear processor 3066 may be provided in one server device in the cloud, or may be distributed to two or more server devices.

In other words, one of the operations performed in a single device can be performed in one or more other devices connected to the single device via a network, as in the above described example.

In the case where "one of the operations is performed in one or more other devices connected to the single device via a network", data input/output operations to be performed between the single device and another device or between other devices are included, such as an operation to output data (information) generated through an operation performed in the single device to another device, and an operation to input the data from another device.

That is, in a case where there is another device, data input/output operations to be performed between the single device and the other device are included. In a case where there are two or more other devices, data input/output operations to be performed between the single device and another device and between other devices, such as a first other device and a second other device, are included.

In the eighth embodiment, the server device 3060 or more than one server device, such as the first server device 3860 and the second server device 3861, is provided in the cloud. However, this embodiment is not limited to that. For example, the server device 3060 or more than one server device, such as the first server device 3860 and the second server device 3861, may be provided in any network such as an intranet.

Figure 51:
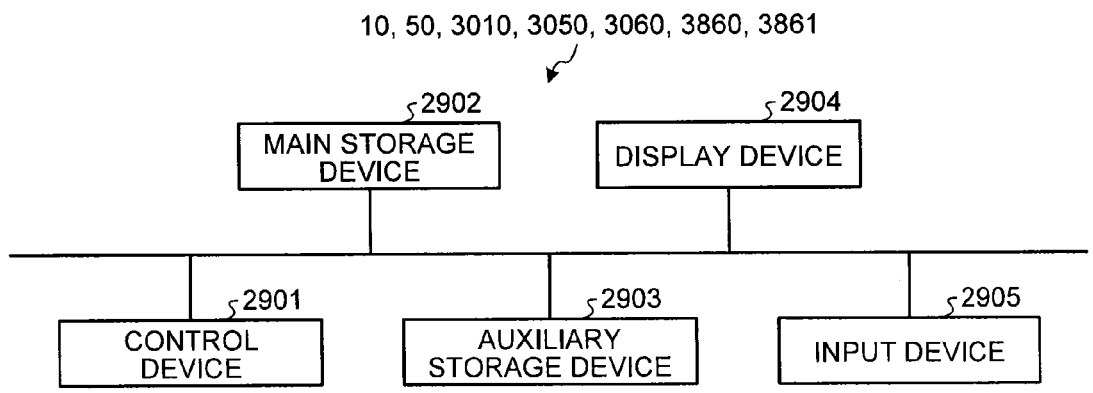
FIG. 51 is a diagram illustrating a hardware structure of the host devices, the DFEs, and the server devices.

The hardware structures of the host devices 10 and 3010, the DFEs 50 and 3050, the server device 3060, the first server device 3860, and the second server device 3861 of the above described embodiments are now described. FIG. 51 is a diagram illustrating a hardware structure of the host devices 10 and 3010, the DFEs 50 and 3050, and the server device 3060. The host devices 10 and 3010, the DFEs 50 and 3050, the server device 3060, the first server device 3860, and the second server device 3861 each has a hardware structure that primarily includes: a control device 2901 such as a CPU that controls the entire device; a main storage device 2902 such as ROM or RAM that stores various kinds of data and various kinds of programs; an auxiliary storage device 2903 such as a HDD that stores various kinds of data and various kinds of programs; an input device 2905 such as a keyboard and a mouse; and a display device 2904 such as a display. This is a hardware structure utilizing a conventional computer.

The image processing program (including the image processing application as in the following description) to be executed by the host devices 10 and 3010 of the above described embodiments is provided as a computer program product that is recorded in a file in an installable format or an executable format on a computer-readable recording medium such as a CD-ROM, a flexible disk (FD), a CD-R, or a DVD (Digital Versatile Disk).

Alternatively, the image processing program to be executed by the host devices 10 and 3010 of the above described embodiments may be stored in a computer connected to a network such as the Internet, and be downloaded via the network. Also, the image processing program to be executed by the host device 10 of the above described embodiments may be provided or distributed via a network such as the Internet.

The image processing program to be executed by the host devices 10 and 3010 of the above described embodiments may be incorporated beforehand into ROM or the like.

The image processing program to be executed by the host devices 10 and 3010 of the above described embodiments has a module configuration that includes the above described components (an image processing unit, a plane data generating unit, a print data generating unit, an input control unit, and a display control unit). The CPU (a processor) reads the image processing program from the above described storage medium, and executes the image processing program, to load the respective components as actual hardware into the main storage device and form the image processing unit, the plane data generating unit, the print data generating unit, the input control unit, and the display control unit in the main storage device.

The print control operations to be performed by the DFEs 50 and 3050 of the above described embodiments are realized by hardware, but may also be realized by a print control program as software. In this case, the print control program to be executed by the DFEs 50 and 3050 of the above described embodiments is incorporated beforehand into ROM or the like.

The print control program to be executed by the DFEs 50 and 3050 of the above described embodiments is provided as a computer program product that is recorded in a file in an installable format or an executable format on a computer-readable recording medium such as a CD-ROM, a flexible disk (FD), a CD-R, or a DVD (Digital Versatile Disk).

Further, the print control program to be executed by the DFEs 50 and 3050 of the above described embodiments may be stored in a computer connected to a network such as the Internet, and be downloaded via the network. Also, the print control program to be executed by the DFE 50 of the above described embodiments may be provided or distributed via a network such as the Internet.

The print control program to be executed by the DFEs 50 and 3050 of the above described embodiments has a module configuration that includes the above described components (a rendering engine, a halftone engine, a TRC, a si1 unit, a si2 unit, a si3 unit, and a clear processor). The CPU (a processor) reads the image processing program from the above described storage medium, and executes the print control program, to load the respective components as actual hardware into the main storage device and form the rendering engine, the halftone engine, the TRC, the si1 unit, the si2 unit, the si3 unit, and the clear processor in the main storage device.

Also, the respective data generating operations to be performed by the server device 3060 of the above described embodiment are realized by hardware, but may also be realized by a generating program as software. In this case, the generating programs to be executed by the server device 3060 of the above described embodiment are incorporated beforehand into ROM or the like.

The respective data generating programs to be executed by the server device 3060 of the above described embodiment are provided as a computer program product that is recorded in a file in an installable format or an executable format on a computer-readable recording medium such as a CD-ROM, a flexible disk (FD), a CD-R, or a DVD (Digital Versatile Disk).

Further, the respective data generating programs to be executed by the server device 3060 of the above described embodiment may be stored in a computer connected to a network such as the Internet, and be downloaded via the network. Also, the respective data generating programs to be executed by the server device 3060 of the above described embodiment may be provided or distributed via a network such as the Internet.

The respective data generating programs to be executed by the above described server device 3060 has a module configuration that includes the above described components (a plane data generating unit, a print data generating unit, and a clear processor). The CPU (a processor) reads the generating programs from the above described ROM, and executes the generating programs, to load the respective components as actual hardware into the main storage device and form the plane data generating unit, the print data generating unit, and the clear processor in the main storage device.

The present invention is not limited to the above described embodiments, but modifications may be made to the components in the embodiments without departing from scope of the invention. Also, various inventions may be developed by appropriately combining the components disclosed in the above embodiments. For example, some components may be deleted from the components described in the embodiments. Further, components of different embodiments may be combined where appropriate. Also, various other modifications may be made as follows.

In the above embodiments, each image forming system includes the host device 10 or 3010, the DFE 50 or 3050, the MIC 60, the printer unit 70, the glosser 80, and the low-temperature fixing unit 90. However the present invention is not limited to that. For example, the DFE 50 or 3050, the MIC 60, and the printer unit 70 may be integrally formed to constitute one image forming device. The image forming device may further include the glosser 80 and the low-temperature fixing unit 90.

In the image forming systems of the above described embodiments, toners of the colors of CMYK are used to form images. However, images may be formed with a toner of one color.

The printer systems of the above described embodiments each include the MIC 60, but the present invention is not limited to that. The above described operations and functions to be executed by the MIC 60 may be executed by some other device such as the DFE 50, and the MIC 60 may not be provided.

According to the embodiments, appropriate gloss levels in accordance with types of surface effects can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A print control device comprising:
a generating unit configured to generate image data based on gloss control plane data that specifies a type of a surface effect to be given to a recording medium and that specifies a region to which the surface effect is to be given on the recording medium; and
an output unit configured to output the image data, wherein
the generating unit includes a tone correcting unit configured to perform a tone correction on the region in which the surface effect is designated in the gloss control plane data, the tone correction varying with each type of surface effect.

2. The print control device of claim 1, further comprising:
a first storage unit configured to store target information for each type of surface effect, the target information indicating a relationship between a density value of the gloss control plane data and a gloss level to be achieved as a result of printing;
a second storage unit configured to store a parameter of the tone correction for each type of surface effect;
a patch image generating unit configured to generate image data of a patch image to be used in setting the parameter, for each type of surface effect; and
a first changing unit configured to change the parameters to obtain the relationship indicated by the target information, using a result of measurement of a gloss level of the patch image formed on the recording medium and the target information, for each type of surface effect.

3. The print control device of claim 2, further comprising:
a third storage unit configured to store a plurality of pieces of dither data having different numbers of screen lines to be set, wherein
the patch image generating unit generates image data of the patch image corresponding to each of the pieces of dither data stored in the third storage unit; and
the first changing unit changes the parameter, using a result of measurement of the patch image having a widest range of gloss levels measured by a gloss measuring unit and the target information, the gloss measuring unit being capable of measuring a gloss level of an image formed on the recording medium.

4. The print control device of claim 3, wherein the first changing unit sets dither data to be used in halftone processing for the image data subjected to the tone correction, the dither data being dither data corresponding to the patch image having the widest range of gloss levels measured by the gloss measuring unit among the dither data stored in the third storage unit.

5. The print control device of claim 2, wherein the first storage unit stores a plurality of pieces of the target information for each type of surface effect, the plurality of pieces of the target information being set in accordance with combinations of a type of the surface effect and a type of paper.

6. The print control device of claim 2, further comprising a second changing unit configured to change the target information stored in the first storage unit.

7. The print control device of claim 2, further comprising a third changing unit configured to change the parameter stored in the second storage unit.

8. The print control device of claim 1, further comprising:
a second storage unit configured to store a plurality of types of candidate parameters of the tone correction for each type of surface effect;

a patch image generating unit configured to generate image data of a patch image for each candidate corresponding to the type of the surface effect, the patch image being to be used in setting a parameter corresponding to the type of the surface effect;

a first select receiving unit configured to receive a select input indicating which one of the patch images corresponding to the type of the surface effect is to be selected; and a first setting unit configured to set the parameter, the parameter being the candidate corresponding to the patch image indicated by the select input received by the first select receiving unit.

9. The print control device of claim 1, further comprising:

a first storage unit configured to store at least one piece of target information for each type of surface effect, the target information indicating a relationship between a density value of the gloss control plane data and a gloss level to be achieved as a result of printing;

a patch image generating unit configured to generate image data of a patch image for each piece of the target information corresponding to the type of the surface effect, the patch image being to be used in setting a parameter of the tone correction, the parameter corresponding to the type of the surface effect;

a second select receiving unit configured to receive a select input indicating which one of the patch images corresponding to the type of the surface effect is to be selected; and a second setting unit configured to set the parameter, the parameter being the target information corresponding to the patch image indicated by the select input received by the second select receiving unit.

10. The print control device of claim 1, wherein the tone correction corresponds to gamma correction performed on the region in which the surface effect is designated.

11. The print control device of claim 1, wherein the toner correcting unit is configured to read a gamma curve for said each type of surface effect and to perform the tone correction in accordance with the read gamma curve.

12. An image forming system comprising:

a print control device configured to generate image data; and a printing device configured to perform printing based on the image data, wherein the print control device includes a generating unit configured to generate the image data based on gloss control plane data that specifies a type of a surface effect to be given to a recording medium and that specifies a region to which the surface effect is to be given in the recording medium; and an output unit configured to output the image data, and the generating unit includes a tone correcting unit configured to perform a tone correction on the region in which the surface effect is designated in the gloss control plane data, the tone correction varying with each type of surface effect.

13. A non-transitory computer-readable storage medium with an executable program stored thereon, wherein the program instructs a computer to perform:

generating image data based on gloss control plane data specifying a type of a surface effect to be given to a recording medium and specifying a region to which the surface effect is to be given on the recording medium; and outputting the image data, wherein the generating includes performing a tone correction on the region in which the surface effect is designated in the gloss control plane data, the tone correction varying with each type of surface effect.

* * * * *